US011731535B2

(12) United States Patent
Kondrad et al.

(10) Patent No.: US 11,731,535 B2
(45) Date of Patent: Aug. 22, 2023

(54) VEHICULAR SYSTEM CAPABLE OF ADJUSTING A PASSENGER COMPARTMENT FROM A CHILD CARE ARRANGEMENT TO A SECOND ARRANGEMENT

(71) Applicant: Ford Global Technologies, LLC, Dearborn, MI (US)

(72) Inventors: Marcos Silva Kondrad, Macomb Township, MI (US); Patrick Maloney, Livonia, MI (US); Kevin Mozurkewich, Milford, MI (US); Johnathan Andrew Line, Northville, MI (US); Sean Bayle West, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 398 days.

(21) Appl. No.: 17/092,747

(22) Filed: Nov. 9, 2020

(65) Prior Publication Data
US 2022/0144142 A1 May 12, 2022

(51) Int. Cl.
*B60N 2/30* (2006.01)
*B60N 2/02* (2006.01)
(Continued)

(52) U.S. Cl.
CPC .............. *B60N 2/0252* (2013.01); *B60J 5/04* (2013.01); *B60N 2/01* (2013.01); *B60N 2/02* (2013.01); *B60N 2/0292* (2013.01); *B60N 2/0296* (2013.01); *B60N 2/07* (2013.01); *B60N 2/14* (2013.01); *B60N 2/22* (2013.01);
(Continued)

(58) Field of Classification Search
CPC .... B60N 2/3038; B60N 2/304; B60N 2/3045; B60N 2/3047
See application file for complete search history.

(56) References Cited

U.S. PATENT DOCUMENTS 6,129,405 A 10/2000 Miyahara et al.
6,231,101 B1 5/2001 Kamida et al.
(Continued)

FOREIGN PATENT DOCUMENTS

CN 201544972 U 8/2010
CN 204821205 U 12/2015
(Continued)

OTHER PUBLICATIONS

US 8,919,720 B2, 12/2014, Moriyama et al. (withdrawn)

*Primary Examiner* — Hilary L Gutman
(74) *Attorney, Agent, or Firm* — Vichit Chea; Price Heneveld LLP

(57) ABSTRACT

A transportation system is disclosed. The transportation system includes a vehicle, a plurality of seating assemblies positioned within a passenger compartment of the vehicle and defining an arrangement, a plurality of actuators that effect movement of various components of the plurality of seating assemblies, a plurality of sensors, and a controller. Specific examples of pre-set or pre-programmed arrangements are disclosed, as well as the ability to customize the arrangement. Additionally, exemplary methods are disclosed that illustrate transitions between a variety of the pre-set or pre-programmed arrangements.

20 Claims, 45 Drawing Sheets

(51) Int. Cl.
*B60J 5/04* (2006.01)
*B60N 2/01* (2006.01)
*B60N 2/22* (2006.01)
*B60N 2/14* (2006.01)
*B60N 2/26* (2006.01)
*B60N 2/07* (2006.01)
*B60N 2/32* (2006.01)
*B60N 2/90* (2018.01)

(52) U.S. Cl.
CPC .............. *B60N 2/26* (2013.01); *B60N 2/32* (2013.01); *B60N 2/995* (2018.02); *B60N 2002/0268* (2013.01); *B60N 2002/0272* (2013.01)

(56) References Cited

U.S. PATENT DOCUMENTS

| | | |
|---|---|---|
| 6,315,352 B1 | 11/2001 | Nomura |
| 6,318,784 B2 | 11/2001 | Nishide |
| 6,352,047 B1 | 3/2002 | Bogniard |
| 6,406,084 B1 | 6/2002 | de Campos |
| 6,416,107 B1 | 7/2002 | Kanaguchi et al. |
| 6,435,589 B2 | 8/2002 | Shimizu et al. |
| 6,457,765 B1 | 10/2002 | Bergquist et al. |
| 6,557,919 B2 | 5/2003 | Suga et al. |
| 6,572,172 B1 | 6/2003 | Ninomiya et al. |
| 6,591,554 B2 | 7/2003 | Kumer, Jr. |
| 6,626,481 B2 | 9/2003 | Kawasaki |
| 6,629,721 B1 | 10/2003 | Macey |
| 6,629,729 B2 | 10/2003 | Wiedeman et al. |
| 6,644,730 B2 | 11/2003 | Sugiura et al. |
| 6,663,179 B2 | 12/2003 | Sunohara |
| 6,666,614 B2 | 12/2003 | Muraishi et al. |
| 6,669,141 B2 | 12/2003 | Schmidt Schaeffer |
| 6,682,120 B2 | 1/2004 | Kamida et al. |
| 6,709,040 B1 | 3/2004 | Drew et al. |
| 6,722,737 B2 | 4/2004 | Kanai |
| 6,739,280 B2 | 5/2004 | Keller |
| 6,793,265 B2 | 9/2004 | Kamida et al. |
| 6,817,645 B2 | 11/2004 | Taguchi et al. |
| 6,817,660 B2 | 11/2004 | Ito et al. |
| 6,820,911 B2 | 11/2004 | Furui |
| 6,820,914 B2 | 11/2004 | Behrends et al. |
| 6,837,530 B2 | 1/2005 | Rudberg et al. |
| 6,869,138 B2 | 3/2005 | Rhodes et al. |
| 6,896,309 B2 | 5/2005 | Satoh et al. |
| 6,915,998 B2 | 7/2005 | Borbe et al. |
| 6,918,625 B2 | 7/2005 | Storto et al. |
| 6,935,682 B2 | 8/2005 | Park |
| 6,981,746 B2 | 1/2006 | Chung et al. |
| 6,983,985 B2 | 1/2006 | McGowan et al. |
| 6,991,060 B2 | 1/2006 | Chernoff et al. |
| 6,997,498 B2 | 2/2006 | Oyama |
| 7,036,883 B1 | 5/2006 | Thompson et al. |
| 7,040,685 B2 | 5/2006 | Sumida et al. |
| 7,048,330 B2 | 5/2006 | Daniel |
| 7,073,764 B2 | 7/2006 | Yatsushiro |
| 7,090,274 B1 | 8/2006 | Khan et al. |
| 7,108,306 B2 | 9/2006 | Suda et al. |
| 7,108,323 B2 | 9/2006 | Nelch et al. |
| 7,108,325 B2 | 9/2006 | Williamson et al. |
| 7,128,358 B2 | 10/2006 | Perin |
| 7,152,900 B2 | 12/2006 | Trombley et al. |
| 7,156,442 B2 | 1/2007 | McManus et al. |
| 7,192,073 B2 | 3/2007 | Nagamoto et al. |
| 7,201,425 B2 | 4/2007 | Tsujibayashi |
| 7,201,426 B2 | 4/2007 | Villeminey |
| 7,213,861 B2 | 5/2007 | Yokoyama et al. |
| 7,219,946 B2 | 5/2007 | Tame et al. |
| 7,229,117 B2 | 6/2007 | Okuda et al. |
| 7,237,837 B2 | 7/2007 | Queveau et al. |
| 7,240,949 B1 | 7/2007 | Moushegian et al. |
| 7,240,950 B2 | 7/2007 | Fourrey et al. |
| 7,252,320 B2 | 8/2007 | Tsujibayashi |
| 7,255,384 B2 | 8/2007 | Saberan et al. |
| 7,273,243 B2 | 9/2007 | Prugarewicz |
| 7,290,822 B2 | 11/2007 | Villeminey |
| 7,300,090 B2 | 11/2007 | Rana et al. |
| 7,328,939 B2 | 2/2008 | Moriyama et al. |
| 7,364,234 B2 | 4/2008 | Begin et al. |
| 7,374,222 B2 | 5/2008 | McLaughlin |
| 7,377,571 B2 | 5/2008 | Ewers et al. |
| 7,377,582 B2 | 5/2008 | Fukada et al. |
| 7,410,199 B2 | 8/2008 | Nabil et al. |
| 7,434,863 B2 | 10/2008 | Hamazaki et al. |
| 7,441,625 B2 | 10/2008 | Ackermann |
| 7,441,822 B1 | 10/2008 | Day |
| 7,452,019 B1 | 11/2008 | Day |
| 7,478,859 B2 | 1/2009 | Fukada et al. |
| 7,484,787 B2 | 2/2009 | Hofschulte |
| 7,497,511 B2 | 3/2009 | Park et al. |
| 7,510,227 B2 | 3/2009 | Mahaffy |
| 7,520,567 B2 | 4/2009 | Billger et al. |
| 7,537,260 B2 | 5/2009 | Epaud |
| 7,547,057 B2 | 6/2009 | Kim et al. |
| 7,597,372 B2 | 10/2009 | Nagamoto et al. |
| 7,658,429 B2 | 2/2010 | Koga et al. |
| 7,665,703 B2 | 2/2010 | Tanaka |
| 7,677,629 B2 | 3/2010 | Akiya et al. |
| 7,686,367 B2 | 3/2010 | Neale |
| 7,686,368 B2 | 3/2010 | Ghergheli et al. |
| 7,695,058 B2 | 4/2010 | Satta et al. |
| 7,699,399 B2 | 4/2010 | Satta et al. |
| 7,708,331 B2 | 5/2010 | Yamasaki |
| 7,712,829 B2 * | 5/2010 | Park ................ B60N 2/065 296/65.13 |
| 7,712,831 B2 | 5/2010 | Abt et al. |
| 7,726,730 B2 | 6/2010 | Peter et al. |
| 7,850,220 B2 | 12/2010 | Holdampf |
| 7,950,740 B2 | 5/2011 | Bunea et al. |
| 7,966,900 B2 | 6/2011 | Becker et al. |
| 7,988,231 B2 | 8/2011 | Phinney |
| 8,033,605 B2 | 10/2011 | Miura et al. |
| 8,038,206 B2 | 10/2011 | Ito et al. |
| 8,052,194 B2 | 11/2011 | Sayama |
| 8,123,272 B2 | 2/2012 | Ito et al. |
| 8,141,930 B2 | 3/2012 | Sayama |
| 8,177,281 B2 | 5/2012 | Sayama |
| 8,182,016 B2 | 5/2012 | Kaip et al. |
| 8,186,753 B2 | 5/2012 | Fujisawa et al. |
| 8,235,445 B2 | 8/2012 | Jones et al. |
| 8,235,446 B2 | 8/2012 | Aoki |
| 8,256,822 B2 | 9/2012 | Koga et al. |
| 8,267,456 B2 | 9/2012 | Murray |
| 8,287,024 B2 | 10/2012 | Sayama |
| 8,287,037 B2 | 10/2012 | Sayama |
| 8,297,678 B2 | 10/2012 | Nakao et al. |
| 8,336,955 B2 | 12/2012 | Sayama |
| 8,342,450 B2 | 1/2013 | Funke |
| 8,348,326 B2 | 1/2013 | Koga |
| 8,360,368 B2 | 1/2013 | Bertrand et al. |
| 8,382,058 B2 | 2/2013 | Sovis |
| 8,388,054 B2 | 3/2013 | Sayama |
| 8,401,742 B2 | 3/2013 | Schliwa et al. |
| 8,408,628 B2 | 4/2013 | Yamazaki et al. |
| 8,414,056 B1 | 4/2013 | Aller |
| 8,439,149 B2 | 5/2013 | Tamura et al. |
| 8,465,096 B2 | 6/2013 | Sayama |
| 8,480,152 B2 | 7/2013 | Shimizu |
| 8,485,583 B2 | 7/2013 | Mather et al. |
| 8,534,750 B2 | 9/2013 | Sayama |
| 8,540,308 B2 | 9/2013 | Aoki et al. |
| 8,550,549 B2 | 10/2013 | Baker et al. |
| 8,590,957 B2 | 11/2013 | Kim et al. |
| 8,632,113 B2 | 1/2014 | Mather et al. |
| 8,651,550 B2 | 2/2014 | Mather et al. |
| 8,662,447 B2 | 3/2014 | Johnson et al. |
| 8,708,393 B2 | 4/2014 | Mather et al. |
| 8,820,694 B2 | 9/2014 | Tarusawa et al. |
| 8,844,998 B2 | 9/2014 | Kim et al. |
| 8,857,763 B2 | 10/2014 | Brand et al. |
| 8,894,031 B2 | 11/2014 | Sailer et al. |
| 8,919,721 B2 | 12/2014 | Moriyama et al. |

(56) References Cited

U.S. PATENT DOCUMENTS

| | | |
|---|---|---|
| 8,930,088 B2 | 1/2015 | Bauer |
| 8,960,783 B2 | 2/2015 | Holder et al. |
| 8,973,965 B2 | 3/2015 | Zalan et al. |
| 8,998,326 B2 | 4/2015 | DeCraene et al. |
| 9,085,245 B2 | 7/2015 | Haller |
| 9,085,251 B2 | 7/2015 | Kim et al. |
| 9,108,550 B2 | 8/2015 | Kim et al. |
| 9,145,656 B2 | 9/2015 | Ortega |
| 9,180,792 B2 | 11/2015 | Haller |
| 9,180,794 B2 | 11/2015 | Honma et al. |
| 9,211,812 B2 | 12/2015 | Haller |
| 9,227,529 B2 | 1/2016 | Haller |
| 9,266,448 B2 | 2/2016 | Urban et al. |
| 9,327,837 B2 | 5/2016 | Erk |
| 9,352,695 B1 | 5/2016 | Karosa et al. |
| 9,371,012 B2 | 6/2016 | Bosecker et al. |
| 9,381,836 B2 | 7/2016 | Sawada et al. |
| 9,403,448 B1 | 8/2016 | Evans et al. |
| 9,415,702 B2 | 8/2016 | Auger |
| 9,469,349 B1 | 10/2016 | Mather |
| 9,545,858 B2 | 1/2017 | Baccelli |
| 9,579,995 B2 | 2/2017 | Haller |
| 9,597,983 B2 | 3/2017 | Strasdat et al. |
| 9,656,753 B2 | 5/2017 | Schomacker |
| 9,725,019 B2 | 8/2017 | Mather |
| 9,783,202 B2 | 10/2017 | Yamada |
| 9,789,793 B2 | 10/2017 | Abe et al. |
| 9,815,388 B1 | 11/2017 | Lindsay |
| 9,815,390 B2 | 11/2017 | Adam |
| 9,821,683 B2 | 11/2017 | Mizuno et al. |
| 9,855,860 B2 | 1/2018 | Ahn et al. |
| 9,862,290 B2 | 1/2018 | Yamada |
| 9,981,622 B2 | 5/2018 | Ohmura |
| 9,987,908 B2 | 6/2018 | Tamaoki |
| 9,994,130 B2 | 6/2018 | Michels et al. |
| 10,005,422 B2 | 6/2018 | Gallagher et al. |
| 10,005,500 B2 | 6/2018 | Huenemann |
| 10,040,373 B2 | 8/2018 | Rawlinson et al. |
| 10,059,227 B2 | 8/2018 | Kostin et al. |
| 10,059,231 B2 | 8/2018 | Reuschel |
| 10,099,576 B2 | 10/2018 | Lota |
| 10,099,577 B2 | 10/2018 | Runde |
| 10,137,806 B2 | 11/2018 | Neighbors et al. |
| 10,160,391 B2 | 12/2018 | Abdel Majid et al. |
| 10,166,996 B2 | 1/2019 | Ishihara et al. |
| 10,189,373 B2 * | 1/2019 | Thomas .................. B60N 2/01 |
| 10,219,096 B2 | 2/2019 | Volkmar et al. |
| 10,259,347 B2 | 4/2019 | Kim et al. |
| 10,300,832 B1 | 5/2019 | Folks et al. |
| 10,336,215 B2 | 7/2019 | Sowinski et al. |
| 10,351,026 B1 | 7/2019 | Berndtson et al. |
| 10,406,956 B2 | 9/2019 | White et al. |
| 2003/0184112 A1 * | 10/2003 | Furui .................. B60N 2/0248 |
| | | 296/65.01 |
| 2005/0006920 A1 | 1/2005 | Moriyama et al. |
| 2005/0127716 A1 | 6/2005 | McLeod |
| 2006/0061173 A1 | 3/2006 | Ryan |
| 2006/0170235 A1 | 8/2006 | Oilar et al. |
| 2006/0175875 A1 | 8/2006 | Syrowik et al. |
| 2006/0181122 A1 | 8/2006 | Morinishi et al. |
| 2006/0255613 A1 | 11/2006 | Holmes et al. |
| 2007/0158969 A1 | 7/2007 | Walkingshaw |
| 2007/0210601 A1 | 9/2007 | Phillips et al. |
| 2007/0222251 A1 * | 9/2007 | Abraham .............. B60N 2/3047 |
| | | 297/344.21 |
| 2008/0009989 A1 * | 1/2008 | Kim .................... B60N 2/0224 |
| | | 701/36 |
| 2008/0030039 A1 | 2/2008 | Sturt et al. |
| 2008/0088147 A1 | 4/2008 | Choi |
| 2008/0169668 A1 | 7/2008 | Maramatsu |
| 2008/0211284 A1 | 9/2008 | Mutou et al. |
| 2008/0290706 A1 | 11/2008 | Yamada et al. |
| 2009/0115236 A1 | 5/2009 | Sturt et al. |
| 2009/0127904 A1 | 5/2009 | Yamada et al. |
| 2009/0152907 A1 | 6/2009 | Lee |
| 2009/0195037 A1 | 8/2009 | Plavetich et al. |
| 2010/0117394 A1 | 5/2010 | Teli et al. |
| 2010/0207422 A1 | 8/2010 | Sayama |
| 2011/0109114 A1 | 5/2011 | Kolpasky et al. |
| 2012/0313394 A1 | 12/2012 | Barrow et al. |
| 2015/0210187 A1 | 7/2015 | Harleb et al. |
| 2016/0082867 A1 | 3/2016 | Sugioka et al. |
| 2016/0101867 A1 | 4/2016 | McLaughlin et al. |
| 2016/0275360 A1 | 9/2016 | Kang et al. |
| 2016/0325837 A1 | 11/2016 | Erhel |
| 2017/0050538 A1 | 2/2017 | Akimoto |
| 2017/0050539 A1 | 2/2017 | Akimoto |
| 2017/0174229 A1 | 6/2017 | Mueller |
| 2017/0267124 A1 | 9/2017 | Numazawa et al. |
| 2018/0009348 A1 | 1/2018 | Deshmukh |
| 2018/0057169 A1 | 3/2018 | Phi |
| 2018/0105067 A1 | 4/2018 | Ajisaka |
| 2018/0111511 A1 * | 4/2018 | Lota .................... B60N 2/0244 |
| 2018/0134180 A1 | 5/2018 | Ajisaka |
| 2018/0165727 A1 | 6/2018 | Gaither |
| 2018/0186253 A1 | 7/2018 | Fitzpatrick et al. |
| 2018/0186266 A1 | 7/2018 | Fitzpatrick et al. |
| 2018/0186306 A1 | 7/2018 | Fitzpatrick et al. |
| 2018/0194194 A1 | 7/2018 | Lyubich |
| 2018/0194247 A1 | 7/2018 | Kim et al. |
| 2018/0222347 A1 | 8/2018 | Hirayama et al. |
| 2018/0229628 A1 | 8/2018 | Minato et al. |
| 2018/0272900 A1 | 9/2018 | Fitzpatrick et al. |
| 2018/0281623 A1 | 10/2018 | Matsumoto et al. |
| 2018/0304779 A1 | 10/2018 | Fitzpatrick et al. |
| 2018/0312082 A1 | 11/2018 | Lalague |
| 2018/0334062 A1 | 11/2018 | Park |
| 2018/0339663 A1 | 11/2018 | Beauregard |
| 2018/0370635 A1 | 12/2018 | Itzinger |
| 2019/0001841 A1 | 1/2019 | Vanel et al. |
| 2019/0016235 A1 | 1/2019 | Parida et al. |
| 2019/0023161 A1 | 1/2019 | Sullivan |
| 2019/0054843 A1 | 2/2019 | Gallitzdorfer |
| 2019/0084447 A1 | 3/2019 | Lee et al. |
| 2019/0126911 A1 | 5/2019 | Nienhueser |
| 2019/0135136 A1 | 5/2019 | Akaike et al. |
| 2019/0143845 A1 | 5/2019 | Akaike et al. |
| 2019/0146494 A1 | 5/2019 | Li |
| 2019/0160977 A1 | 5/2019 | Feng et al. |
| 2019/0168638 A1 | 6/2019 | Geiges et al. |
| 2019/0184875 A1 | 6/2019 | Gomez et al. |
| 2019/0193860 A1 | 6/2019 | Ehlers |
| 2019/0217796 A1 | 7/2019 | Takamatsu et al. |
| 2019/0217812 A1 | 7/2019 | Boese et al. |
| 2019/0225116 A1 | 7/2019 | Zhang et al. |
| 2019/0225159 A1 | 7/2019 | Lind |
| 2019/0225189 A1 | 7/2019 | Maeda et al. |
| 2019/0232786 A1 | 8/2019 | Sasaki et al. |
| 2019/0241193 A1 | 8/2019 | Sasaki et al. |
| 2019/0248236 A1 | 8/2019 | Sweet |
| 2019/0255972 A1 | 8/2019 | Breitweg et al. |
| 2019/0283632 A1 | 9/2019 | Hollingsworth |
| 2019/0291606 A1 | 9/2019 | Hodgson |
| 2019/0291679 A1 | 9/2019 | Niikuni et al. |
| 2019/0351800 A1 * | 11/2019 | Seibold ................ B60N 2/0224 |
| 2020/0086769 A1 * | 3/2020 | Aktas .................... B60N 2/3022 |
| 2020/0108744 A1 * | 4/2020 | Shiga ...................... A61G 3/02 |
| 2020/0406787 A1 * | 12/2020 | Line ...................... B60N 2/3045 |
| 2020/0406788 A1 * | 12/2020 | Line ...................... B60N 2/3047 |
| 2020/0406794 A1 * | 12/2020 | Kish ...................... B60N 2/0232 |
| 2021/0053468 A1 * | 2/2021 | Aktas ........................ B60N 2/07 |
| 2021/0309247 A1 * | 10/2021 | Kim .......................... B60N 2/14 |
| 2021/0380023 A1 * | 12/2021 | Kanitz ................. B60N 2/0292 |
| 2022/0032827 A1 * | 2/2022 | Salvia, III .............. B60N 2/309 |

FOREIGN PATENT DOCUMENTS

| | | | |
|---|---|---|---|
| CN | 206049426 U | 3/2017 | |
| CN | 107128217 A | 9/2017 | |
| CN | 107539168 A * | 1/2018 | .......... B60N 2/0232 |
| CN | 109878386 A | 6/2019 | |
| CN | 114954148 A * | 8/2022 | ............ B60W 40/08 |
| DE | 102014207288 A1 | 10/2015 | |
| DE | 102014214364 A1 | 2/2016 | |

(56) References Cited

FOREIGN PATENT DOCUMENTS

| | | |
|---|---|---|
| EP | 1834833 A2 | 9/2007 |
| GB | 2523817 A | 9/2015 |
| GB | 2554693 A | 4/2018 |
| JP | 2001105939 A | 4/2001 |
| JP | 2004346093 A | 12/2004 |
| JP | 2015209193 A | 11/2015 |
| JP | 2018188149 A | 11/2018 |
| JP | 2019018723 A | 2/2019 |
| WO | 2015122208 A1 | 8/2015 |
| WO | WO-2017053503 A1 * | 3/2017 ........... B60N 2/0228 |

* cited by examiner

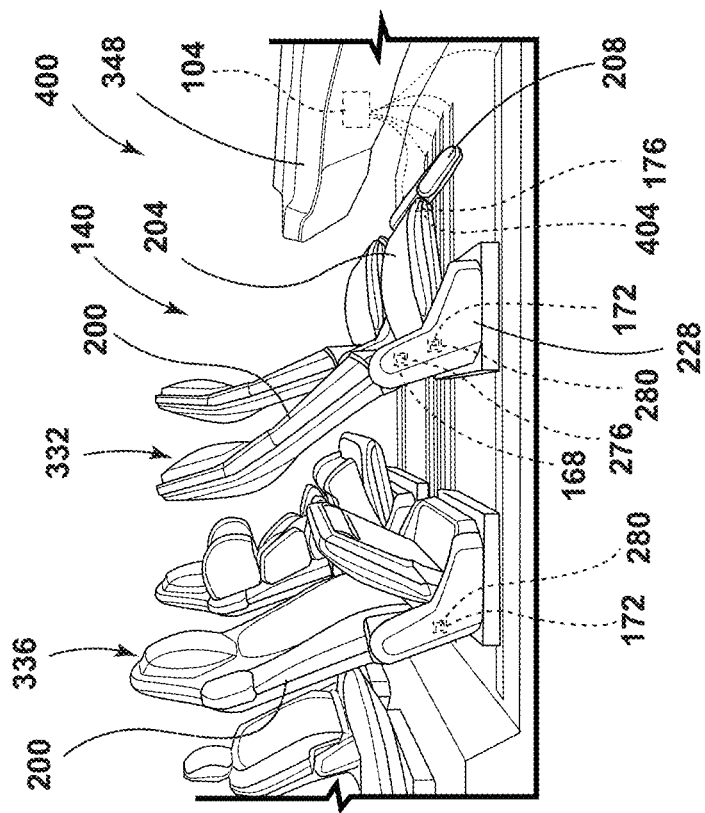
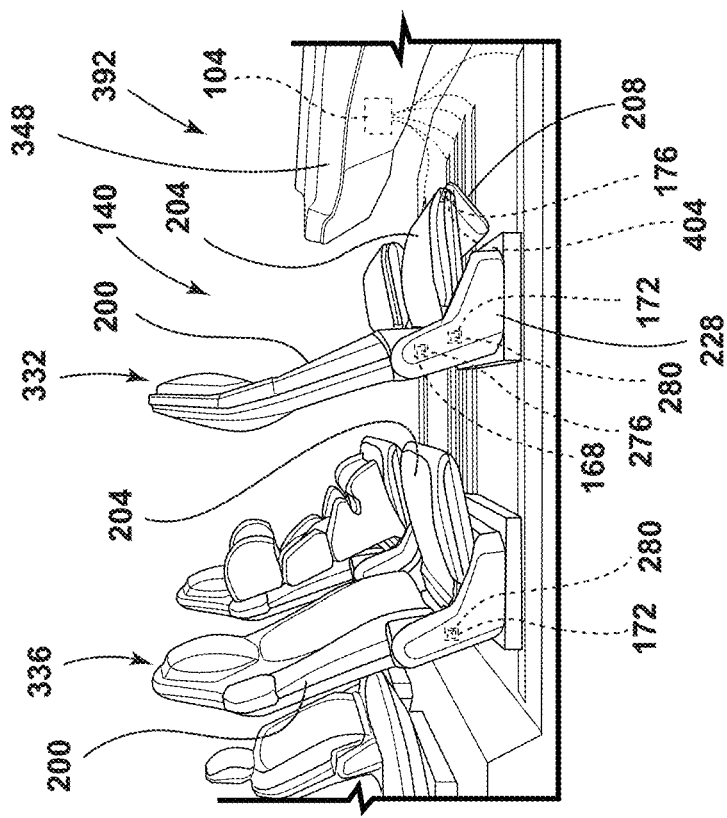

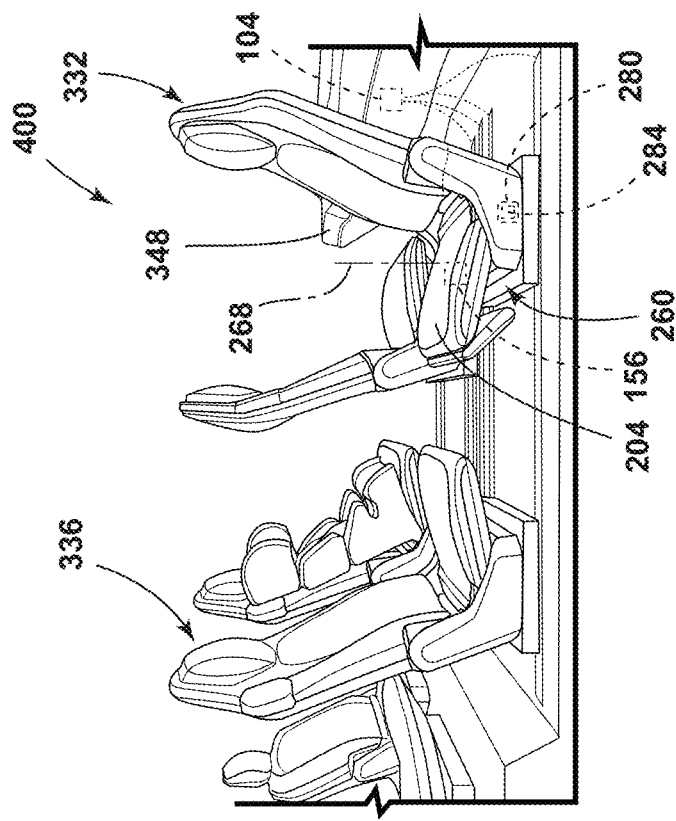
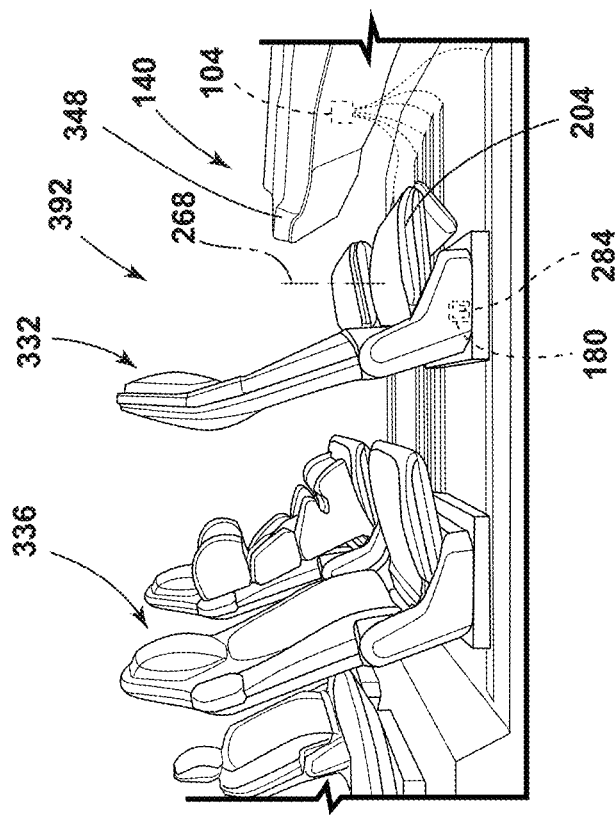
FIG. 16A
FIG. 16B

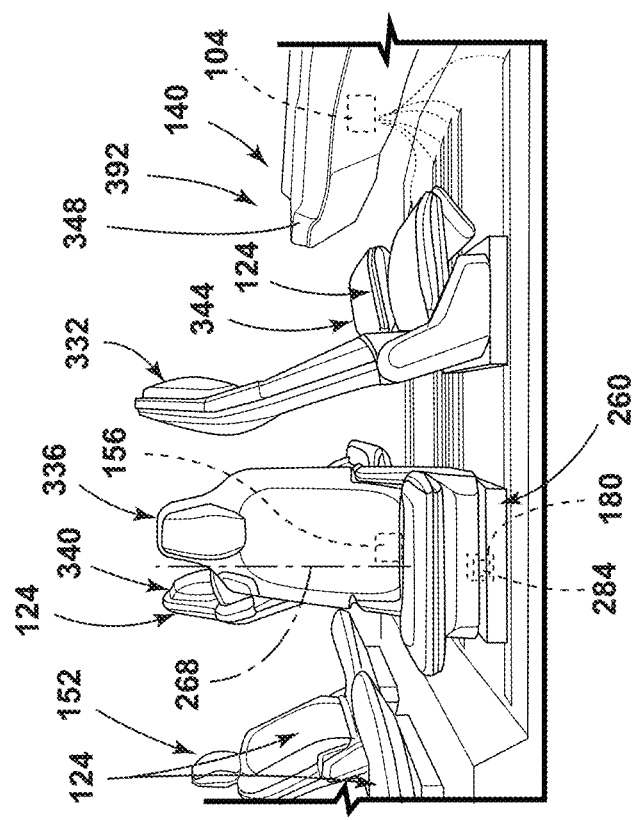
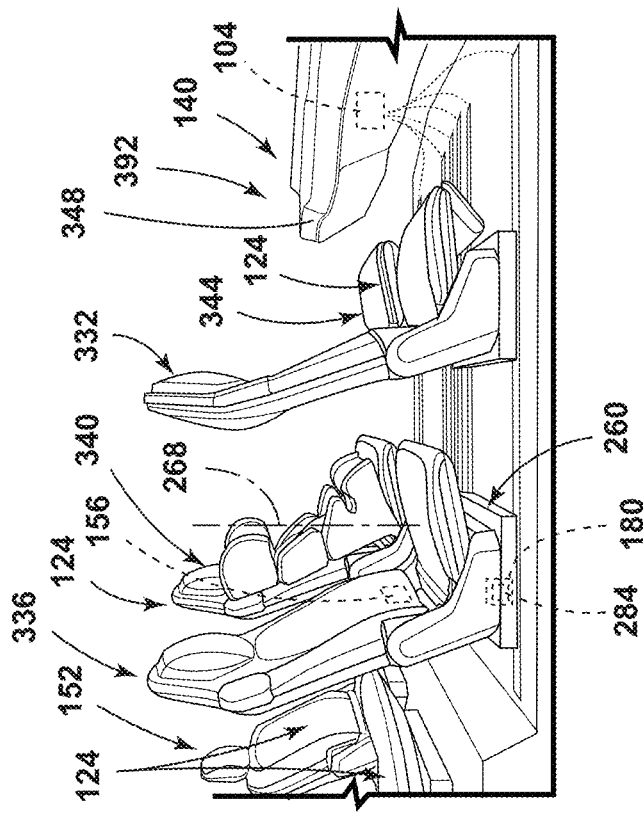
FIG. 20A
FIG. 20B

VEHICULAR SYSTEM CAPABLE OF ADJUSTING A PASSENGER COMPARTMENT FROM A CHILD CARE ARRANGEMENT TO A SECOND ARRANGEMENT

FIELD OF THE DISCLOSURE

The present disclosure generally relates to a vehicle. More specifically, the present disclosure relates to a seating arrangement within a passenger compartment of the vehicle.

BACKGROUND OF THE INVENTION

Passenger compartments of vehicles are typically provided with a plurality of seating assemblies. The positioning of the plurality of seating assemblies within the passenger compartment can define a seating arrangement. However, existing approaches of passenger compartment design tend to be limited to merely adjusting an overall seating capacity of the passenger compartment by removal or stowage of one or more of the plurality of seating assemblies. The present disclosure seeks to provide additional arrangements within the passenger compartment, as well as methods for executing the same.

SUMMARY OF THE INVENTION

According to a first aspect of the present invention, a vehicle includes a passenger compartment, an access door, first and second seating assemblies, and a controller. The access door separates the passenger compartment from a vehicle-exterior environment. The access door is movable between an open position and a closed position. The second seating assembly is positioned vehicle-rearward of the first seating assembly. The first and second seating assemblies each include a seatbase, a seat, a seat actuator, a seatback, a seatback actuator, a swivel assembly, and a swivel actuator. The seat has a first end and a second end. The seat is movably coupled to the seatbase at the second end of the seat such that the seat is movable between an upwardly-stowed position and a downwardly-deployed position. The seat actuator adjusts an angular position of the seat relative to the seatbase. The seatback is movably coupled to the seatbase proximate to the second end of the seat. A seating surface of the seat and the seatback is configured to receive an occupant. The seatback actuator adjusts an angular position of the seatback relative to the seatbase. The swivel assembly is coupled to the seatbase. The swivel actuator is engaged with the swivel assembly such that the seatbase is rotatable about a vertical axis. A swivel position sensor that monitors a rotational position of the seatbase about the vertical axis. The controller receives request signals from a user interface and transmits instruction signals to at least one component of the seating assembly, the at least one component chosen from the seat actuator, the seatback actuator, and the swivel actuator. The controller adjusts a seating arrangement from a first arrangement to a second arrangement in response to the transmitted instruction signals, with the first arrangement being a child care arrangement.

Embodiments of the first aspect of the invention can include any one or a combination of the following features:
the child care arrangement is defined as the seat of the second seating assembly being in the upwardly-stowed position and the first seating assembly being actuated from a forward region of the passenger compartment toward a central region of the passenger compartment such that the first and second seating assemblies are each positioned in the central region of the passenger compartment;
a third seating assembly positioned vehicle-rearward of the first seating assembly and laterally adjacent to the second seating assembly;
the second arrangement is a design arrangement with each of the first, second, and third seating assemblies oriented in a forward-facing direction;
a floor positioned in a lower region of the passenger compartment and a rail system positioned in the floor and extending along a longitudinal direction of the vehicle;
each of the first and second seating assemblies further includes a translation actuator coupled to the seatbase and engaged with the rail system, the translation actuator being capable of adjusting a position of an associated one of the first and second seating assemblies along the rail assembly;
the second arrangement is a cargo arrangement, wherein the cargo arrangement is defined as the seats of the first and second seating assemblies being placed in the upwardly-stowed position, the cargo arrangement further defined as the first and second seating assemblies being positioned toward a forward region of the passenger compartment;
the controller actuates the first and second seating assemblies along the rail system in a vehicle-forward direction, wherein the controller actuates the seat of the first seating assembly to the upwardly-stowed position;
the second arrangement is an ingress/egress arrangement, wherein the ingress/egress arrangement is defined as the seat of the second seating assembly being placed in the upwardly-stowed position, the ingress/egress arrangement further defined as the second seating assembly being positioned along the rail system toward a forward region of the passenger compartment; and
the controller actuates the first and second seating assemblies along the rail system in a vehicle-forward direction to accomplish the second arrangement.

According to a second aspect of the present disclosure, a method of adjusting a passenger compartment arrangement of a vehicle includes providing the vehicle with a first seating assembly, a second seating assembly, and a third seating assembly, the second seating assembly being positioned rearward of the first seating assembly, the third seating assembly being positioned rearward of the first seating assembly and laterally adjacent to the second seating assembly, the first, second, and third seating assemblies each include a seat and a seatback that define a seating surface configured to receive an occupant. The method also includes receiving a request from a user interface to transition an arrangement of the passenger compartment of the vehicle from a first arrangement to a second arrangement, wherein the first arrangement is a child care arrangement. The method further includes detecting a first current rail position of the first seating assembly along a rail system within the passenger compartment of the vehicle with a first rail sensor. Additionally, the method includes comparing the first current rail position of the first seating assembly with a first desired rail position and determining a first rail positional difference. Further, the method includes, in response to the first rail positional difference, activating a first translation actuator of the first seating assembly to align the first seating assembly with the first desired rail position. The method also includes detecting a current seat position of the second seating assembly with a seat position sensor. The method further includes comparing the current seat position of the second seating assembly to a desired seat position and determining a seat positional difference. Additionally, the method includes, in response to the seat positional difference, activating a seat actuator of the second seating assembly to align the seat of the second seating assembly with the desired seat position. Further, the method includes detecting a first current swivel position of the first seating assembly with a first swivel position sensor. The method also includes comparing the first current swivel position to a first desired swivel position and determining a first swivel positional difference. The method further includes, in response to the first swivel positional difference, activating a first swivel actuator of the first seating assembly to align the first seating assembly with the first desired swivel position.

Embodiments of the second aspect of the present disclosure can include any one or a combination of the following features:

- the child care arrangement is defined as the seat of the second seating assembly being in an upwardly-stowed position and the first seating assembly being actuated from a forward region of the passenger compartment toward a central region of the passenger compartment such that the first and second seating assemblies are each positioned in the central region of the passenger compartment;
- the child care arrangement is further defined as the first seating assembly being rotated about a vertical axis toward the third seating assembly;
- the step of activating a first translation actuator of the first seating assembly to align the first seating assembly with the first desired rail position includes actuating the first seating assembly to the forward region of the passenger compartment;
- the step of activating a seat actuator of the second seating assembly to align the seat of the second seating assembly with the desired seat position includes actuating the seat of the second seating assembly to a downwardly-deployed position, wherein the second arrangement is a design arrangement, the design arrangement defined as each of the first, second, and third seating assemblies oriented in a forward-facing direction with their corresponding seats in the downwardly-deployed position;
- the step of activating a seat actuator of the second seating assembly to align the seat of the second seating assembly with the desired seat position includes actuating the seat of the second seating assembly to a downwardly-deployed position, wherein the step of activating a first swivel actuator of the first seating assembly to align the first seating assembly with the first desired swivel position includes rotating the first seating assembly about a vertical axis such that the first seating assembly is placed in a rearward-facing orientation, and wherein the second arrangement is a social arrangement, the social arrangement defined as the first and second seating assemblies having their corresponding seats in the downwardly-deployed position, the first seating assembly being in a rearward-facing orientation and the second seating assembly being in a forward-facing orientation;
- activating a second swivel actuator of the second seating assembly to position the second seating assembly in a side-facing orientation, wherein the step of activating a seat actuator of the second seating assembly to align the seat of the second seating assembly with the desired seat position includes actuating the seat of the second seating assembly to a downwardly-deployed position, and wherein the second arrangement is a child seat arrangement, the child seat arrangement defined as the second seating assembly oriented in a side-facing direction toward with the seat of the second seating assembly in the downwardly-deployed position;
- detecting a second current rail position of the second seating assembly along a rail system within the passenger compartment of the vehicle with a second rail sensor, comparing the second current rail position of the second seating assembly with a second desired rail position and determining a second rail positional difference, in response to the second rail positional difference, activating a second translation actuator of the second seating assembly to align the second seating assembly with the second desired rail position, activating a seat actuator of the first seating assembly to place the seat of the first seating assembly in an upwardly-stowed position, wherein the step of activating a second translation actuator of the second seating assembly to align the second seating assembly with the second desired rail position includes actuating the second seating assembly to the forward region of the passenger compartment, and wherein the second arrangement is a cargo arrangement, the cargo arrangement defined as the seats of the first and second seating assemblies each being place in an upwardly-stowed position and the first and second seating assemblies being positioned within the forward region of the passenger compartment;
- detecting a second current rail position of the second seating assembly along a rail system within the passenger compartment of the vehicle with a second rail sensor, comparing the second current rail position of the second seating assembly with a second desired rail position and determining a second rail positional difference, in response to the second rail positional difference, activating a second translation actuator of the second seating assembly to align the second seating assembly with the second desired rail position, wherein the step of activating a second translation actuator of the second seating assembly to align the second seating assembly with the second desired rail position includes actuating the second seating assembly toward the forward region of the passenger compartment, and wherein the second arrangement is an ingress/egress arrangement, the ingress/egress arrangement defined as the seat of the second seating assembly being place in an upwardly-stowed position and the second seating assembly being positioned toward the forward region of the passenger compartment; and
- detecting a current seatback position of the first seating assembly with a seatback position sensor, comparing the current seatback position of the first seating assembly to a desired seatback position and determining a seatback positional difference, in response to the seatback positional difference, activating a seatback actuator of the first seating assembly to align the seatback of the first seating assembly with the desired seatback position, detecting a first current seat position of the first seating assembly with a first seat position sensor, comparing the first current seat position of the first seating assembly to a first desired seat position and determining a first seat positional difference, in response to the seat positional difference, activating a seat actuator of the first seating assembly to align the seat of the first seating assembly with the desired seat position, detecting a current lower leg support position of the first seating assembly with a lower leg support position sensor, comparing the current lower leg support position of the first seating assembly to a desired lower leg support position and determining a lower leg support positional difference, in response to the lower leg support positional difference, activating a lower leg support actuator of the first seating assembly to align the lower leg support of the first seating assembly with the desired lower leg support position, and wherein the second arrangement is a relaxation arrangement, the relaxation arrangement defined as the seatback of the first seating assembly being in a reclined position, the seat of the first seating assembly being in an inclined position, and the lower leg support being in a deployed position.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 14A is a side view of the passenger compartment, illustrating a first seating assembly and a second seating assembly in the design arrangement, according to one example;

FIG. 14B is a side view of the passenger compartment, illustrating the first seating assembly and the second seating assembly in the relaxation arrangement, according to one example;

FIG. 16A is a side view of the passenger compartment, illustrating the first seating assembly and the second seating assembly in the design arrangement, according to one example;

FIG. 16B is a side view of the passenger compartment, illustrating the first seating assembly and the second seating assembly in the social arrangement, according to one example;

FIG. 20A is a side view of the passenger compartment, illustrating the first seating assembly and the second seating assembly in the design arrangement, according to one example;

FIG. 20B is a side view of the passenger compartment, illustrating the first seating assembly and the second seating assembly in the child seat arrangement, according to one example;

DETAILED DESCRIPTION OF THE PREFERRED EMBODIMENTS

Figure 6:
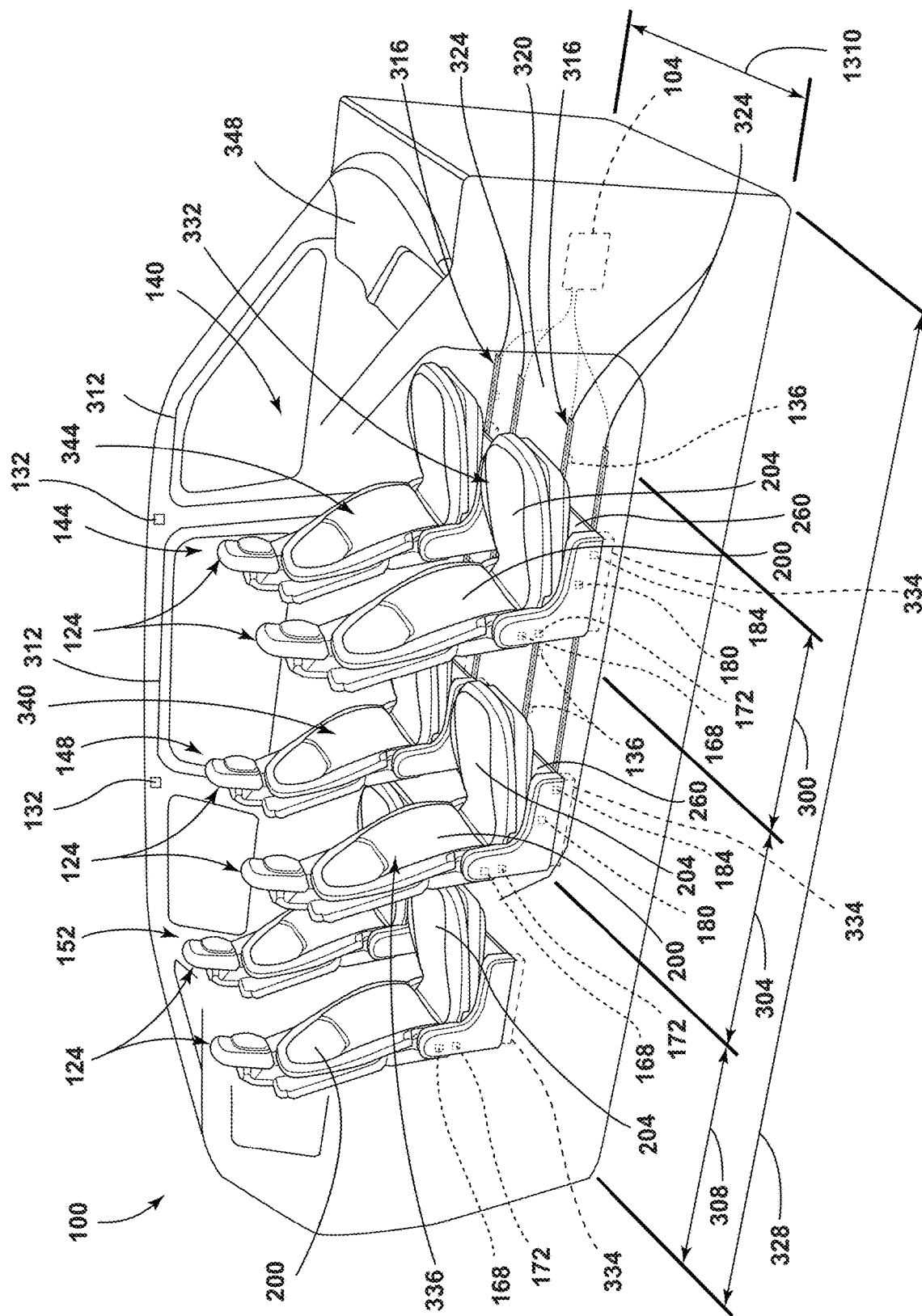
FIG. 6 is a side perspective of the vehicle, illustrating a design arrangement, according to one example.

For purposes of description herein, the terms "upper," "lower," "right," "left," "rear," "front," "vertical," "horizontal," and derivatives thereof shall relate to the concepts as oriented in FIG. 6. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle system that is capable of adjusting a passenger compartment arrangement. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 1:
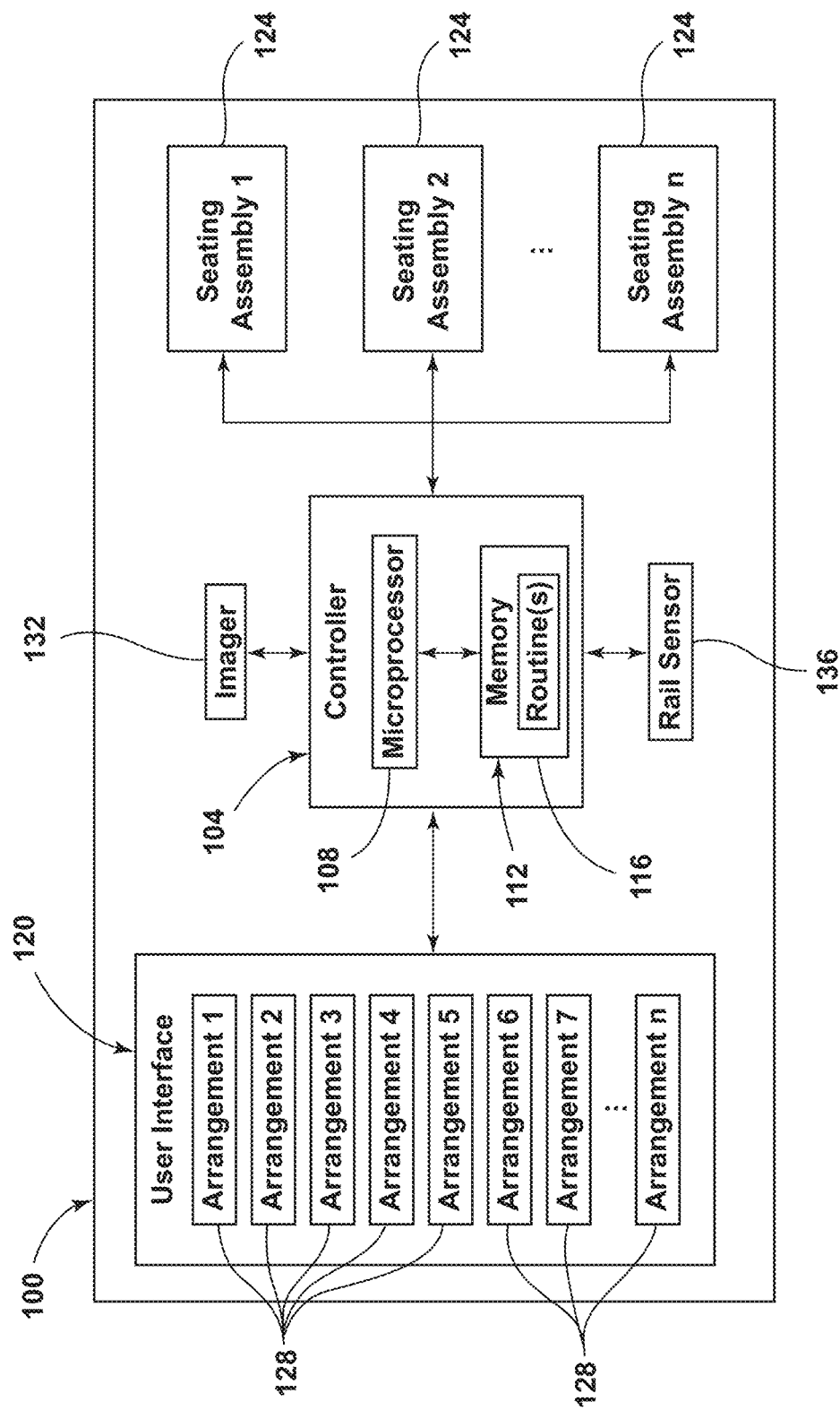
FIG. 1 is a schematic representation of a vehicle, illustrating communication between a user interface, a controller, and a plurality of seating assemblies, according to one example.
Figure 2:
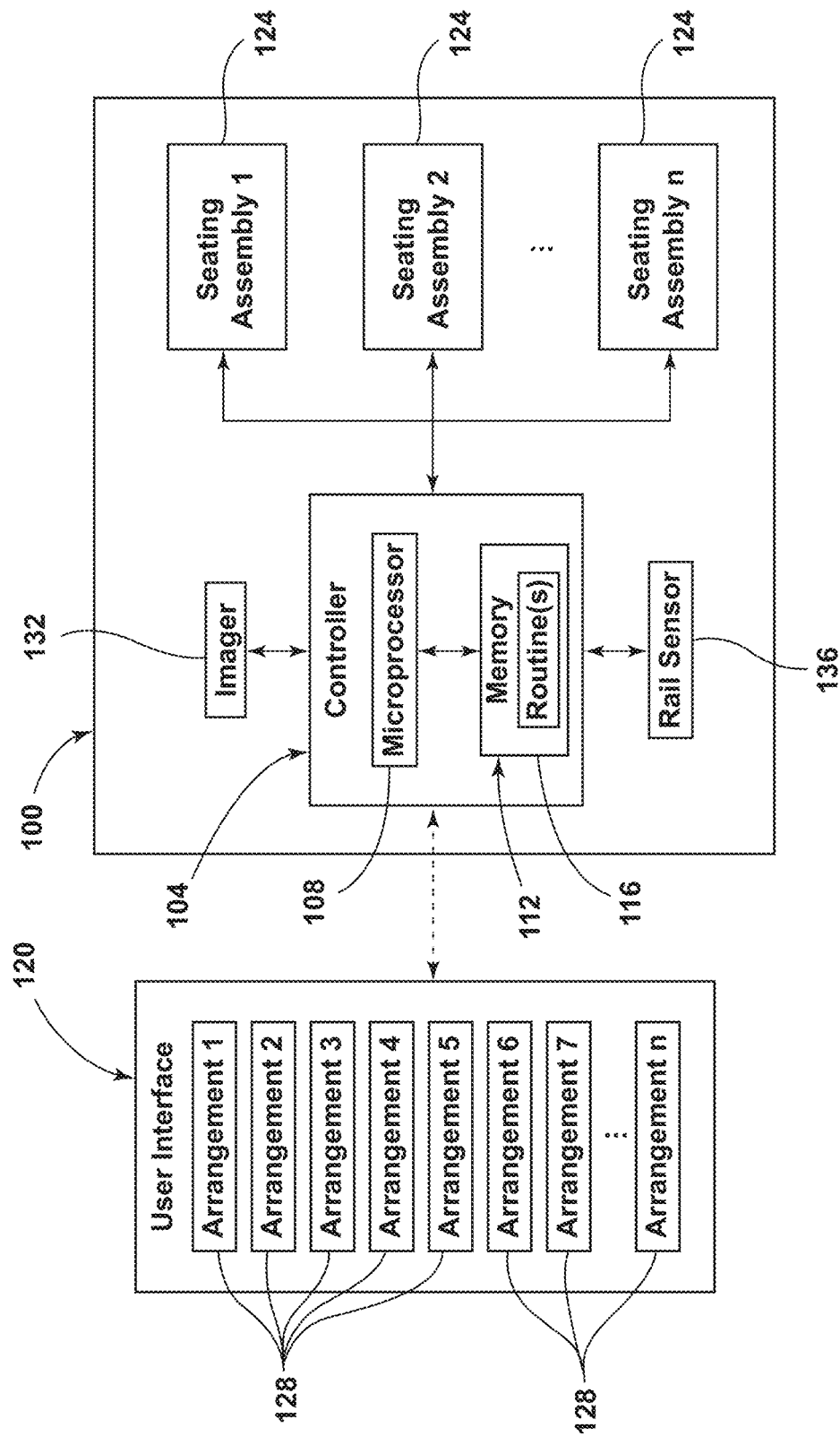
FIG. 2 is a schematic representation of the vehicle, illustrating communication between the user interface, the controller, and the plurality of seating assemblies, according to another example.

Referring to FIGS. 1 and 2, a vehicle 100 includes a controller 104. The vehicle 100 may be a motor vehicle in various examples. For example, the motor vehicle may be an automobile (e.g., personal vehicle, public transit, etc.), an aircraft, a watercraft, a train, or any other mode of transportation capable of carrying passengers and/or cargo. While referred to as a motor vehicle in various examples, the vehicle 100 is not limited to internal combustion engines as a source of locomotive power. Rather, electric motors, fuel cells, hybrid electric vehicles, plug-in electric vehicles, and so on are within the scope of the present disclosure. The controller 104 includes a microprocessor 108 and memory 112. The memory 112 stores programmed software routines 116 that are executable by the microprocessor 108 and utilized to process signals and inputs and to move or adjust components of the vehicle 100 (e.g., positions of various actuators, comfort settings for users, climate settings for users, and so on). The controller 104 may include analog and/or digital circuitry such as in the form of the microprocessor 108, according to one example. The controller 104 is communicatively coupled to a user interface 120. In some examples, the user interface 120 may be positioned on-board the vehicle 100 such that when the vehicle 100 changes a geographical location, the user interface 120 maintains the same geographical location as the vehicle 100 (see FIG. 1). Additionally or alternatively, the user interface 120 may be provided as a component that is separate from the vehicle 100 and may be external to the vehicle 100 (see FIG. 2). For example, the user interface 120 may be a mobile electronic device (e.g., a user's personal smart phone, a user's personal computing device, a designated kiosk, and so on). In examples where the user interface 120 is provided both on-board the vehicle 100 and as a separate component of the vehicle 100 (e.g., the user's personal smart phone), the controller 104 may be accessed by either of the user interfaces 120 such that a current user of the vehicle 100 may adjust the various components in communication with the controller 104 while the current user is occupying the vehicle 100 without being limited to needing to be within arm's reach of the on-board user interface 120. Providing the user interface 120 on-board the vehicle 100, as well as providing the capability for the user interface 120 to be an external component to the vehicle 100 may provide a degree of redundancy for users that enables greater access to users. For example, users that have access to one of the user interfaces 120 that are external to the vehicle 100 can be provided with the freedom to adjust the components of the vehicle 100 that are communicatively coupled to the controller 104 without necessarily currently occupying the vehicle 100, while allowing other users that do not have access to the user interfaces 120 that are external to the vehicle 100 to operate the user interface 120 that is on-board the vehicle 100 (e.g., users without a personal smartphone). The controller 104 is also communicatively coupled to a plurality of seating assemblies 124. The plurality of seating assemblies 124 may be any number of seating assemblies 124 that is greater than one seating assembly 124, such as two or more seating assemblies 124.

Referring again to FIGS. 1 and 2, in general, the user interface 120 can present information to a user relating to the various components of the vehicle 100. For example, the user interface 120 may present the user with information relating to positions and/or settings of various components of the vehicle 100 that may be adjusted or moved by the controller 104 in response to actions or requests made by the user. One such example of movable or adjustable components of the vehicle 100 that may be controlled or dictated by the user can include adjusting an arrangement of a passenger compartment of the vehicle 100. For example, the user interface 120 may present the user with a variety of preset and/or customizable arrangements 128 of the passenger compartment of the vehicle 100. When the user selects one of the arrangements 128 provided on the user interface 120, the controller 104 may receive a request signal from the user interface 120 and transmit corresponding instruction signals to effect the arrangement 128 selected by the user. The instruction signals transmitted by the controller 104 can result in the execution of the adjustment of the arrangement of the passenger compartment of the vehicle 100 by altering positions of individual components of the plurality of seating assemblies 124 and/or altering relative positions of the plurality of seating assemblies 124 relative to one another. The request signals received by the controller 104 from the user interface 120 may be executed by the microprocessor 108 and/or the memory 112 to implement the transition of the arrangement 128 of the passenger compartment of the vehicle 100. For example, the passenger compartment of the vehicle 100 may be in a first arrangement with regard to the plurality of seating assemblies 124, with the first arrangement being a preset arrangement (e.g., a design arrangement, a social arrangement, a cargo arrangement, a child care arrangement, a child seat arrangement, an ingress/egress arrangement, a relaxation arrangement, and so on). The user may select an alternative one of the plurality of arrangements 128, which may be a preset arrangement, by interacting with the user interface 120. As the first arrangement and the second arrangement in this specific example are both preset arrangements, the request signal from the user interface 120 may be received by the microprocessor 108 of the controller 104. Next, the microprocessor 108 may execute the routines 116 stored in the memory 112. Accordingly, the controller 104 may process the request signal from the user interface 120 and control adjustment of the plurality of seating assemblies 124 from the first arrangement to the second arrangement by executing the routines 116 stored within the memory 112 for making such an adjustment.

Referring further to FIGS. 1 and 2, it is contemplated that the controller 104 may process signals received from a plurality of sensors and/or data sources in determining which of a plurality of actuators may need to be activated, and to what extent the actuator may need to be activated, to effect the execution of placing the passenger compartment of the vehicle 100 in the second arrangement. Similarly, the controller 104 may process signals received from a plurality of sensors and/or data sources that are utilized to determine an authorization status for a given movement of a given component of one of the plurality of seating assemblies 124. For example, some of the sensors and/or data sources may include an imager 132, a rail sensor 136, an optical sensor, an infrared sensor, a force sensor (e.g., a load cell), and/or machine learning, as will be discussed in further detail herein. The imager 132, when employed, may be oriented with a field of view toward a region of the passenger compartment and/or with a field of view oriented toward an exterior of the vehicle 100. One or more of the imagers 132 may be employed in various examples (e.g., interior-viewing imager 132 and/or exterior-viewing imager 132). The rail sensor 136, when employed, can provide the controller 104 with information relating to a position of each of the plurality of seating assemblies 124 along a rail system, as will be discussed in further detail herein. The rail system may be positioned within a floor of the passenger compartment. The sensors and/or data sources discussed in the present disclosure to inform the controller 104 about a position of each of the various components of the vehicle 100 that may be adjusted or altered by a user are exemplary in nature and not intended to be limiting. Rather, the sensors and/or data sources are intended to convey illustrative examples of the types of components that may be monitored and/or controlled in executing the adjustments to the arrangement of the passenger compartment of the vehicle 100 disclosed herein.

Figure 3:
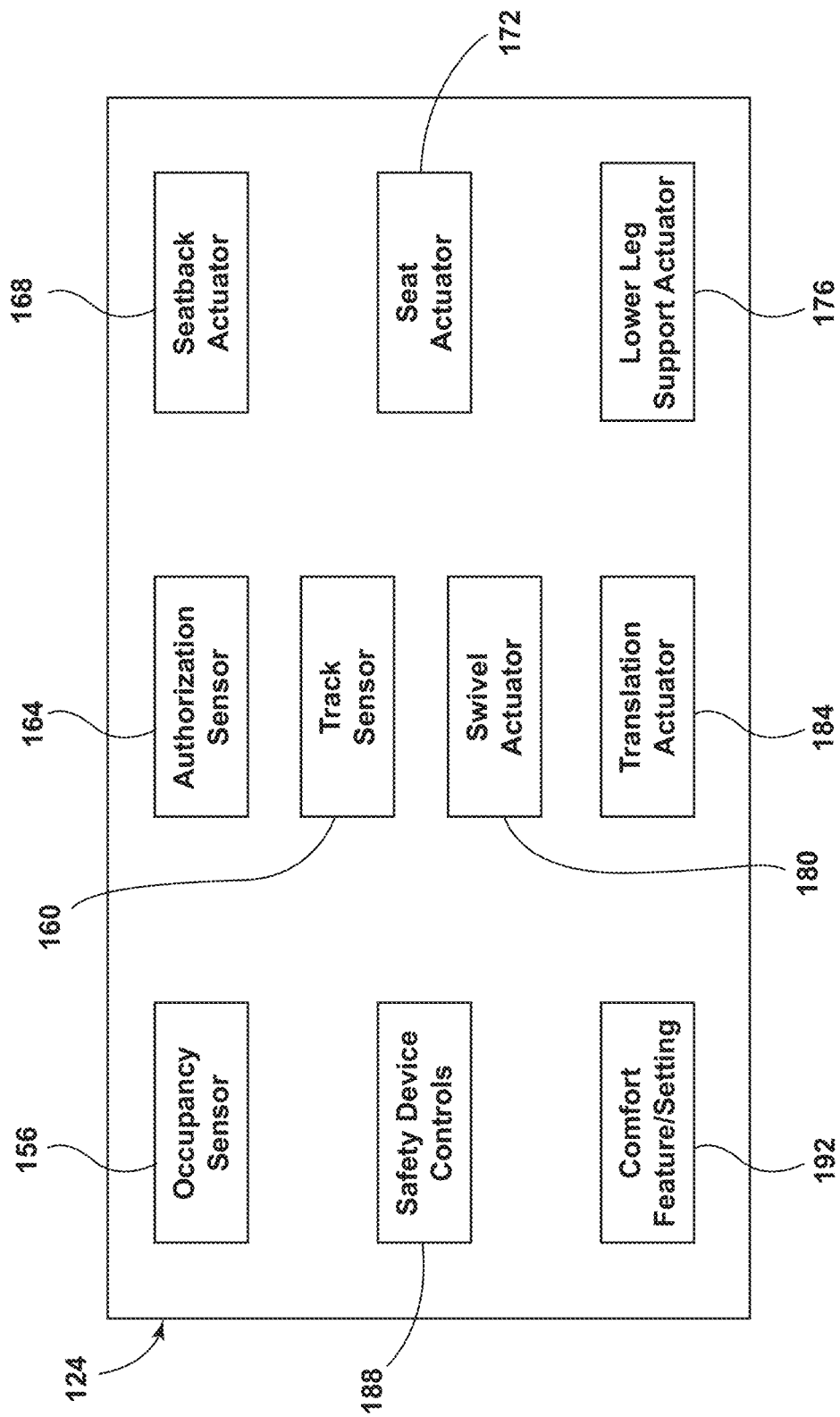
FIG. 3 is a schematic representation of one of the plurality of seating assemblies, illustrating components of the seating assembly, according to one example.
Figure 4:
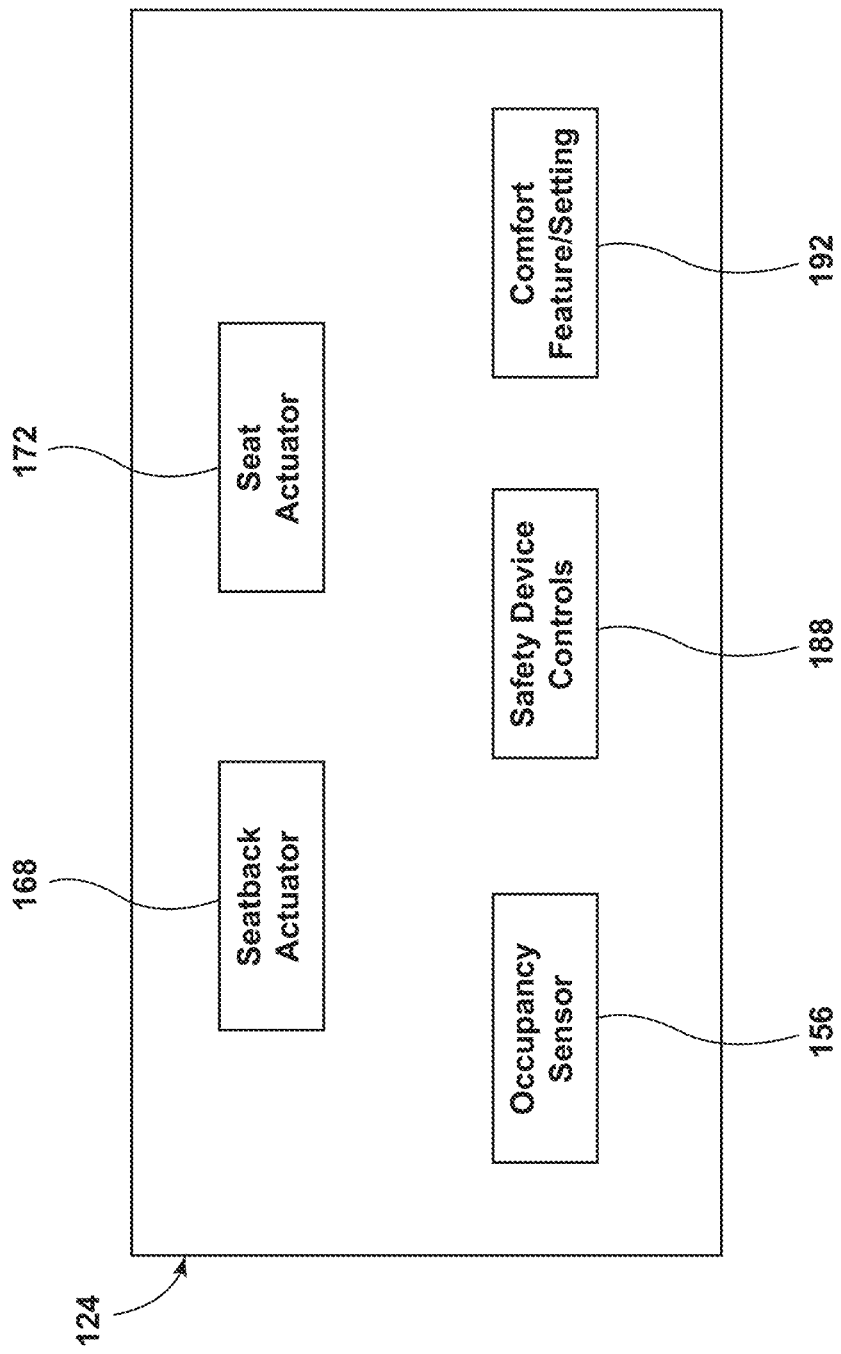
FIG. 4 is a schematic representation of one of the plurality of seating assemblies, illustrating components of the seating assembly, according to another example.

Referring to FIGS. 3 and 4, each of the plurality of seating assemblies 124 are provided with a variety of sensors and actuators that may be controlled by the interaction between the user interface 120 and the controller 104. As will be discussed in further detail herein, a passenger compartment 140 of the vehicle 100 may be provided with the plurality of seating assemblies 124 positioned in a first row 144, a second row 148, and/or a third row 152 (see FIG. 6). It is contemplated that depending on the position of a given one of the plurality of seating assemblies 124 within the passenger compartment 140 of the vehicle 100, greater or fewer sensors and/or actuators may be employed. For example, each of the plurality of seating assemblies 124 positioned in the first row 144 and the second row 148 may be provided with a greater degree of movement within the passenger compartment 140 of the vehicle 100 when compared to each of the plurality of seating assemblies 124 that may be positioned in the third row 152. For example, the third row 152 may be vertically elevated when compared to the first and second rows 144, 148 such that a floor of the passenger compartment 140 is contoured. In such an example, the seating assemblies 124 positioned within the third row 152 may be more spatially confined than the seating assemblies 124 in the first and second rows 144, 148. In some examples, the floor of the passenger compartment 140 may be flat or less contoured such that the seating assemblies 124 in the third row 152 may be provided with the same degree of movement as the seating assemblies 124 positioned in the first and second rows 144, 148. As shown in FIG. 3, the seating assemblies 124 that are positioned in the first row 144 and the second row 148 may each be provided with an occupancy sensor 156 that may inform the controller 104 of an occupancy status of the given seating assembly 124, a track sensor 160 that monitors regions of the rail system that are in front of and/or behind the given seating assembly 124 and/or interacts with the rail sensors 136 to determine a current rail position of the seating assembly 124, and/or an authorization sensor 164 that monitors an immediately adjacent vicinity of the seating assembly 124 to determine the presence or absence of obstructions to movement of various components of the seating assembly 124. In some examples, the track sensor 160 may be utilized as the authorization sensor 164. Actuators that may be provided on the seating assemblies 124 positioned in the first row 144 and the second row 148 may include, but are not limited to, a seatback actuator 168, a seat actuator 172, a lower leg support actuator 176, a swivel actuator 180, and/or a translation actuator 184. The seating assemblies 124 position the first row 144 and a second row 148 that can be provided with safety device controls 188 (e.g. seatbelt retractors, airbags, and so on), as well as comfort features/settings 192 (e.g., heated surfaces, ventilated surfaces, adjustable bolsters, and so on). The seating assemblies 124 that are positioned in the third row 152 of the passenger compartment 140 may be provided with a lesser degree of adjustability when compared to the seating assemblies 124 positioned in the first and second rows 144, 148. For example, the seating assemblies 124 positioned in the third row 152 may include, but are not limited to, the occupancy sensor 156, the seatback actuator 168, the seat actuator 172, the safety device controls 188, and/or the comfort features/settings 192.

Figure 5:
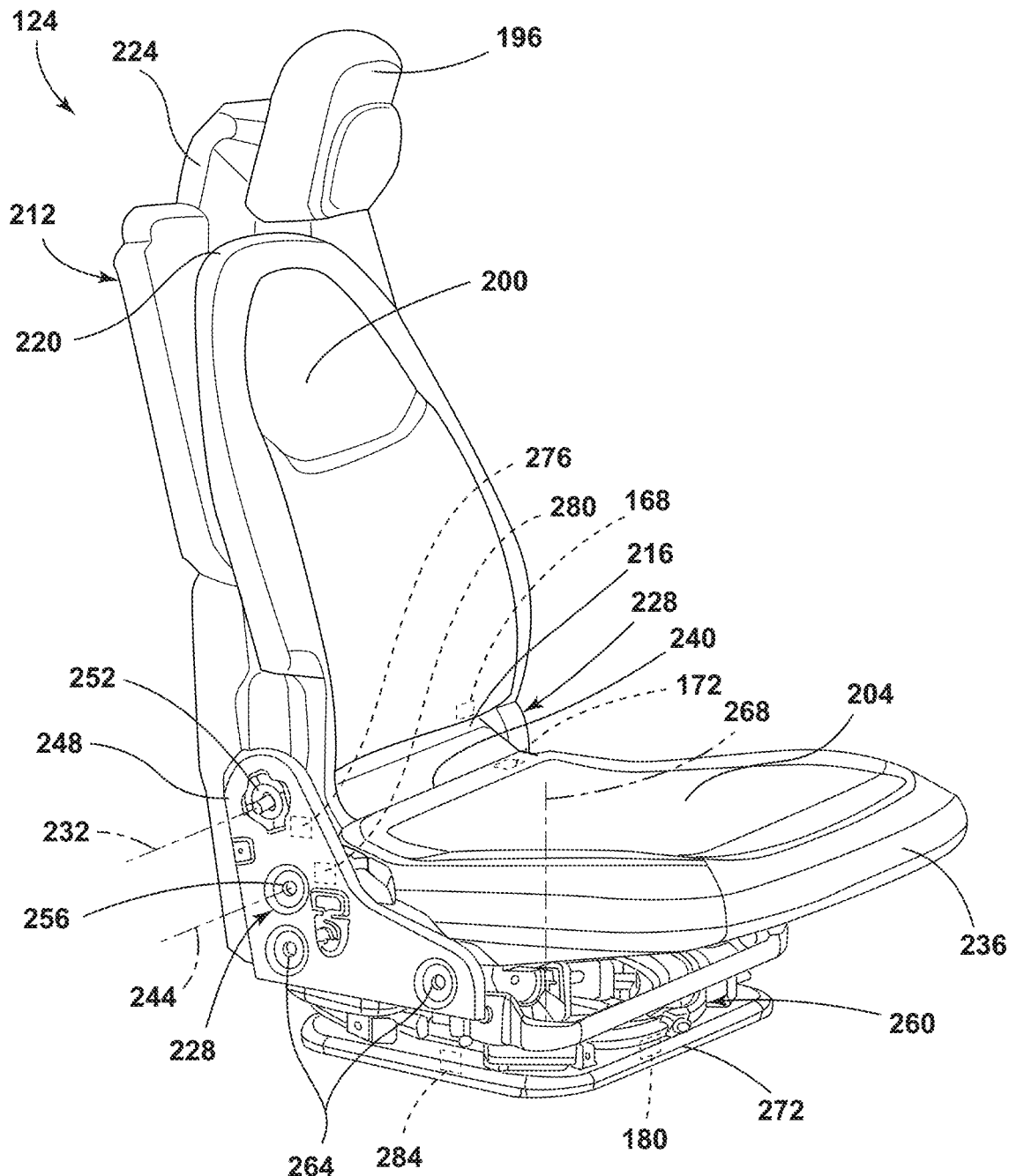
FIG. 5 is a side perspective view of one of the plurality of seating assemblies, according to one example.

Referring now to FIG. 5, one of the plurality of seating assemblies 124 is illustrated according to various examples. The seating assembly 124 includes a headrest 196, a seatback 200, and a seat 204. In some examples, the seating assembly 124 may further include a lower leg support 208 (see FIG. 7), as will be discussed in further detail herein. The headrest 196 may be suspended above the seatback 200. More specifically, the seating assembly 124 includes a seatback support member 212 that may extend along a rearward surface of the seatback 200 with adjacent surfaces of the seatback 200 and the seatback support member 212 diverging from one another as a distance is increased from a lower portion 216 of the seatback 200 toward an upper portion 220 of the seatback 200. The seatback support member 212 includes a headrest support tube 224 that extends vertically above the upper portion 220 of the seatback 200. The headrest 196 can be coupled to the headrest support tube 224 such that the headrest 196 is suspended above the upper portion 220 of the seatback 200 without the headrest 196 making physical contact with the upper portion 220 of the seatback 200. In some examples, the headrest 196, the seatback support member 212, and the headrest support tube 224 may each be free of engagement with the upper portion 220 of the seatback 200.

Referring again to FIG. 5, the seating assembly 124 includes a seatbase 228. The seatback 200, the seat 204, and the seatback support member 212 are each coupled to the seatbase 228. The seatback 200 is coupled to the seatbase 228 proximate to the lower portion 216 of the seatback 200. The seatback 200 is movably coupled to the seatbase 228 such that the seatback 200 may rotate or pivot about a seatback rotation axis 232. The seat 204 includes a first end 236 and a second end 240. The seat 204 is coupled to the seatbase 228 at the second end 240 of the seat 204. The seat 204 is movably coupled to the seatbase 228 such that the seat 204 is pivotable or rotatable about a seat rotation axis 244. The pivotable or rotatable coupling of the seat 204 to the seatbase 228 allows the seat 204 to be movable between an upwardly-stowed position (see FIGS. 9, 11, and 12) and a downwardly-deployed position, as depicted here. The movement of the seat 204 between the upwardly-stowed position and the downwardly-deployed position may be referred to as a stadium-style seat. The seatbase 228 may include brackets 248 that are positioned on lateral sides of the seating assembly 124. The seatback 200 and the seat 204 are mounted to the brackets 248 at a seatback coupling point 252 and a seat coupling point 256, respectively. The seatback coupling point 252 may define the seatback rotation axis 232. Similarly, the seat coupling point 256 may define the seat rotation axis 244. In various examples, the seating assembly 124 may include a swivel assembly 260. The swivel assembly 260 may be mounted to the brackets 248 of the seatbase 228 at swivel coupling points 264. The swivel assembly 260 may be of a concentric ring design with an upper ring rotating with the seat 204 about a vertical axis 268 when the swivel assembly 260 is rotated and a lower ring coupled to a swivel platform 272 and the lower ring remaining stationary as the swivel assembly 260 is rotated about the vertical axis 268.

Referring further to FIG. 5, the seating assembly 124 includes a seatback position sensor 276 that monitors a current position of the seatback 200, a seat position sensor 280 that monitors a current position of the seat 204, and a swivel position sensor 284 that monitors a rotational position of the swivel assembly 260 about the vertical axis 268. The seating assembly 124 also includes a seatback actuator 168 that can adjust an angular position of the seatback 200 relative to the seatbase 228, a seat actuator 172 that can adjust an angular position of the seat 204 relative to the seatbase 228, and a swivel actuator coupled to the swivel assembly 260 such that the swivel assembly 260, and ultimately the seating assembly 124, is rotatable about the vertical axis 268. It is contemplated that the seatback actuator 168, the seat actuator 172, and the swivel actuator 296 may each be provided with their corresponding position sensor (seatback position sensor 276, seat position sensor 280, and swivel position sensor 284, respectively) as integrated components therein. In some examples, the seating assembly 124 may be provided with the lower leg support actuator 176 that adjusts an angular orientation of the lower leg support 208 relative to the seat 204, with the lower leg support 208 being operable between a retracted position and an extended position. The various actuators (e.g., seat actuator 172, seatback actuator 168, swivel actuator 180, and/or lower leg support actuator 176) may be provided with sensors incorporated therein or otherwise associate therewith to track a current position of the actuator and/or monitor movements of the actuator such that the control 104 can determine when actuation should be ceased. The sensors can include, but are not limited to, Hall-effect sensors and ripple counters.

Referring now to FIGS. 6-12, the passenger compartment 140 of the vehicle 100 can be placed in a variety of arrangements. The passenger compartment 140 of the vehicle 100 may be discussed with regard to a forward region 300, a central region 304, and a rearward region 308. In general, the first row 144 corresponds with the forward region 300, the second row 148 corresponds with the central region 304, and the third row 152 corresponds with the rearward region 308, particularly when the plurality of seating assemblies 124 are arranged in a design position (see FIG. 6). The forward region 300 and the central region 304 of the passenger compartment 140 may each be provided with one or more access doors 312 that separate the passenger compartment 140 from a vehicle-exterior environment. Similarly, one of the access doors 312 may be provided at a rear of the vehicle 100, such as a liftgate, that may be utilized by the seating assemblies 124 positioned in the third row 152. The access doors 312 are movable between an open position and a closed position, thereby allowing for ingress and/or egress of occupants and/or cargo. The passenger compartment 140 includes a rail system 316 positioned in a floor 320 of the vehicle 100. The rail system 316 can be provided with power and/or data lines such that power may be transmitted to the seating assemblies 124 and data may be communicated between the seating assemblies 124 and the vehicle 100 (e.g., the controller 104). Additionally or alternatively, data may be transmitted between seating assemblies 124. The floor 320 of the vehicle 100 is positioned in a lower region of the passenger compartment 140. The rail system 316 includes a plurality of tracks 324 that extend along a longitudinal direction 328 of the vehicle 100. The tracks 324 may be arranged along the longitudinal direction 328 in pairs, with each pair of the tracks 324 enabling one or more of the plurality of seating assemblies 124 coupled thereto to be actuated along the tracks 324 in the longitudinal direction 328. For example, a first seating assembly 332 and a second seating assembly 336 may be coupled to a first pair of the tracks 324. Similarly, a third seating assembly 340 and a fourth seating assembly 344 may be coupled to a second pair of the tracks 324. As depicted in FIG. 6, the first pair of the tracks 324 is positioned on a nearest side of the vehicle 100 while the second pair of the tracks 324 is positioned on a far side of the vehicle 100. While primarily the seating assemblies 124 that are positioned on the nearest side of the vehicle 100 are depicted with the seatback actuator 168, the seat actuator 172, the lower leg support actuator 176, the swivel actuator 180, and/or the translation actuator 184, one of skill in the art will recognize that the remaining seating assemblies 124 within the passenger compartment 140 may be provided with some or all of the components enumerated herein.

Referring again to FIGS. 6-12, the plurality of seating assemblies 124 are positioned within the passenger compartment 140 of the vehicle 100 to define a seating arrangement. The various actuators and sensors discussed herein enable the controller 104 of the vehicle 100 to affect adjustments of the plurality of seating assemblies 124 to accomplish a variety of seating arrangements within the passenger compartment 140. The seatbase 228 engages with the rail system 316. For example, the seatbase 228 may engage with the rail system 316 by way of the swivel assembly 260 (e.g., anchors 334 extending downwardly from the swivel assembly 260). More specifically, a lower portion of the swivel assemblies 260 may engage with the rail system 316, while an upper portion of the swivel assembly 260 engages with the seatbase 228. Accordingly, the coupling between the seating assembly 124 and the rail system 316 may enable translational motion of the seating assembly 124 along the rail system 316 while also permitting rotation of the seating assembly 124 about the vertical axis 268 by way of the swivel assembly 260. The rail system 316 may be provided with one or more of the rail sensors 136. When a plurality of the rail sensors 136 are employed within the rail system 316, the controller 104 may be able to monitor a current position of each of the plurality of seating assemblies 124 by referencing the plurality of rail sensors 136. For example, the controller 104 may be able to determine that the first seating assembly 332 is positioned between a first one of the rail sensors 136 and a second one of the rail sensors 136 and that the second seating assembly 336 is positioned between a third one of the rail sensors 136 and a fourth one of the rail sensors 136. In such an example, the rail sensors 136 may be used as "positional gates" that can be utilized to communicate that a given one of the plurality of seating assemblies 124 has passed one of the rail sensors 136 but has not yet passed an immediately adjacent one of the rail sensors 136. In various examples, the rail sensors 136 may be magnets within the floor 320 and/or the tracks 324. In such examples, the seating assemblies 124 may be provided with Hall-effect sensors that are positioned and/or configured to interact with the magnetic rail sensors 136, thereby enabling the controller 104 to determine proximity of the seating assembly 124 to one or more of the rail sensors 136.

Referring further to FIGS. 6-12, it is contemplated that the imager 132 may be oriented with the field-of-view directed toward the passenger compartment 140 such that the imager 132 may be utilized to determine a current position of the plurality of seating assemblies 124 (e.g., by recognizing a shape of the seating assembly 124, by recognizing a QR code on the seating assembly 124, and so on). By coupling the seatback 200, the seat 204, and the swivel assembly 260 to a common component, such as the seatbase 228, it is possible to enable a greater degree of freedom of movement of the various components of the seating assembly 124. More specifically, a lower portion of the swivel assembly 260 is engaged with the tracks 324 of the rail system 316. Accordingly, the lower portion of the swivel assembly 260 is rotationally fixed about the vertical axis 268 but capable of translational motion along the rail system 316. An upper portion of the swivel assembly 260 is engaged with or coupled to the seatbase 228 while maintaining the seatbase 228 free of direct engagement with the lower portion of the swivel assembly 260. Therefore, the seatbase 228 is permitted to rotate about the vertical axis 268 as a result of actuation of the swivel assembly 260. The coupling of the seats 204 to the seatbase 228 also enables a greater freedom of movement of the seat 204. More specifically, the seat 204 is coupled to the brackets 248 of the seatbase 228 in a manner that suspends the seat 204 between the brackets 248 while maintaining the seat 204 as free from direct engagement with the swivel assembly 260. Accordingly, the seat 204 is rotatable about the seat rotation axis 244 and is movable between an upwardly-stowed position (see FIG. 9) and a downwardly-deployed position (see FIG. 6). Similar to the seat 204, the seatback 200 is coupled to the seatbase 228 in a manner that permits rotational motion of the seatback 200 about the seatback rotation axis 232. More specifically, the seatback 200 is suspended between the brackets 248 of the seatbase 228 such that the seatback 200 is free of direct engagement with the seat 204. Accordingly, the independent coupling of each of the seatback 200, the seat 204, and the swivel assembly 260 to the brackets 248 of the seatbase 228 allows the seat 204 to be actuated between the upwardly-stowed position and the downwardly-deployed position independent of a rotational position of the swivel assembly 260 about the vertical axis 268. The translation actuator 184 may be coupled to the lower portion of the swivel assembly 260 (e.g., the swivel platform 272) in a manner that allows the translation actuator 184 to be engaged with the rail system 316 (e.g., by one or more anchors 334 extending into the tracks 324). Activation of the translation assembly by the controller 104 enables adjustment of a position of a corresponding one of the seating assemblies 124 along the rail system 316.

Referring specifically to FIG. 6, the plurality of seating assemblies 124 are depicted in a design arrangement within the passenger compartment 140 of the vehicle 100. The design arrangement of the plurality of seating assemblies 124 may be defined as each of the plurality of seating assemblies 124 within the passenger compartment 140 being oriented in a forward-facing orientation with the seat 204 of each of the seating assemblies 124 being in the downwardly-deployed position and the seatback 200 of each of the seating assemblies 124 being in a generally upright position. In the design arrangement depicted, each of the seating assemblies 124 is arranged and positioned in a manner that each of the seating assemblies 124 could be utilized by an occupant. As depicted, the seating assemblies 124 that are positioned in the first row 144 may be entirely contained within the forward region 300 of the passenger compartment 140, the seating assemblies 124 positioned in the second row 148 may be entirely contained within the central region 304 of the passenger compartment 140, and the seating assemblies 124 positioned in the third row 152 may be entirely contained within the rearward region 308 of the passenger compartment 140. When the passenger compartment is provided with the seating arrangement in the design arrangement, a seating capacity of the passenger compartment 140 may be maximized as each of the seating assemblies 124 are able to receive an occupant. In some examples, the design arrangement of the passenger compartment 140 may minimize an overall cargo capacity of the passenger compartment 140.

Figure 7:
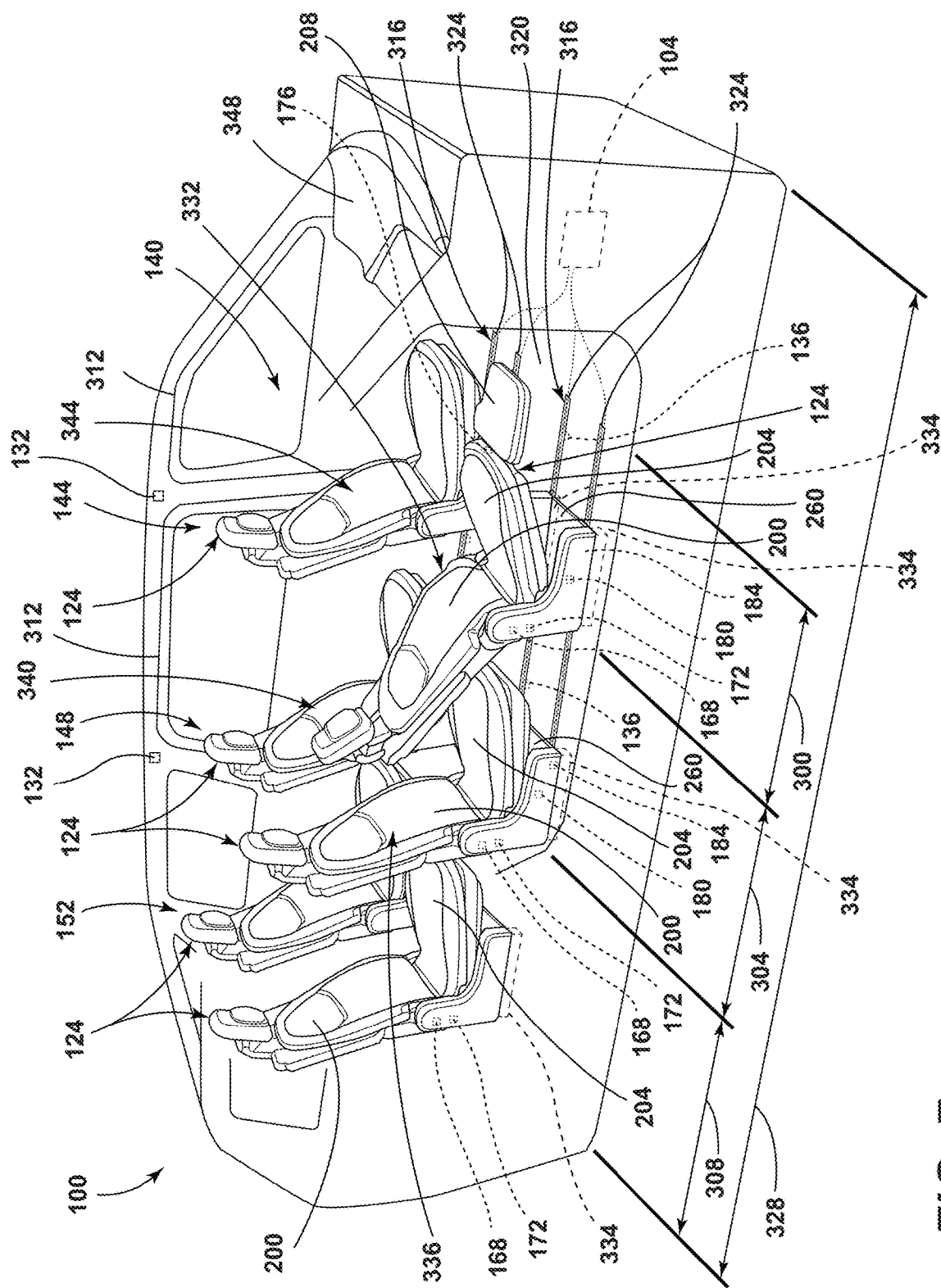
FIG. 7 is a side perspective view of the vehicle, illustrating a relaxation arrangement, according to one example.

Referring specifically to FIG. 7, the passenger compartment 140 of the vehicle 100 is depicted in a relaxation arrangement. The relaxation arrangement may be defined as at least one of the seating assemblies 124 (the first seating assembly 332 in the depicted example) placed in a generally reclined and elevated position. More specifically, in the relaxation arrangement at least one of the seating assemblies 124 places the seatback 200 in a reclined position, elevates the lower leg support 208 from a retracted position to an extended position, and/or adjusts an angular position of the seat 204 relative to the seatbase 228 in a manner that increases an angle of inclination of the seat 204 relative to the floor 320 of the vehicle 100 when compared to the design position (see FIG. 6). When in the relaxation arrangement, the seating assembly 124 that is placed in the reclined and elevated position may encroach upon a seating area of an immediately rearwardly adjacent one of the seating assemblies (e.g., the second seating assembly 336 in the depicted example). The relaxation arrangement may be accomplished for one of the seating assemblies 124 independent of a position of the seat 204 of the immediately rearwardly adjacent seating assembly 124. For example, the first seating assembly 332 may be placed in the relaxation arrangement or the reclined and elevated position independent of whether the seat 204 of the second seating assembly 336 is in the downwardly-deployed position (as depicted) or in the upwardly-stowed position. An occupant may desire to utilize the relaxation arrangement to relax, rest, and/or recharge their energy level while en route to their desired destination. While the first seating assembly 332 is depicted with the lower leg support 208 for illustrative purposes, it is contemplated that the lower leg support 208 may be provided on each of the seating assemblies 124 within the passenger compartment 140.

Figure 8:
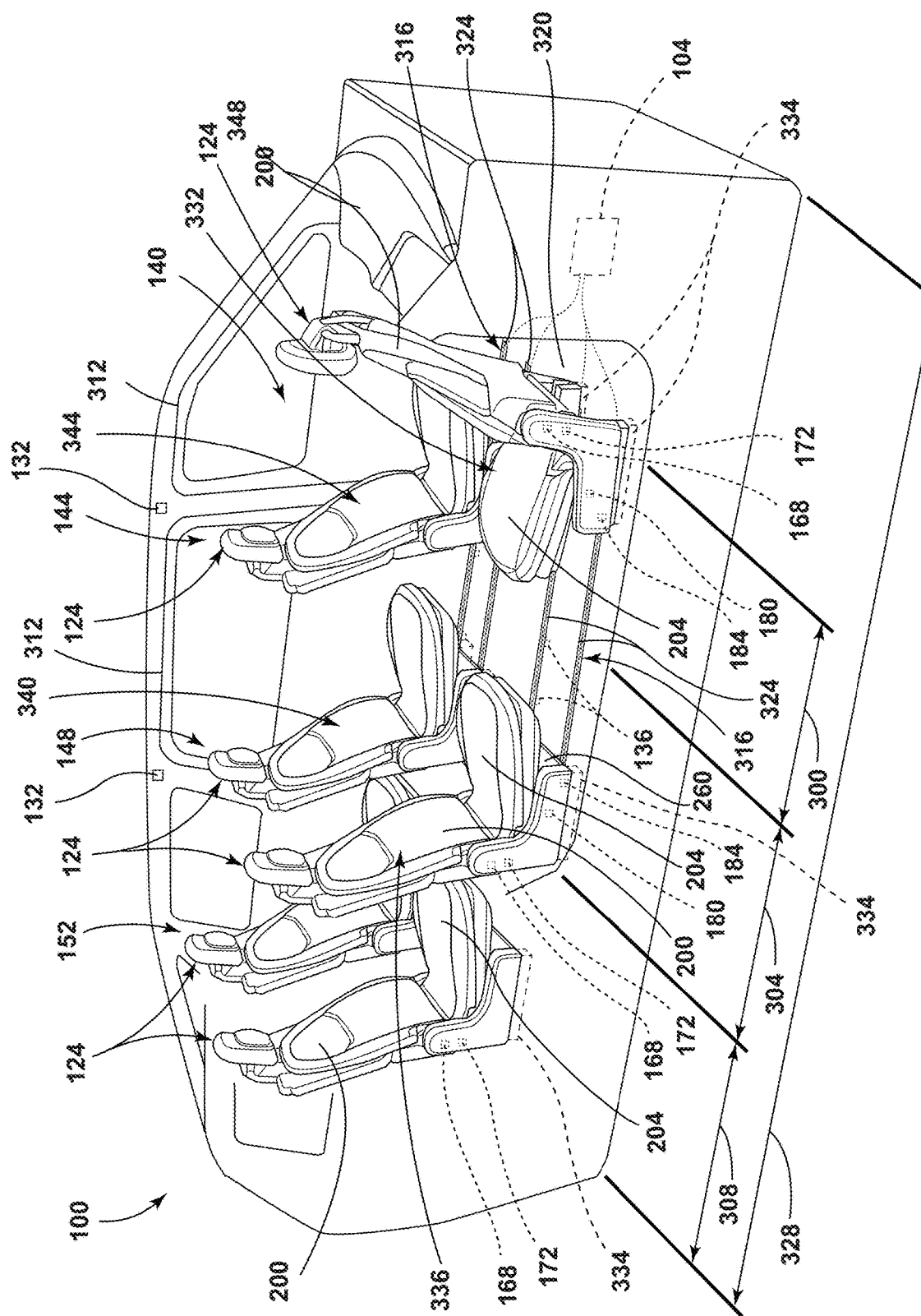
FIG. 8 is a side perspective view of the vehicle, illustrating a social arrangement, according to one example.

Referring specifically to FIG. 8, the passenger compartment 140 is depicted in a social arrangement. The social arrangement may be defined as placing one of the seating assemblies 124 in a rearward-facing orientation such that the seating assembly 124 faces another one of the seating assemblies 124 that is in an immediately rearwardly adjacent row of the vehicle 100, with the rearwardly adjacent one of the seating assemblies 124 being positioned in a forward-facing orientation. For example, the first seating assembly 332 may be placed in a rearward-facing orientation such that an occupant of the first seating assembly 332 may be facing an occupant of the second seating assembly 336, with the second seating assembly 336 being positioned in the second row 148 and oriented in a forward-facing orientation. As the occupants of the first and second seating assemblies 332, 336 are now facing one another, the legs of each of the occupants will be occupying the common space between the first and second seating assemblies 332, 336. Accordingly, to provide additional legroom for the occupants of the first and second seating assemblies 332, 336, it may be beneficial to actuate the first seating assembly 332 toward a forward extreme of the rail system 316 such that a rearward portion of the seatback 200 of the first seating assembly 332 is proximate to a dashboard 348 of the vehicle 100. When the passenger compartment 140 is in the social arrangement, occupants of the rearward-facing seating assembly 124 (e.g., the first seating assembly 332) and seating assemblies 124 positioned vehicle-rearward of the rearward-facing seating assembly 124 (e.g., second seating assembly 336 and third seating assembly 340) may have an easier time communicating with one another. For example, when the passenger compartment 140 is arranged in the design arrangement, it can be difficult for occupants of the second row 148 to hear what occupants of the first row 144 are saying. This can be in part due to the soundwaves exiting the mouths of the occupants of the first row 144 traveling vehicle-forward of the first row 144 and ultimately away from the occupants of the second row 148. While the first seating assembly 332 is depicted in the rearward-facing orientation for illustrative purposes, it is contemplated that others of the plurality of seating assemblies 124 may be additionally or alternatively placed in a rearward-facing orientation such that the occupants of these rearward-facing seating assemblies 124 may communicate with occupants of vehicle-rearward seating assemblies 124 in a more direct manner without departing from the concepts disclosed herein.

Figure 9:
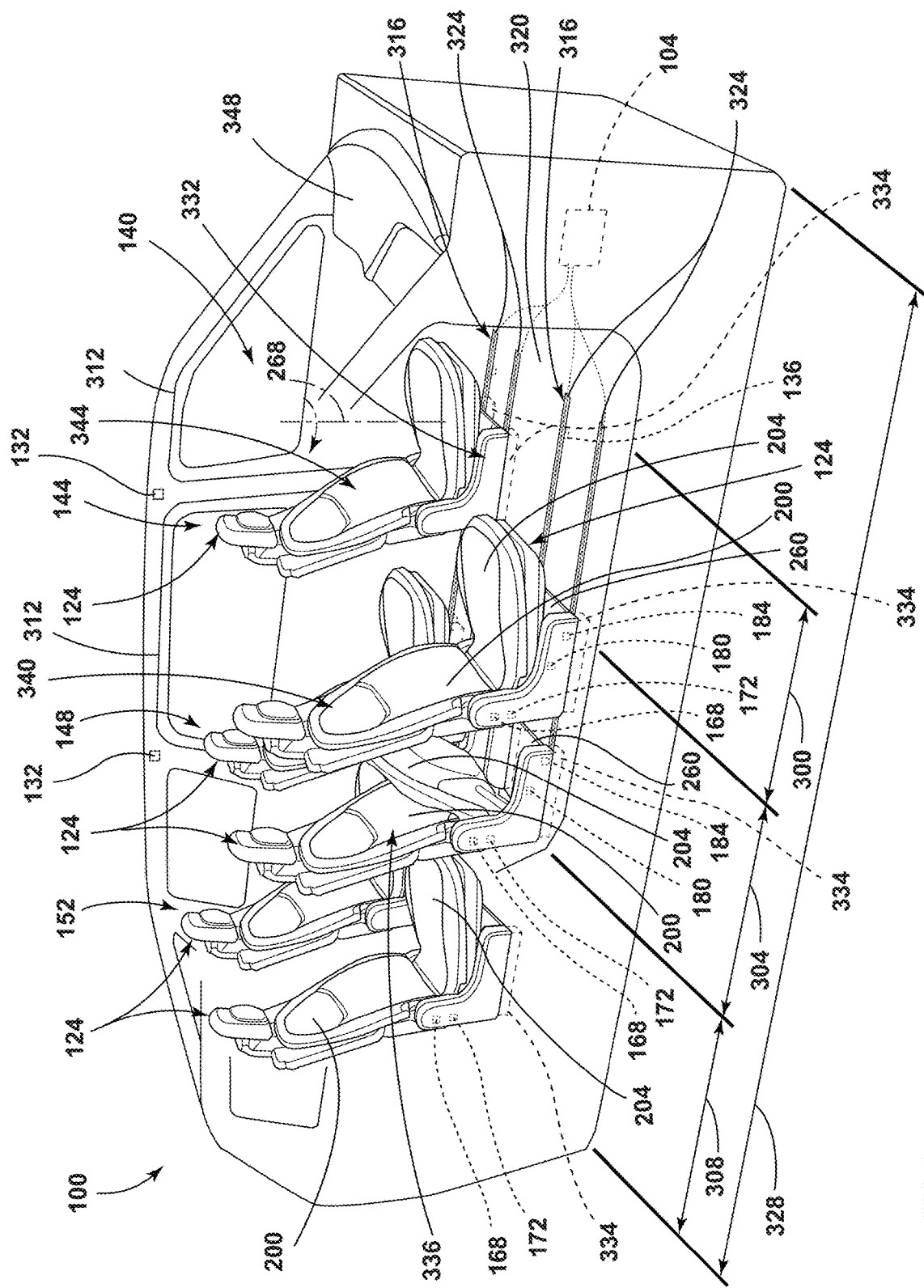
FIG. 9 is a side perspective view of the vehicle, illustrating a child care arrangement, according to one example.

Referring specifically to FIG. 9, the passenger compartment 140 is depicted in a child care arrangement. A goal of the child care arrangement may be to permit a parent sitting in the first seating assembly 332 to more easily provide assistance to a child that is occupying the third seating assembly 340. In some examples, the third seating assembly 340 may be provided with a secondary seating assembly (e.g., a child seat, see FIG. 18B) that is either provided within the vehicle 100 or provided by the occupants of the vehicle 100. While the stated potential goal of the child care arrangement is to permit a parent that is occupying the first seating assembly 332 to more easily assist a child occupying the third seating assembly 340, it is contemplated that the child care arrangement may be utilized for alternative purposes. For example, the child care arrangement may permit an occupant of the first seating assembly 332 to more easily access cargo that may be stored on the floor 320 between the third seating assembly 340 and the fourth seating assembly 344 or cargo stored upon the third seating assembly 340. Regardless of the intended goal, use, or purpose behind an occupant selecting the child care arrangement, the child care arrangement may be defined as the seat 204 of the second seating assembly 336 being placed in the upwardly-stowed position and actuating the first seating assembly 332 in a vehicle-rearward direction along the rail system 316 such that a distance between the first and second seating assemblies 332, 336 is decreased when compared to the design arrangement.

Referring again to FIG. 9, in some examples, the swivel assembly 260 of the first seating assembly 332 may be actuated by the swivel actuator 180 of the first seating assembly 332 about the vertical axis 268 such that the first seating assembly 332 is rotated in a counterclockwise direction toward the third seating assembly 340. Such an actuation of the swivel assembly 260 of the first seating assembly 332 may further enable an occupant of the first seating assembly 332 to access an occupant of the third seating assembly 340 and/or cargo positioned rearward of the fourth seating assembly 344. As with the other exemplary arrangements depicted herein, the present depiction of the child care arrangement is intended to be exemplary in nature and not limiting. Accordingly, the child care arrangement may be accomplished utilizing others of the seating assemblies 124 without departing from the concepts disclosed herein. Therefore, the child care arrangement may be defined as a vehicle-forward one of the seating assemblies 124 being actuated along the rail system 316 in a vehicle-rearward direction such that the vehicle-forward one of the seating assemblies 124 is positioned proximate to a vehicle-rearward one of the seating assemblies 124, with the vehicle-rearward one of the seating assemblies 124 having the seat 204 thereof optionally positioned in the upwardly-stowed position. The child care arrangement may also be defined as co-localizing longitudinally adjacent ones of the seating assemblies 124 within a single one of the regions of the passenger compartment 140 (e.g., the central region 304 or the rearward region 308). For example, in the arrangement depicted in FIG. 9, the first seating assembly 332 is actuated rearward from the forward region 300 of the passenger compartment 140 such that the first seating assembly 332 and the second seating assembly 336 are both positioned in the central region 304. In various examples, placing the passenger compartment 140 in the child care arrangement may decrease an overall seating capacity of the passenger compartment 140 by a value of one for the duration of the time that the passenger compartment 140 is in the child care arrangement (e.g., the second seating assembly 336 may become unavailable for an occupant). Transitioning to the child care arrangement may be accomplished by interaction with the user interface 120 by the occupant of the first seating assembly 332. In some examples, the transition to the child care arrangement may be initiated by an occupant of the passenger compartment 140 uttering a trigger word, phrase, or gesture. The trigger word, phrase, or gesture may be preprogrammed into the controller 104 or customized by a user. For example, the trigger word, phrase, or gesture can include, but is not limited to, "help", "mom", "dad", "I dropped", "oh no", "child care arrangement", "slide back", and so on. In general, the trigger word, phrase, or gesture may be a recognized, programmed, or saved signal that can be communicated verbally or visually.

Figure 10:
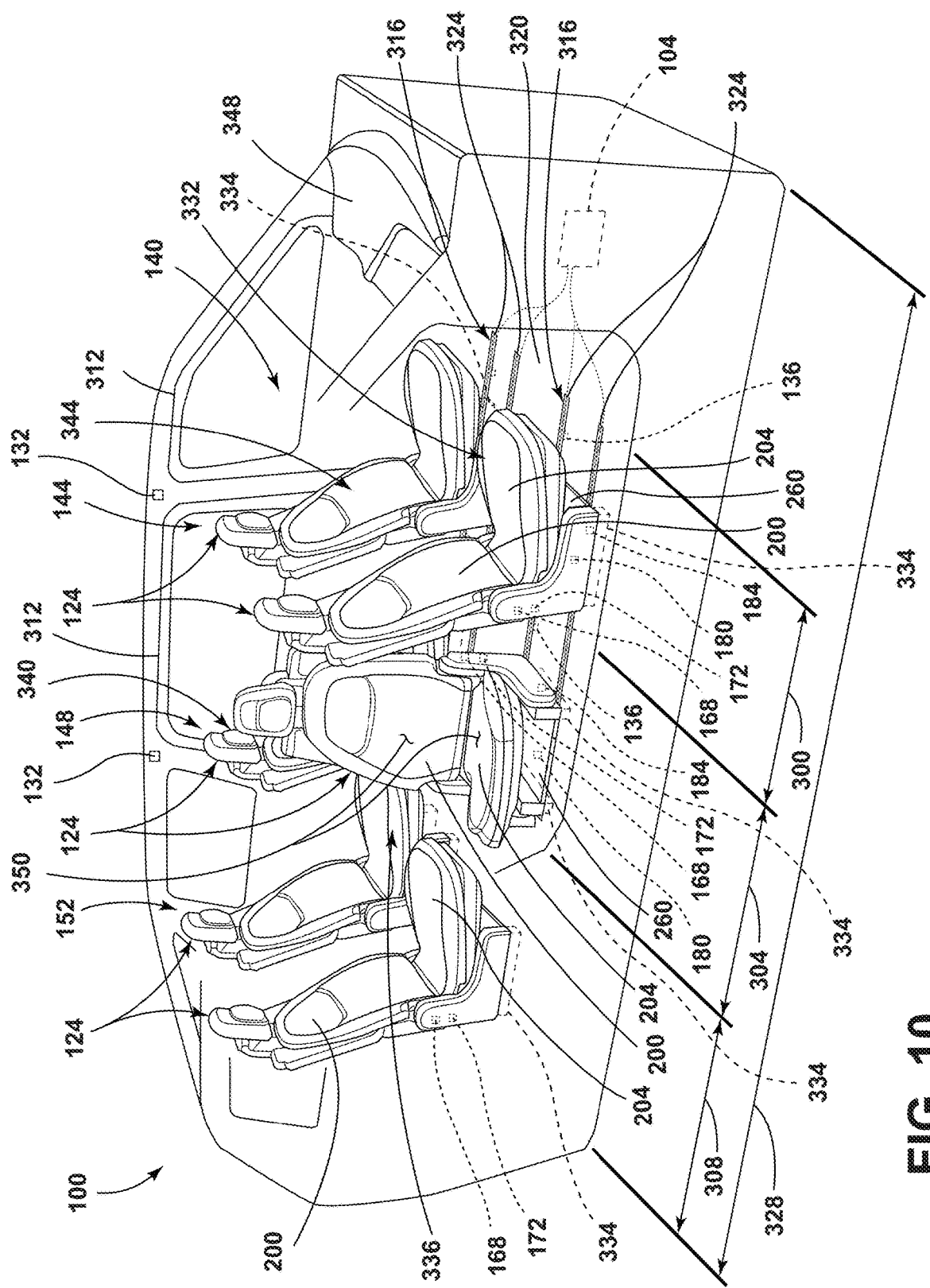
FIG. 10 is a side perspective view of the vehicle, illustrating a child seat arrangement, according to one example.

Referring specifically to FIG. 10, the passenger compartment 140 is depicted in a child seat arrangement. The child seat arrangement may be defined as the second seating assembly 336 being rotated by actuation of the swivel assembly 260 about the vertical axis 268 by the swivel actuator 180 such that a seating surface 350 defined by the seatback 200 and the seat 204 of the second seating assembly 336 is presented to an immediately adjacent one of the access doors 312. The seating surface 350 may be defined as the surface of the seatback 200 and the seat 204 that directly engages with an occupant when the occupant sitting upon the given seating assembly 124. The child seat arrangement may be utilized when a parent and child intend to occupy the vehicle 100. By rotating the second seating assembly 336 about the vertical axis 268 to present the seating surface 350 of the second seating assembly 336 to an immediately adjacent one of the access doors 312, a difficulty of placing the child into the second seating assembly 336 may be decreased. In various examples, the parent may couple a child seat to the second seating assembly 336 as a secondary seating assembly in examples where the parent desires the child to be so situated in the passenger compartment 140. The remainder of the seating assemblies 124 that are not designated for utilization by the child or an occupant of smaller stature may be in a variety of positions or arrangements while still at least partially constituting the child seat arrangement. While the depicted example shows the second seating assembly 336 as rotated about the vertical axis 268 thereof toward an immediately adjacent one of the access doors 312, the present disclosure is not so limited. Rather, it is contemplated that the third seating assembly 340 may be so arranged or one of the seating assemblies 124 positioned in the third row 152 may be arranged to accept a child occupant or an occupant of smaller stature. In examples where one of the seating assemblies 124 positioned in the third row 152 is placed in a child seat arrangement, the seating assembly 124 in the third row 152 that is to be so positioned may be rotated about the vertical axis 268 thereof such that the seating surface 350 of the seating assembly 124 in the third row 152 is oriented toward a rearward liftgate of the vehicle 100, the liftgate constituting one of the access doors 312 positioned on a rear side of the vehicle 100.

Figure 11:
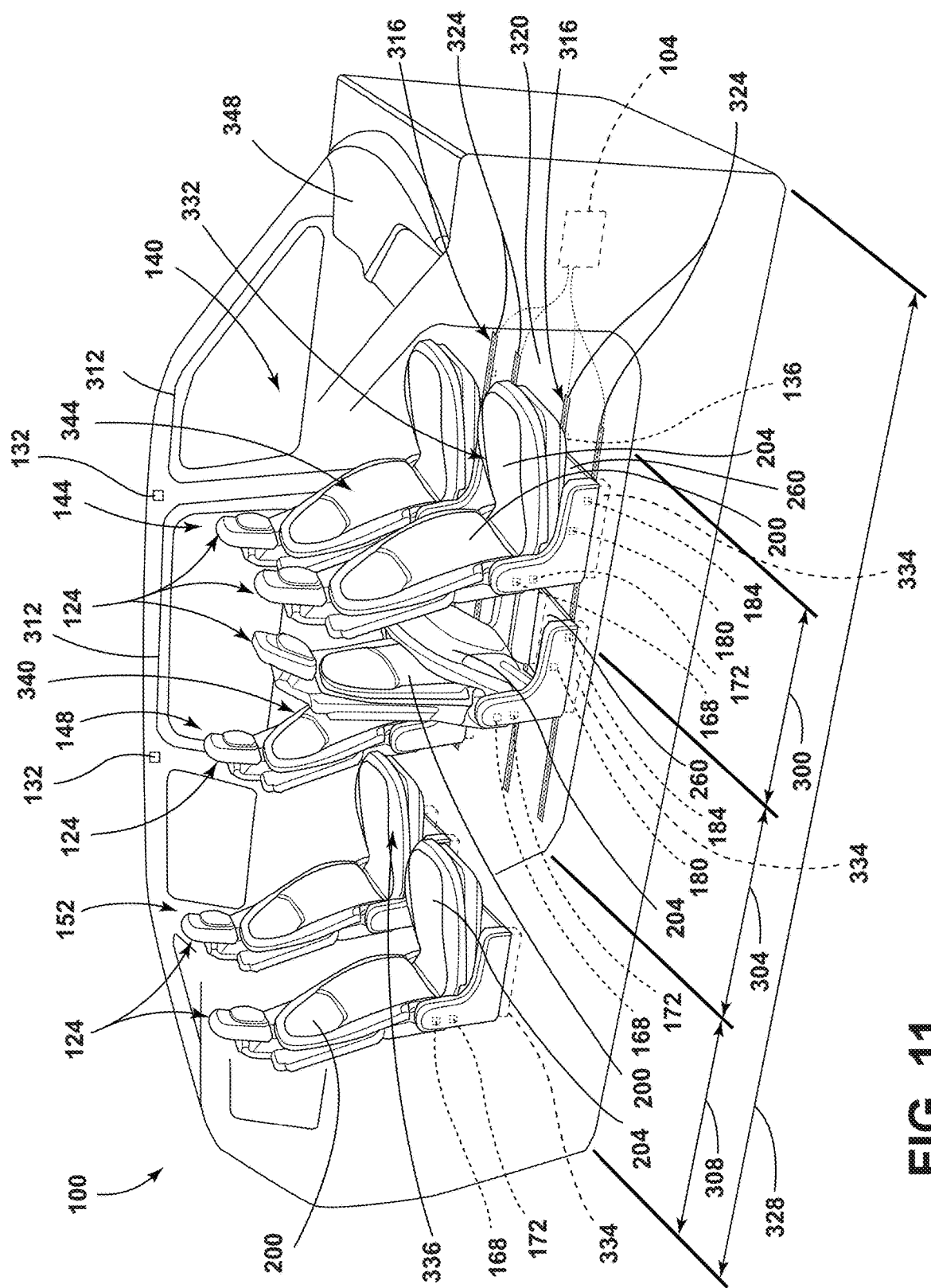
FIG. 11 is a side perspective view of the vehicle, illustrating an ingress/egress arrangement, according to one example.

Referring specifically to FIG. 11, the passenger compartment 140 is illustrated in an ingress/egress arrangement. The ingress/egress arrangement may be defined as the seat 204 of the second seating assembly 336 being placed in the upwardly-stowed position and the second seating assembly 336 being actuated along the rail system 316 in a vehicle-forward direction when compared to the design arrangement. Generally, the ingress/egress arrangement may be defined as one or more of the seating assemblies 124 positioned in the second row 148 having their associated seat 204 placed in the upwardly-stowed position and the corresponding seating assembly 124 being actuated along the rail system 316 such that the seating assembly 124 is positioned proximate to a boundary between the forward region 300 and the central region 304. In so arranging the passenger compartment 140 in the ingress/egress arrangement, passengers may more easily access the third row 152 to occupy the seating assemblies 124 positioned therein. While the ingress/egress arrangement is depicted as actuating one or more of the seating assemblies 124 positioned in the second row 148, the present disclosure is not so limited. Rather, it is contemplated that alternative vehicle layouts may present opportunities for use of the ingress/egress arrangement in rows other than the second row 148. In general, it may be beneficial to provide the ingress/egress arrangement when the seating assemblies 124 of one of the rows are not provided with an immediately laterally adjacent one of the access doors 312. In such a layout, an adjacent row that is vehicle-forward and immediately laterally adjacent to one of the access doors 312 may be actuated in the manner discussed herein to provide the ingress/egress arrangement.

Figure 12:
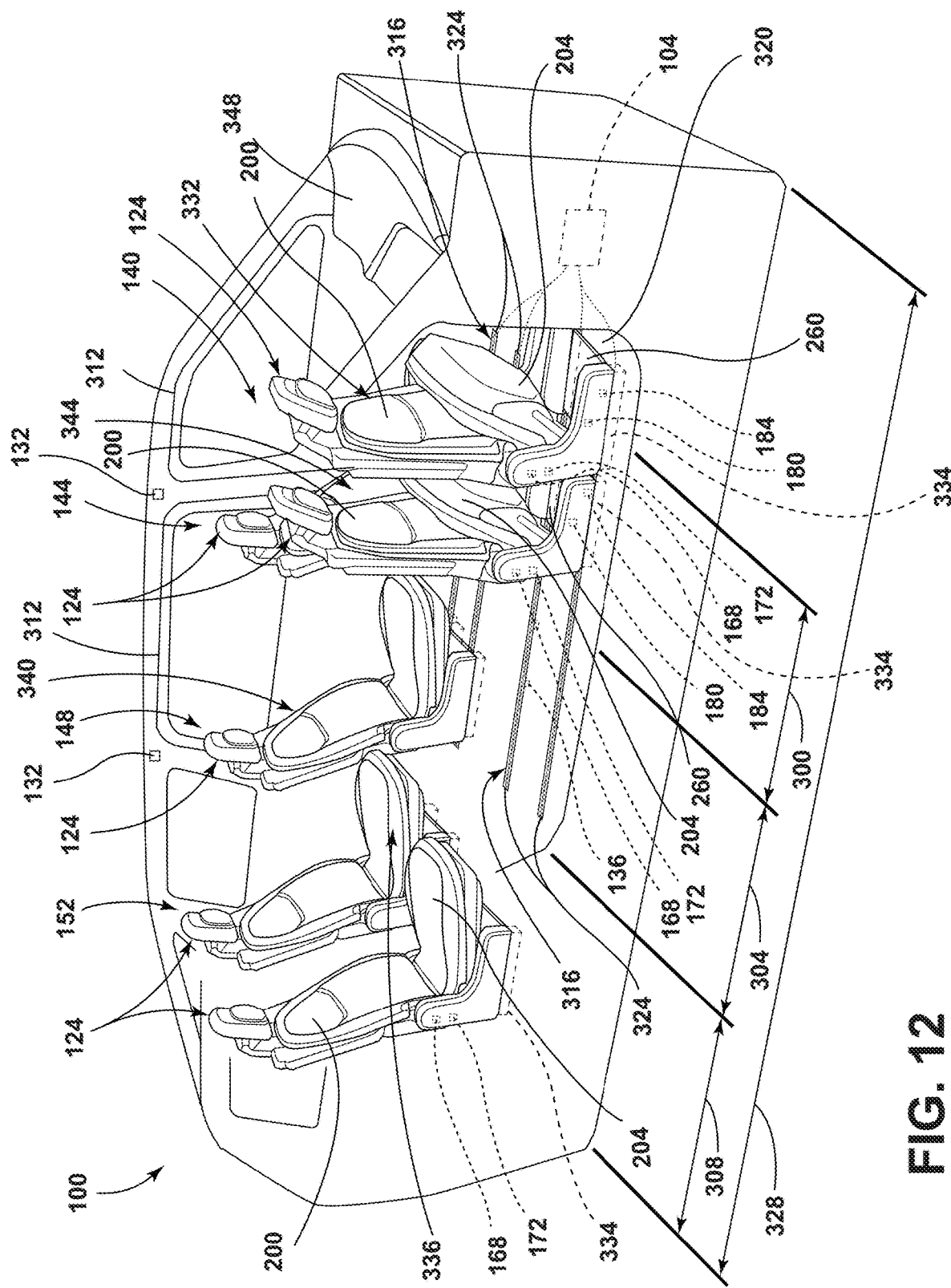
FIG. 12 is a side perspective view of the vehicle, illustrating a cargo arrangement, according to one example.

Referring specifically to FIG. 12, the passenger compartment 140 is depicted in a cargo arrangement. The cargo arrangement may be defined as the seats 204 of the first and second seating assemblies 332, 336 being placed in the upwardly-stowed position and the first and second seating assemblies 332, 336 being actuated along the rail system such that the first and second seating assemblies 332, 336 are both positioned within the forward region 300 of the passenger compartment 140. By so arranging the first and second seating assemblies 332, 336, a section of the floor 320 proximate to the central region 304 may be provided with an increase in a continuous surface area such that large items may be stored thereupon. While discussed as a cargo arrangement, it is contemplated that the cargo arrangement may be utilized in alternative or additional circumstances. For example, the cargo arrangement of the passenger compartment 140 may be assumed when the vehicle 100 arrives at a pickup destination for a plurality of occupants. Often in such a circumstance, the prospective occupants of the passenger compartment 140 may be positioned on a single side of the vehicle 100, with the opposing side of the vehicle 100 being oriented toward active traffic lanes of the road upon which the vehicle 100 is traveling. In such situations, it may be beneficial for the occupants to access the passenger compartment 140 from the side of the vehicle 100 that is positioned away from active lanes of the road upon which the vehicle 100 is traveling. Accordingly, the cargo arrangement may be assumed to allow initial occupants to access the seating assemblies 124 in the third row 152 more easily, as well as access the third seating assembly 340 with fewer impediments that may be caused by the second seating assembly 336 being positioned in the second row 148 during such entry of the occupants. Upon occupants of the seating assemblies 124 of the third row 152 and the third seating assembly 340 becoming situated within their respective seating assemblies 124, the second seating assembly 336 may be actuated to the second row 148 and the seat 204 thereof actuated to the downwardly-deployed position to receive another of the prospective occupants. At this time, a prospective occupant of the fourth seating assembly 344 may access the fourth seating assembly 344 by entering the passenger compartment 140 rearward of the first seating assembly 332 to avoid climbing over the first seating assembly 332 to access the fourth seating assembly 344. Finally, the first seating assembly 332 may be actuated vehicle-rearward along the rail system 316 and rotate the seat 204 thereof to the downwardly-deployed position to assume the design arrangement, thereby presenting a prospective occupant of the first seating assembly 332 with the available seating surface of the first seating assembly 332. It is contemplated that in various examples, the seating assemblies 124 positioned in the third row 152 may have the seats 204 thereof actuated to the upwardly-stowed position to further provide additional storage area in the cargo arrangement.

Figure 13:
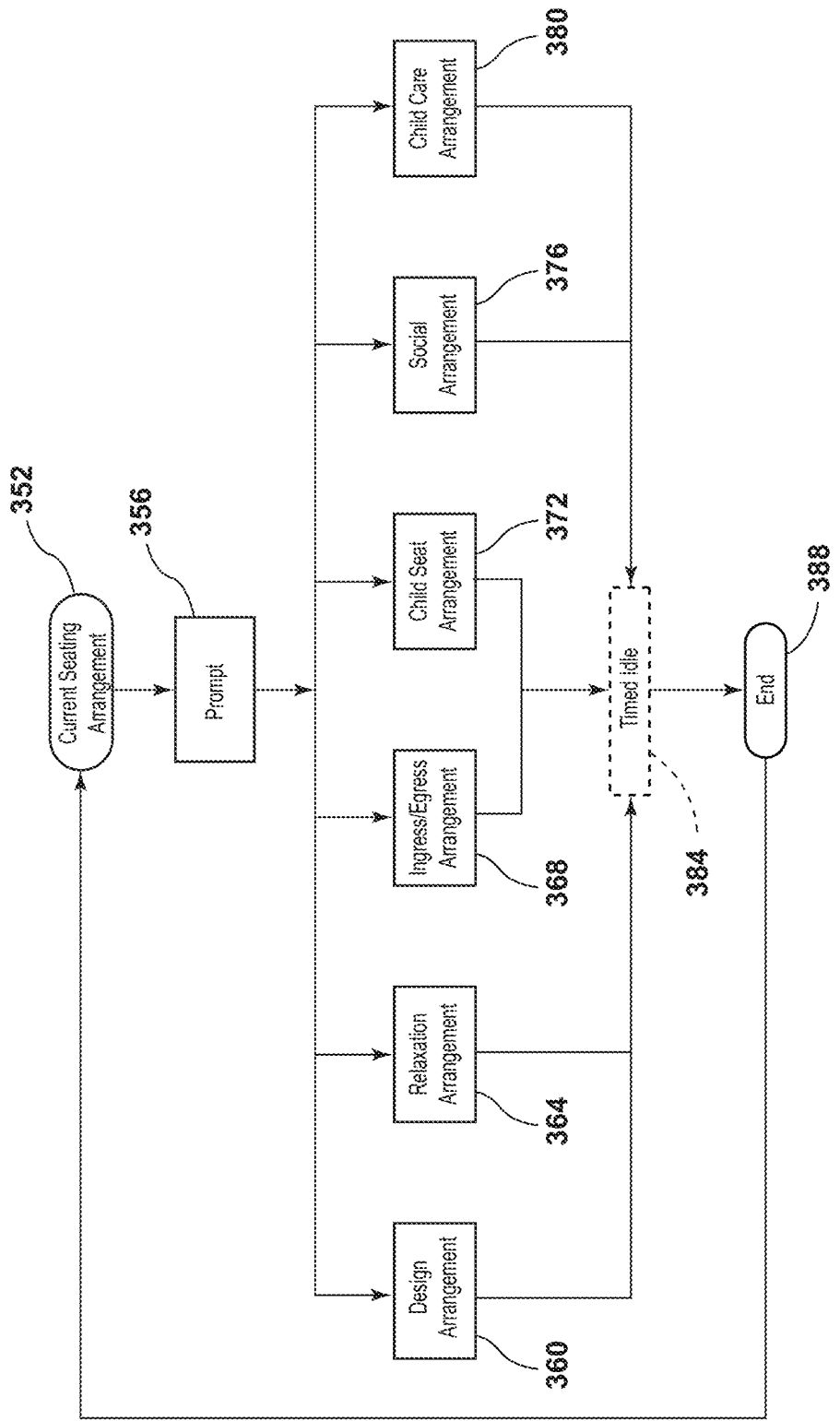
FIG. 13 is a process flow diagram for the adjustment of the arrangement of the passenger compartment, depicted in generic form.

Referring to FIG. 13, a process flow diagram is depicted in generic form. In general, the process flow for adjusting an arrangement of the passenger compartment 140 begins with the passenger compartment 140 in a current seating arrangement 352. The current seating arrangement 352 may be any of the seating arrangements described herein or a custom arrangement that a user has entered. The current seating arrangement 352 may be stored in the memory 112 of the controller 104. Upon receiving a prompt 356, the controller 104 may transmit instruction signals to the seating assemblies 124 to adjust the current seating arrangement 352 into a preset seating arrangement or a custom seating arrangement. In various examples, the prompt 356 may take the form of a request signal transmitted by the user interface 120 to the controller 104. As described above, the user interface 120 may be an on-board component of the vehicle 100 or a component that is external to the vehicle 100. Regardless of the positioning or arrangement of the user interface 120, the prompt 356 may take the form of a request signal communicated to the controller 104 by the user interface 120. The request signals transmitted from the user interface 120 to the controller 104 may be actively chosen by the user (e.g., actively selecting a given arrangement of the passenger compartment 140) or may be passively selected by the user (e.g., selected based upon a number of occupants and/or an intended destination of the vehicle 100). The preset arrangements that the user may select from can include, but are not limited to, a design arrangement 360, a relaxation arrangement 364, an ingress/egress arrangement 368, a child seat arrangement 372, a social arrangement 376, and/or a child care arrangement 380. Upon the transmission of instruction signals from the controller 104 to adjust the current seating arrangement 352 into one of the preset arrangements or a custom arrangement, a timed idle 384 may be selectively employed. In some examples, the timed idle 384 may represent a timeframe intended for adjusting the current seating arrangement 352 into one of the preset arrangements for the custom arrangement provided by the user. Alternatively, the timed idle 384 may represent an intermediate step to achieving the requested arrangement of the passenger compartment 140. For example, if the ingress/egress arrangement 368 is selected, the timed idle 384 may represent a timeframe intended for allowing occupants to ingress into, or egress out of, the passenger compartment 140. Similarly, if the child seat arrangement 372 is selected, then the timed idle 384 may represent a timeframe intended for a parent occupant to position a child occupant within one of the seating assemblies 124 that is presented to one of the access doors 312. As with the child seat arrangement 372, if the child care arrangement 380 is selected, then the timed idle 384 may represent a timeframe intended for allowing a parent or caregiving occupant of the first seating assembly 332 to assist the child occupying the third seating assembly 340. Following the assumption of the selected arrangement or the termination of the timed idle 384, the process of adjusting the current seating arrangement 352 to an alternative seating arrangement may reach an ending point 388, at which point the new current seating arrangement may be stored within the memory 112 of the controller 104 for future reference.

Figure 15:
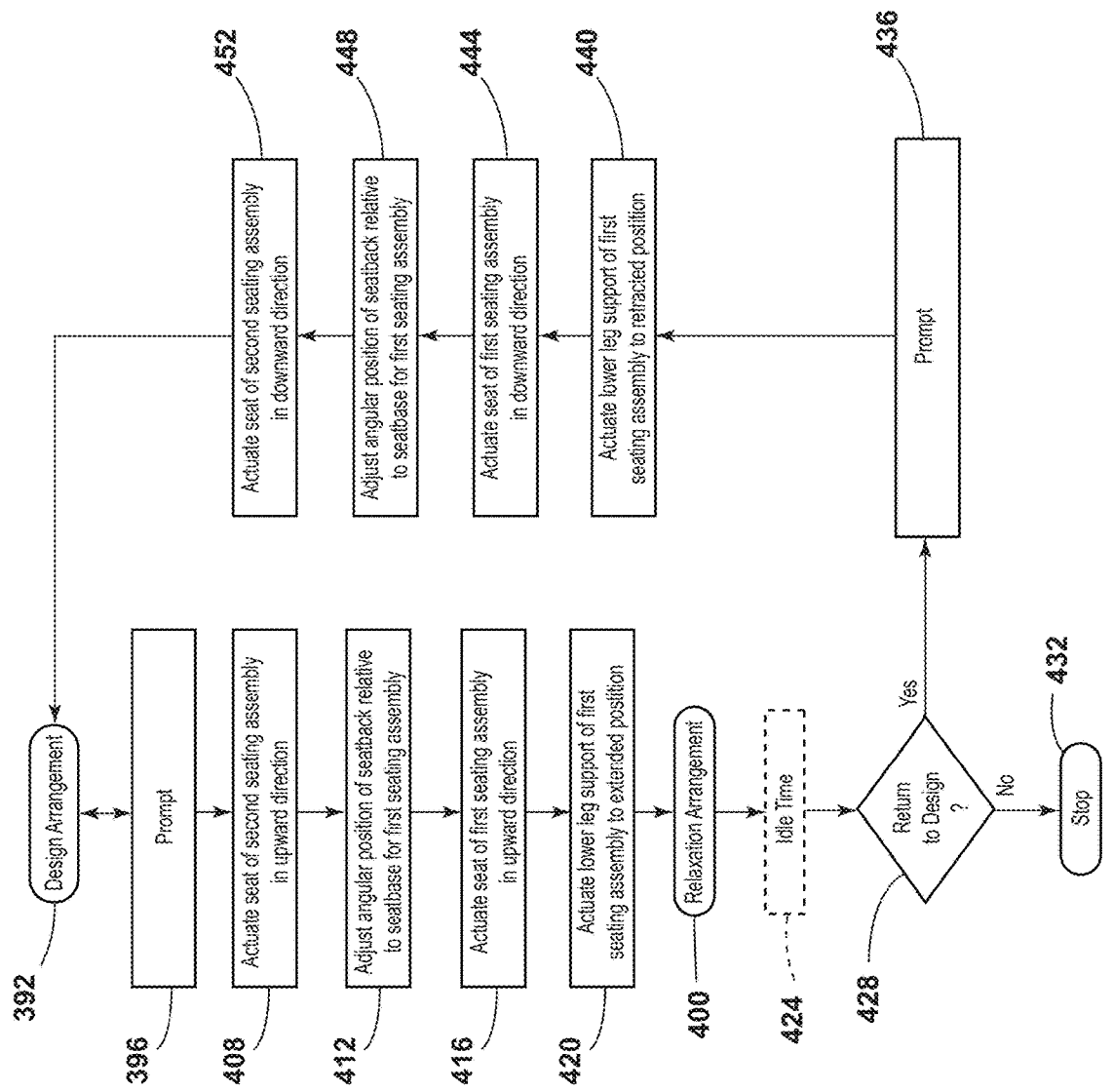
FIG. 15 is a flow diagram illustrating steps in transitioning between the design arrangement to the relaxation arrangement, according to one example.

Referring to FIGS. 14A-15, a transition from the design arrangement (FIG. 14A) to the relaxation arrangement (FIG. 14B) is depicted according to one example. An arrangement of the passenger compartment 140 is initially in a first arrangement 392, such as the design arrangement. In deciding to exit the first arrangement 392, the user communicates a request signal to the controller 104 (e.g., by way of the user interface 120), which can constitute a prompt 396 to transition the passenger compartment 140 from the first arrangement 392 to a second arrangement 400. In response to the request signal or prompt 396, the controller 104 may initiate the transition from the first arrangement 392 to the second arrangement 400 by transmitting instruction signals to various actuators of the first seating assembly 332 and the second seating assembly 336. The relevant actuators for the transition from the design arrangement to the relaxation arrangement can include the seat actuator 172 of the second seating assembly 336, the seatback actuator 168 of the first seating assembly 332, the seat actuator 172 of the first seating assembly 332, and the lower leg support actuator 176 of the first seating assembly 332. Each of these actuators may be communicatively coupled to a corresponding position sensor that informs the controller 104 of a current position of the given actuator. The communicative coupling between a given actuator and a given position sensor may take the form of the given position sensor being integrated with the given actuator. For example, the seat actuators 172 of the first and second seating assemblies 332, 336 can each be communicatively coupled with corresponding seat position sensors 280, the seatback actuator 168 of the first seating assembly 332 can be communicatively coupled with the seatback position sensor 276, and the lower leg support actuator 176 can be communicatively coupled with a lower leg support position sensor 404. Accordingly, upon receipt of the request signal to adjust the arrangement of the passenger compartment 140 from the design arrangement to the relaxation arrangement, the controller 104 may have already stored a current position of each relevant component of the first and second seating assemblies 332, 336.

Referring again to FIGS. 14A-15, in transitioning the passenger compartment 140 from the design arrangement to the relaxation arrangement, a step 408 of actuating the seat 204 of the second seating assembly 336 in an upward direction toward the upwardly-stowed position. Additionally, a step 412 of adjusting an angular orientation of the seatback 200 of the first seating assembly 332 relative to the seatbase 228 of the first seating assembly 332 such that the seatback 200 of the first seating assembly 332 is placed in a reclined position is performed. Further, a step 416 of actuating the seat 204 of the first seating assembly 332 in an upward direction to place the seat 204 of the first seating assembly 332 in a more inclined orientation relative to the seatback 228. Further, the adjustment of the arrangement from the design arrangement to the relaxation arrangement includes step 420 of actuating the lower leg support 208 of the first seating assembly 332 from a retracted position toward an extended position. Upon making these adjustments to the first seating assembly 332 and the second seating assembly 336, the passenger compartment 140 will have been successfully adjusted from the first arrangement 392 (design arrangement) to the second arrangement 400 (relaxation arrangement). Upon reaching the relaxation arrangement, a predetermined idle time 424 may be provided to the occupant of the first seating assembly 332. The predetermined idle time 424 may be selected by the occupant of the first seating assembly 332. For example, the occupant of the first seating assembly 332 may decide that they want to rest for a given period of time during their occupancy of the vehicle 100. Accordingly, upon the idle time 424 having lapsed, the occupant of the first seating assembly 332 may be prompted regarding whether they would like to return to the design arrangement, thereby providing a decision point 428. Alternatively, the occupant of the first seating assembly 332 may select whether they want the arrangement of the passenger compartment 140 to return to a given arrangement (e.g., the design arrangement) upon the idle time 424 having lapsed. In such an example, the occupant may be gently awoken from a rest period by the slow actuation of the first seating assembly 332 from the relaxation arrangement to the design arrangement.

Referring further to FIGS. 14A-15, with regard to the decision point 428 of whether the occupant of the first seating assembly 332 would like to return to the design arrangement, in the event the occupant of the first seating assembly 332 elects to not return to the design arrangement, the process may exit at step 432 such that the occupant will not be prompted again to exit the relaxation arrangement. In such an example, the occupant of the first seating assembly 332 may interact with the user interface 120 at a later time to adjust the arrangement of the passenger compartment 140, if so desired. However, if the occupant of the first seating assembly 332 elects to exit the relaxation arrangement and return to the design arrangement at decision point 428, the process of adjusting the arrangement of the passenger compartment 140 will generally be reversed to return to the design arrangement from the relaxation arrangement. In such an example, the election of the occupant of the first seating assembly 332 to return to the design arrangement at decision point 428 may be treated as a prompt 436 or request signal communicated to the controller 104. In returning to the design arrangement from the relaxation arrangement, the lower leg support 208 of the first seating assembly 332 may be actuated to the retracted position at step 440. Additionally, the seat 204 of the first seating assembly 332 may decrease an angle of inclination of the seat 204 relative to the seatbase 228 of the first seating assembly 332 at step 444. Further, the seatback 200 of the first seating assembly 332 is actuated from the reclined position toward the upright position at step 448. Finally, at step 452, the seat 204 of the second seating assembly 336 can be actuated to the downwardly-deployed position, thereby completing the transition from the second arrangement 400 (relaxation arrangement) to the first arrangement 392 (design arrangement).

Figure 17:
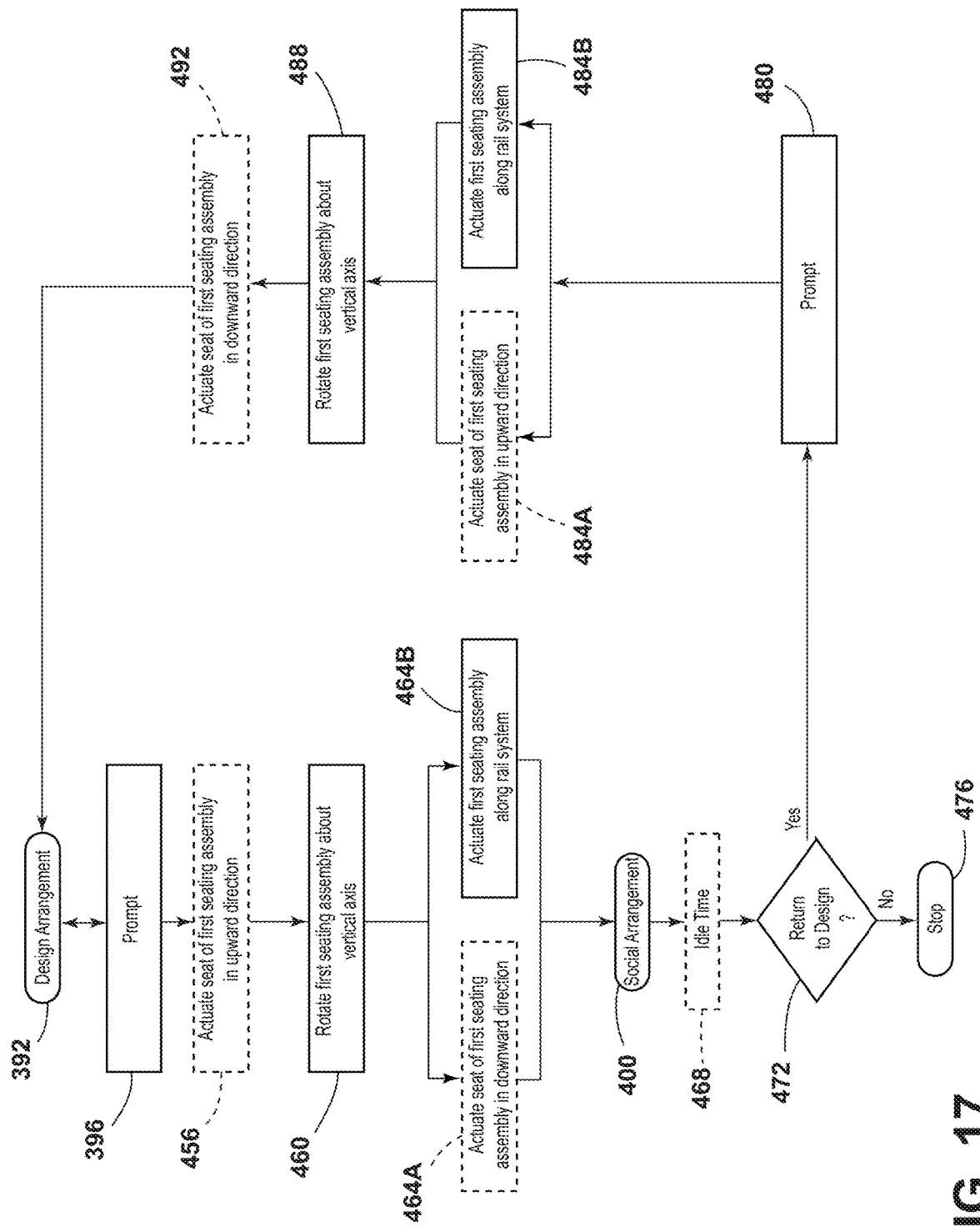
FIG. 17 is a flow diagram illustrating steps in transitioning between the design arrangement to the social arrangement, according to one example.

Referring to FIGS. 16A-17, a transition from the design arrangement (FIG. 16A) to the social arrangement (FIG. 16B) is depicted according to one example. An arrangement of the passenger compartment 140 is initially in the first arrangement 392, such as the design arrangement. In deciding to exit the first arrangement 392, the user communicates a request signal to the controller 104 (e.g., by way of the user interface 120), which can constitute the prompt 396 to transition the passenger compartment 140 from the first arrangement 392 to the second arrangement 400. In the depicted example, the second arrangement 400 is the social arrangement. In response to the request signal or prompt 396, the controller 104 may initiate the transition from the first arrangement 392 to the second arrangement 400 by transmitting instruction signals to various actuators of the first seating assembly 332. The relevant actuator for the transition from the design arrangement to the social arrangement is at least the swivel actuator 180 of the first seating assembly 332. The swivel actuator 180 of the first seating assembly 332 is communicatively coupled to the swivel position sensor 284 of the first seating assembly 332. The swivel position sensor 284 of the first seating assembly 332 informs the controller 104 of a current position of the swivel actuator 180 of the first seating assembly 332. The communicative coupling between the swivel actuator 180 and the swivel position sensor 284 may take the form of the swivel position sensor 284 being integrated with the swivel actuator 180. Accordingly, upon receipt of the request signal to adjust the arrangement of the passenger compartment 140 from the design arrangement to the social arrangement, the controller 104 may have already stored a current position of the swivel actuator 284.

Referring again to FIGS. 16A-17, in transitioning the passenger compartment 140 from the design arrangement to the social arrangement, a step 456 of actuating the seat 204 of the first seating assembly 332 in an upward direction toward the upwardly-stowed position may be employed. Depending upon an available clearance between the first seating assembly 332 and an immediately adjacent environment, actuating the seat 204 of the first seating assembly 332 toward the upwardly-stowed position may be omitted at step 456. Additionally, in transitioning the passenger compartment 140 from the design arrangement to the social arrangement, rotating the first seating assembly 332 about the vertical axis 268 thereof may be accomplished at step 460. For example, the rotation of the first seating assembly 332 about the vertical axis 268 thereof may be accomplished by activating the swivel actuator 180 of the first seating assembly 332 such that the first seating assembly 332 is rotated along a travel path of the associated swivel assembly 260. The rotation of the first seating assembly 332 about the vertical axis may place the first seating assembly 332 in a rearward-facing orientation. In either a simultaneous or sequential manner, transitioning the passenger compartment 140 from the design arrangement to the social arrangement can include steps 464A of actuating the seat 204 of the first seating assembly 332 to the downwardly-deployed position and step 464B of actuating the first seating assembly 332 along the rail system 316 in a vehicle-forward direction. By actuating the first seating assembly 332 in the vehicle-forward direction, a distance between the first seating assembly 332 and the second seating assembly 336 may be increased, thereby providing additional space for the legs of occupants of the first and second seating assemblies 332, 336. Upon completion of steps 464A and 464B, either simultaneously or sequentially, the passenger compartment 140 has successfully been placed in the second arrangement 400 of the social arrangement. The controller 104 can provide a predetermined idle time 468 to maintain the arrangement of the passenger compartment 140 in the social arrangement. For example, the predetermined idle time 468 may be the duration of a travel time of the vehicle 100 as the occupants of the passenger compartment 140 are transported from their pickup location to their desired destination. Following the completion of the predetermined idle time 468, the controller 104 may prompt the user regarding whether or not to return the passenger compartment 140 to the design arrangement at decision point 472. If the occupant selects not to return the arrangement of the passenger compartment 140 to the design arrangement, then the process may be exited at step 476 such that the occupants will not be prompted again to exit the social arrangement. In such an example, the occupant or occupants of the passenger compartment 140 may interact with the user interface 120 at a later time to adjust the arrangement of the passenger compartment 140 if so desired.

Referring again to FIGS. 16A-17, if the occupant or occupants of the passenger compartment 140 elect to exit the social arrangement and returned to the design arrangement at decision point 472, the process of adjusting the arrangement of the passenger compartment 140 will generally be reversed to return to the design arrangement from the social arrangement. In such an example, the election of the occupant or occupants of the passenger compartment 140 to return to the design arrangement at decision point 472 may be treated as a prompt 480 or request signal communicated to the controller 104. In returning to the design arrangement from the social arrangement, the seat 204 of the first seating assembly 332 may be optionally actuated toward the upwardly-stowed position at step 484A and the first seating assembly 332 may be actuated along the rail system 316 in the vehicle-rearward direction, in either a simultaneous or sequential manner. In determining whether to employ optional step 484A of adjusting the seat 204 of the first seating assembly 332 toward the upwardly-stowed position, the controller 104 may reference the occupancy sensor 156 of the first seating assembly 332 to determine whether the first seating assembly 332 is presently occupied. Of course, upon a determination by the controller 104 that the first seating assembly 332 is occupied, then the optional step 484A of actuating the seat 204 of the first seating assembly 332 toward the upwardly-stowed position may be omitted as such an adjustment is likely to be challenging while the first seating assembly 332 is occupied. In step 484B, the controller 104 activates the translation actuator 184 of the first seating assembly 332 to actuate the first seating assembly 332 along the rail system 316 in the vehicle-rearward direction. In transitioning the passenger compartment 140 from the social arrangement to the design arrangement, step 488 of rotating the first seating assembly 332 about the vertical axis 268 thereof can be executed such that the first seating assembly 332 is returned to a forward-facing orientation, as depicted in FIG. 16A. If the controller 104 determined that the first seating assembly 332 is unoccupied by referencing the occupancy sensor 156 of the first seating assembly 332, then the transition from the social arrangement to the design arrangement may include step 492 of actuating the seat 204 of the first seating assembly 332 toward the downwardly-deployed position. Upon the completion of step 488 and/or step 492, the process will have successfully adjusted the arrangement of the passenger compartment 140 from the social arrangement to the design arrangement.

Figure 18:
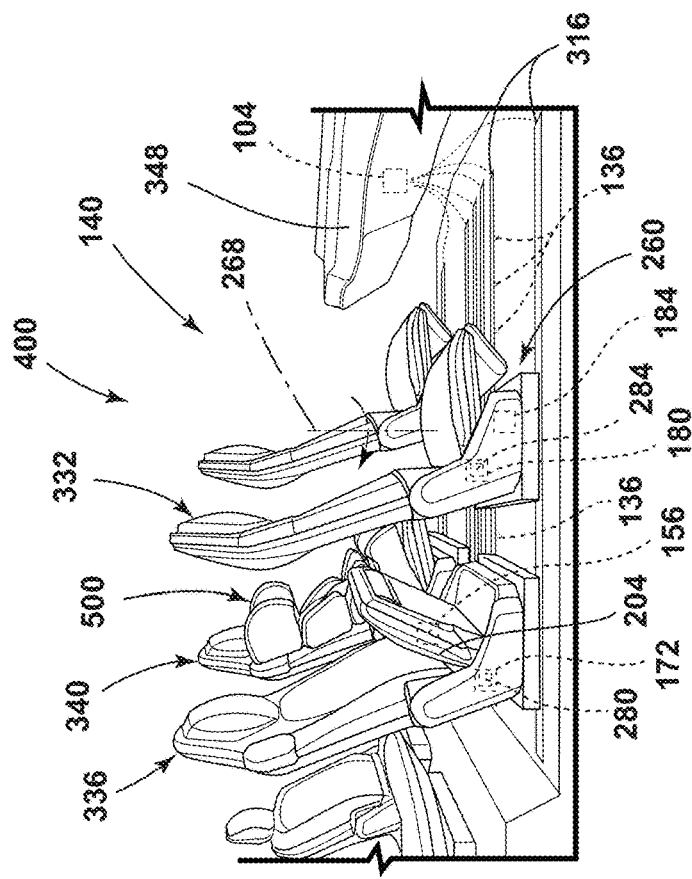
FIG. 18A is a side view of the passenger compartment, illustrating the first seating assembly and the second seating assembly in the design arrangement, according to one example.
FIG. 18B is a side view of the passenger compartment, illustrating the first seating assembly and the second seating assembly in the child care arrangement, according to one example.
Figure 19:
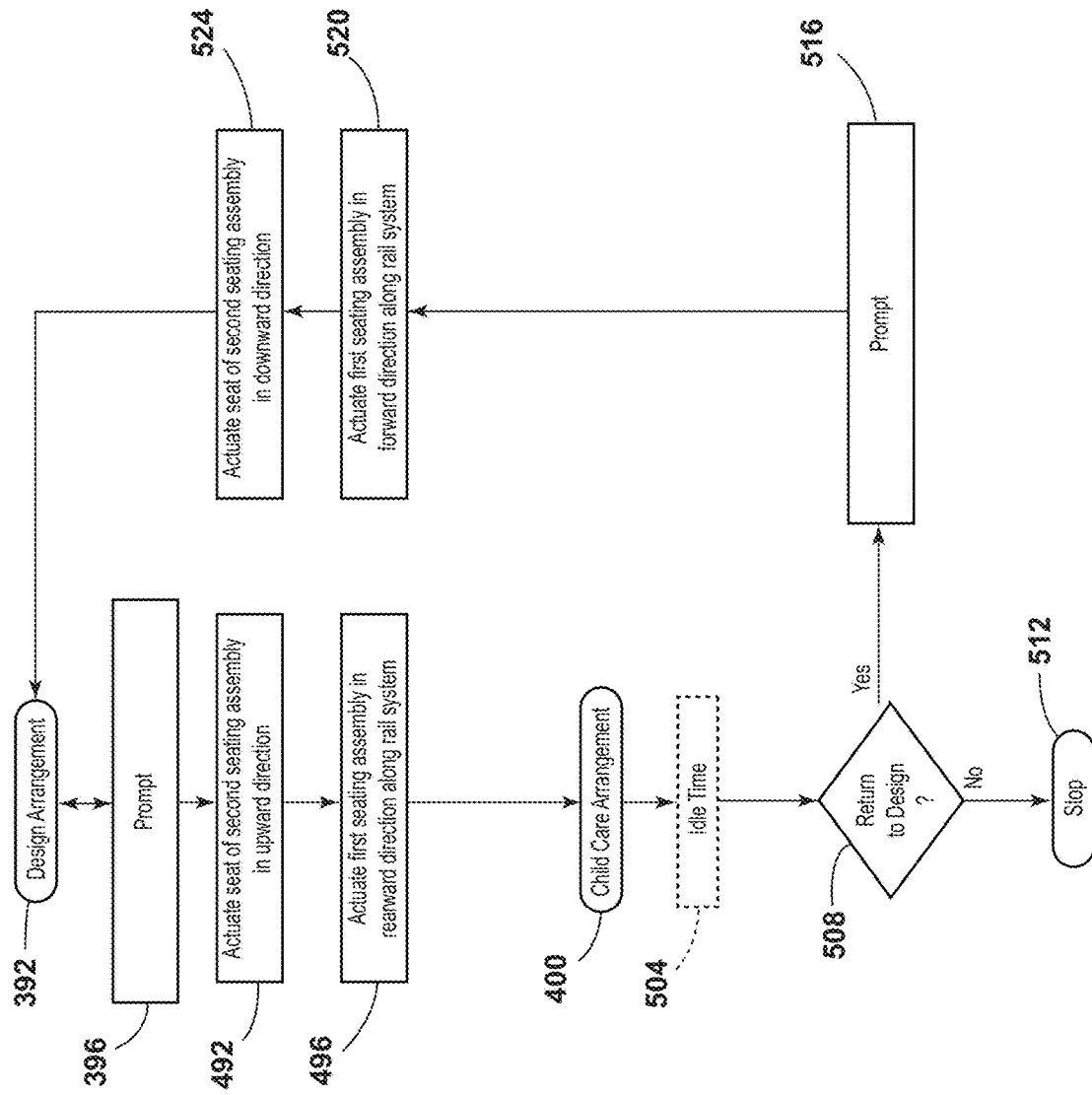
FIG. 19 is a flow diagram illustrating steps in transitioning between the design arrangement to the child care arrangement, according to one example.

Referring to FIGS. 18A-19, a transition from the design arrangement (FIG. 18A) to the child care arrangement (FIG. 18B) is depicted according to one example. An arrangement of the passenger compartment 140 is initially in the first arrangement 392, such as the design arrangement. In deciding to exit the first arrangement 392, the user communicates a request signal to the controller 104 (e.g., by way of the user interface 120), which can constitute the prompt 396 to transition the passenger compartment 140 from the first arrangement 392 to the second arrangement 400. In the depicted example, the second arrangement 400 is the child care arrangement. In response to the request signal or prompt 396, the controller 104 may initiate the transition from the first arrangement 392 to the second arrangement 400 by transmitting instruction signals to various actuators of the first and second seating assemblies 332, 336. Each of the actuators utilized in the transition from the design arrangement to the child care arrangement may be communicatively coupled to a corresponding position sensor that informs the controller 104 of a current position of the given actuator. The communicative coupling between a given actuator and a given position sensor may take the form of the given position sensor being integrated with the given actuator. For example, the seat actuator 172 of the second seating assembly 336 may be communicatively coupled with the seat position sensor 280, the swivel actuator 180 of the first seating assembly 332 may be communicatively coupled with the swivel position sensor 284, and the translation actuator 184 may be communicatively coupled to the rail position sensors or rail sensors 136 (e.g., by way of the controller 104). Accordingly, upon receipt of the request signal to adjust the arrangement of the passenger compartment 140 from the design arrangement to the child care arrangement, the controller 104 may have already stored a current position of each relevant component of the first and second seating assemblies 332, 336, including a current rail position of at least the first seating assembly 332.

Referring again to FIGS. 18A-19, in transitioning the passenger compartment 140 from the design arrangement to the child care arrangement, a step 492 of actuating the seat 204 of the second seating assembly 336 in an upward direction toward the upwardly-stowed position may be executed. Prior to execution of the actuation of the seat 204 of the second seating assembly 336 toward the upwardly-stowed position, the occupancy sensor 156 of the second seating assembly 336 may be referenced to detect whether an occupant is currently seated in the second seating assembly 336. In the event of detection of an occupant in the second seating assembly 336 when a transition to the child care arrangement has been requested, a prompt, error message, or other type of notification may be provided to the user requesting adjustment to the child care arrangement regarding the unavailability of the child care arrangement due to the occupancy status of the second seating assembly 336.

Referring again to FIGS. 18A-19, in a simultaneous or sequential manner relative to the actuation of the seat 204 of the second seating assembly 336 toward the upwardly-stowed position, the translation actuator 184 of the first seating assembly 332 may be activated to actuate the first seating assembly 332 in a rearward direction toward the second seating assembly 336 at step 496. Upon actuation of the seat 204 of the second seating assembly 336 to the upwardly-stowed position and actuation of the first seating assembly 332 in the vehicle-rearward direction along the rail system 316, the arrangement of the passenger compartment 140 will have arrived at the second arrangement 400, which is the child care arrangement in the present example. In some examples, the child care arrangement may further include activating the swivel actuator 180 such that the swivel assembly 260 is actuated about the vertical axis 268 and the first seating assembly 332 is rotated toward the second seating or the third seating assembly 340. In various examples, the third seating assembly may be provided with a secondary seating assembly 500, with the secondary seating assembly 500 being configured to receive occupants of a smaller stature. Upon completion of the transition from the design arrangement to the child care arrangement, the process may provide a predetermined idle time 504. The predetermined idle time 504 may be sent by the user or programmed into the controller 104. For example, the predetermined idle time 504 may be chosen based upon an anticipated average period of time that an occupant of the first seating assembly 332 (e.g., a parent or caregiver) spends assisting an occupant of the third seating assembly 340 (e.g., a child) with a variety of common occurrences when transporting or commuting within a vehicle 100 with a child (e.g., assisting with food consumption, assisting with drink consumption, providing entertainment, comforting, and so on). Upon the idle time 504 having elapsed, the occupant of the first seating assembly 332 may be prompted regarding whether they would like to return to the design arrangement, thereby providing a decision point 508. In the event that the occupant of the first seating assembly 332 elects to not return to the design arrangement, the process may exit at step 512 such that the occupant will no longer be prompted to exit the child care arrangement. In such an example, the occupant of the first seating assembly 332 may interact with the user interface 120 at a later time to adjust the arrangement of the passenger compartment 140, if so desired. However, if the occupant of the first seating assembly 332 elects to exit the child care arrangement and return to the design arrangement at decision point 508, then the process of adjusting the arrangement of the passenger compartment 140 will generally be reversed to return the arrangement to the design arrangement from the child care arrangement. In such an example, the election of the occupant of the first seating assembly 332 to return to the design arrangement at decision point 508 may be treated as a prompt 516 or request signal communicated to the controller 104.

Referring again to FIGS. 18A-19, in returning to the design arrangement from the child care arrangement, the first seating assembly 332 is actuated in a vehicle-forward direction along the rail system 316 by the translation actuator 184 of the first seating assembly 332 at step 520. Simultaneously or sequentially, the seat 204 of the second seating assembly 336 is actuated in a downward direction to the downwardly-deployed position by the seat actuator 172 of the second seating assembly 336 at step 524. Upon completion of step 524, the arrangement of the passenger compartment 140 will have been transitioned from the second arrangement 400 back to the first arrangement 392, which transitions the arrangement of the passenger compartment 140 from the child care arrangement back to the design arrangement in the depicted example. In examples where the child care arrangement further includes rotating the first seating assembly 332 about the vertical axis 268, the return of the arrangement of the passenger compartment 140 further includes activating the swivel actuator 180 such that the first seating assembly 332 is rotated about the vertical axis 268 of the first seating assembly 332.

Figure 21:
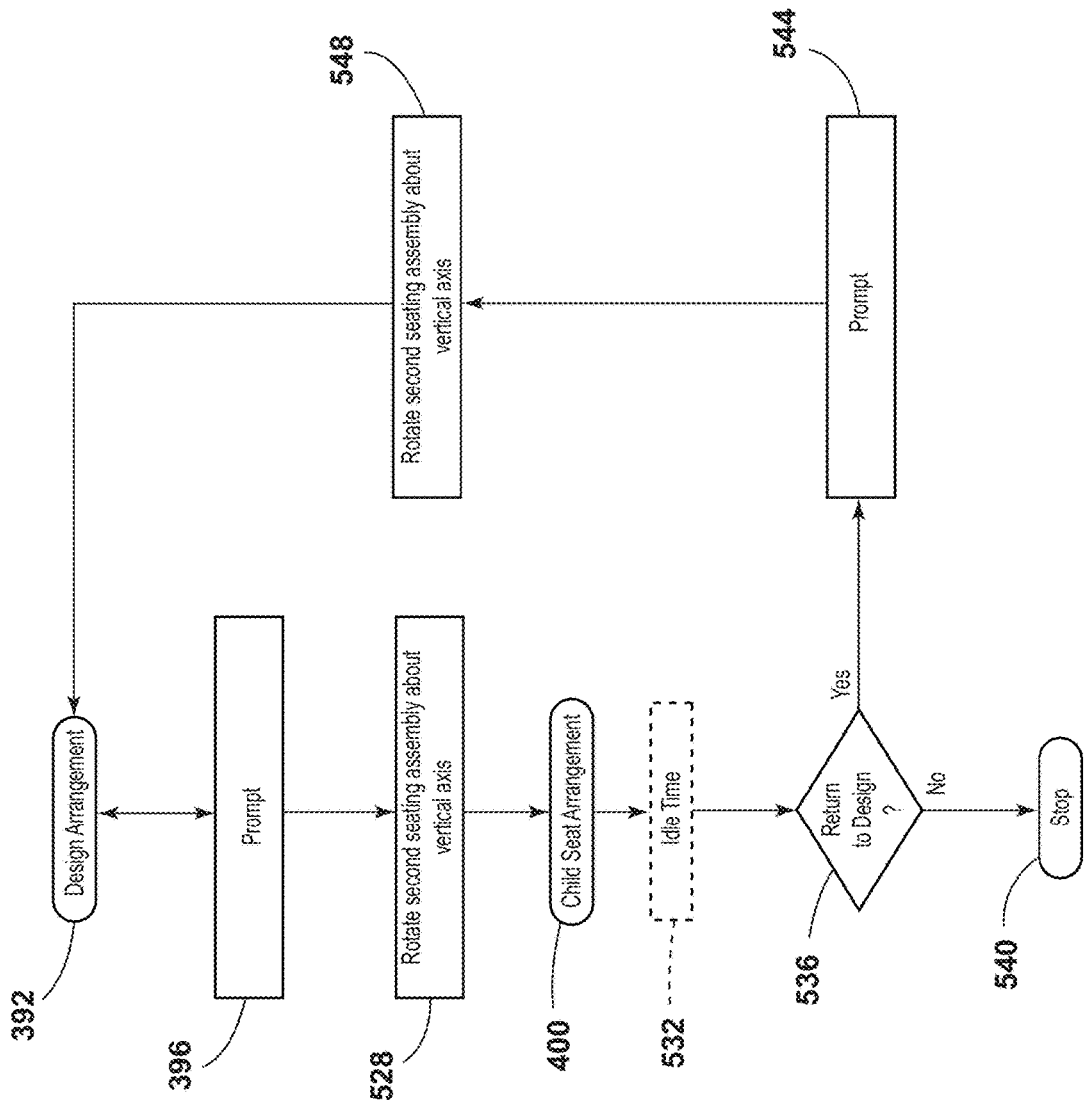
FIG. 21 is a flow diagram illustrating steps in transitioning between the design arrangement to the child seat arrangement, according to one example.

Referring now to FIGS. 20A-21, a transition from the design arrangement (FIG. 20A) to the child seat arrangement (FIG. 20B) is depicted according to one example. An arrangement of the passenger compartment 140 is initially in the first arrangement 392, such as the design arrangement. In deciding to exit the first arrangement 392, the user communicates a request signal to the controller 104 (e.g., by way of the user interface 120), which can constitute the prompt 396 to transition the passenger compartment 140 from the first arrangement 392 to the second arrangement 400. In the depicted example, the second arrangement 400 is the child seat arrangement. In response to the request signal or prompt 396, the controller 104 may initiate the transition from the first arrangement 392 to the second arrangement 400 by transmitting instruction signals to the swivel actuator 180 of the second seating assembly 336. As with previous examples, the swivel actuator 180 may be communicatively coupled with the swivel position sensor 284. Additionally, the swivel position sensor 284 is communicatively coupled to the controller 104 such that the controller 104 is informed of a current position of the swivel actuator 180. Accordingly, upon receipt of the request signal to adjust the arrangement of the passenger compartment 140 from the design arrangement to the child seat arrangement, the controller 104 may have already stored a current position of the swivel assembly 260 and/or the swivel actuator 180.

Referring again to FIGS. 20A-21, in transitioning the passenger compartment 140 from the design arrangement to the child seat arrangement, the controller 104 may reference the current position of the second seating assembly 336 that is provided by the swivel position sensor 284, as well as the routines 116 stored within the memory 112 of the controller 104 to determine a degree of actuation necessary to execute the requested adjustment of the second seating assembly 336 to the child seat arrangement. Prior to execution of the actuation of the second seating assembly 336 by the swivel actuator 180, the controller 104 may reference the occupancy sensor 156 of the second seating assembly 336 to determine that the second seating assembly 336 is capable of receiving an occupant (e.g., that the second seating assembly 336 is unoccupied). In the event of detection of an occupant in the second seating assembly 336 when a transition to the child seating arrangement has been requested, a prompt, error message, or other type of notification may be provided to the user requesting adjustment to the child seat arrangement regarding the unavailability of the second seating assembly 336 for use in the child seat arrangement due to the occupancy status of the second seating assembly 336. In such a situation, the user may be presented with alternative seating positions within the passenger compartment 140 that have been identified as seating assemblies 124 that are presently unoccupied. Upon determination that the second seating assembly 336, or another of the seating assemblies 124, is available to receive an occupant and therefore may be placed in the child seat arrangement, the controller 104 transmits instruction signals to activate the swivel actuator 180 of the second seating assembly 336 such that the second seating assembly 336 is rotated about the vertical axis 268 thereof at step 528. The degree of rotation about the vertical axis 268 of the second seating assembly 336 to accomplish the transition from the design arrangement to the child seat arrangement is about ninety degrees (90°) in a clockwise direction in the depicted example. However the present disclosure is not so limited. Rather, accomplishing the child seat arrangement for one of the seating assemblies 124 that is not the first seating assembly 332 or the second seating assembly 336 may require a different degree of rotation and/or a different direction of rotation. For example, in the event that the third seating assembly 340 or the fourth seating assembly 344 were to be utilized for completion of the child seat arrangement, the third seating assembly 340 or the fourth seating assembly 344 would require a rotation about their corresponding vertical axis 268 in a counter-clockwise direction of about ninety degrees (90°). In the event that one of the seating assemblies 124 in the third row 152 were to be utilized as the seating assembly 124 during the child seat arrangement, the chosen seating assembly 124 may be rotated in either a clockwise or counter-clockwise direction by about one-hundred-eighty degrees (180°) such that the seating assembly 124 was transitioned from a forward-facing orientation to a rearward-facing orientation. Regardless of the direction of rotation, the degree of rotation, and the specific seating assembly 124 utilized for execution of the transition from the design arrangement to the child seat arrangement, as discussed above, a general goal of the child seat arrangement is to present a seating surface of one of the seating assemblies 124 that is immediately adjacent to one of the access doors (e.g., a side-access door or a rear lift gate). In the depicted example, upon completion of the rotation of the second seating assembly 336 about the vertical axis 268 thereof by about ninety degrees (90°) in a clockwise direction, as set forth at step 528, the passenger compartment 140 will have successfully been placed in the second arrangement 400, which is the child seat arrangement.

Referring further to FIGS. 20A-21, upon completion of the transition to the second arrangement 400, the process may be provided with a predetermined idle time 532. Alternatively, the controller 104 may maintain the child seat arrangement of the passenger compartment 140 until instructed otherwise by the user (e.g., via the user interface 120). In examples that employ the predetermined idle time 532, the predetermined idle time 532 may be set by the user or programmed into the controller 104. The predetermined idle time 532 may correspond to a typical period of time for situating a child or smaller statured occupant into the second seating assembly 336. Similarly, the predetermined idle time 532 may correspond to a typical amount of time for an adult occupant to become situated in the second seating assembly 336. Accordingly, while referred to as a child seat arrangement, it is contemplated that the child seat arrangement may similarly be beneficial for adult occupants during ingress or egress from the vehicle 100. Regardless of whether the occupant of the presented seating assembly 124 (e.g., the second seating assembly 336 in the depicted example) is an adult or child, following the successful completion of the transition of the passenger compartment 140 from the first arrangement 392 to the second arrangement 400 and/or the predetermined idle time 532 having elapsed, when employed, the user may be presented with a prompt regarding whether they would like to return to the design arrangement, thereby providing a decision point 536. In the event that the occupant of the second seating assembly 336 elects not to return to the design arrangement, the process may exit at step 540 such that the occupant or user will no longer be prompted to exit the child seat arrangement. In such an example, the occupant of the second seating assembly 336 or the user may interact with the user interface 120 at a later time to adjust the arrangement of the passenger compartment 140, if so desired. However if the occupant of the second seating assembly 336 or the user elects to exit the child seat arrangement and return to the design arrangement at decision point 536, then the process of adjusting the arrangement of the passenger compartment 140 will generally be reversed to return to the design arrangement from the child seat arrangement. In such an example, the election of the occupant of the second seating assemblies 336 or the user to return to the design arrangement at decision point 536 may be treated as a prompt 544 or request signal communicated to the controller 104. In returning to the design arrangement from the child seat arrangement, the second seating assembly 336 is rotated about the vertical axis 268 thereof by activation of the swivel actuator 180. More specifically, the second seating assembly 336 is rotated about the vertical axis 268 thereof by the swivel actuator 180 in a clockwise direction by about ninety degrees (90°) at step 548. Upon completion of the rotation in the counter-clockwise direction at step 548, the second seating assembly 336 may be returned to a forward-facing orientation and the passenger compartment 140 will have resumed the design arrangement.

Figure 22A:
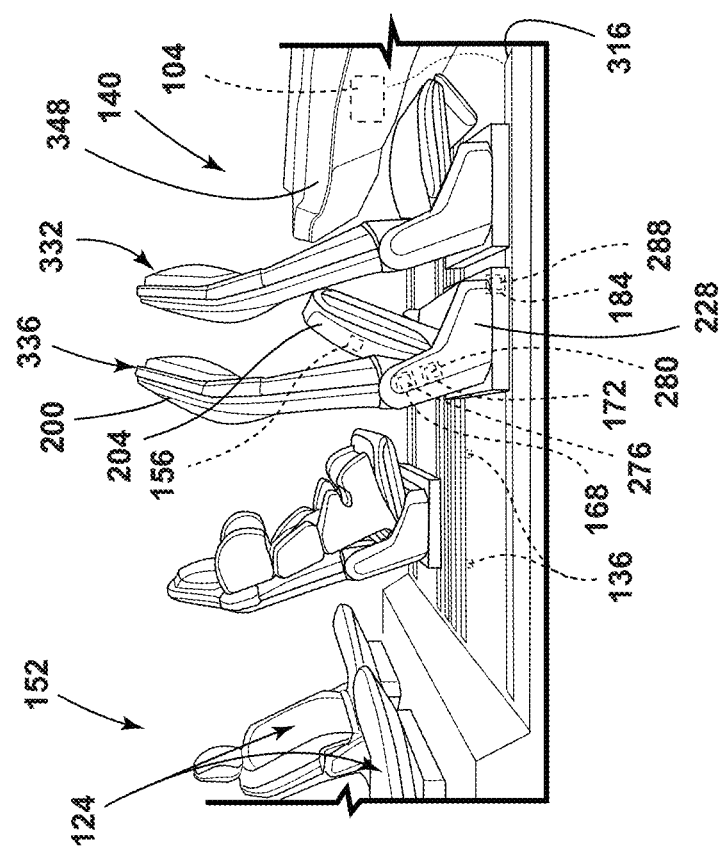
FIG. 22A is a side view of the passenger compartment, illustrating the first seating assembly and the second seating assembly in the design arrangement, according to one example.
Figure 22B:
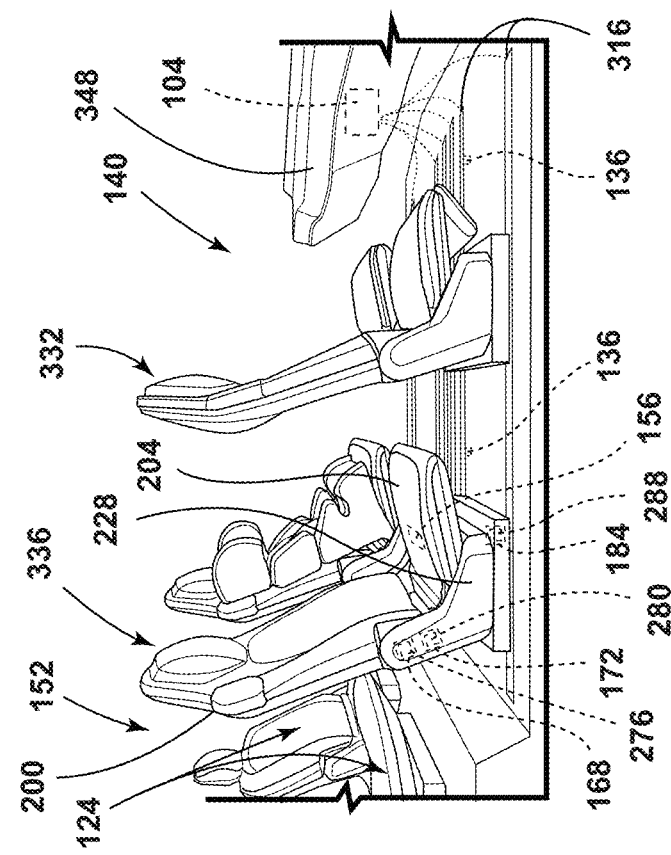
FIG. 22B is a side view of the passenger compartment, illustrating the first seating assembly and the second seating assembly in the ingress/egress arrangement, according to one example.
Figure 23:
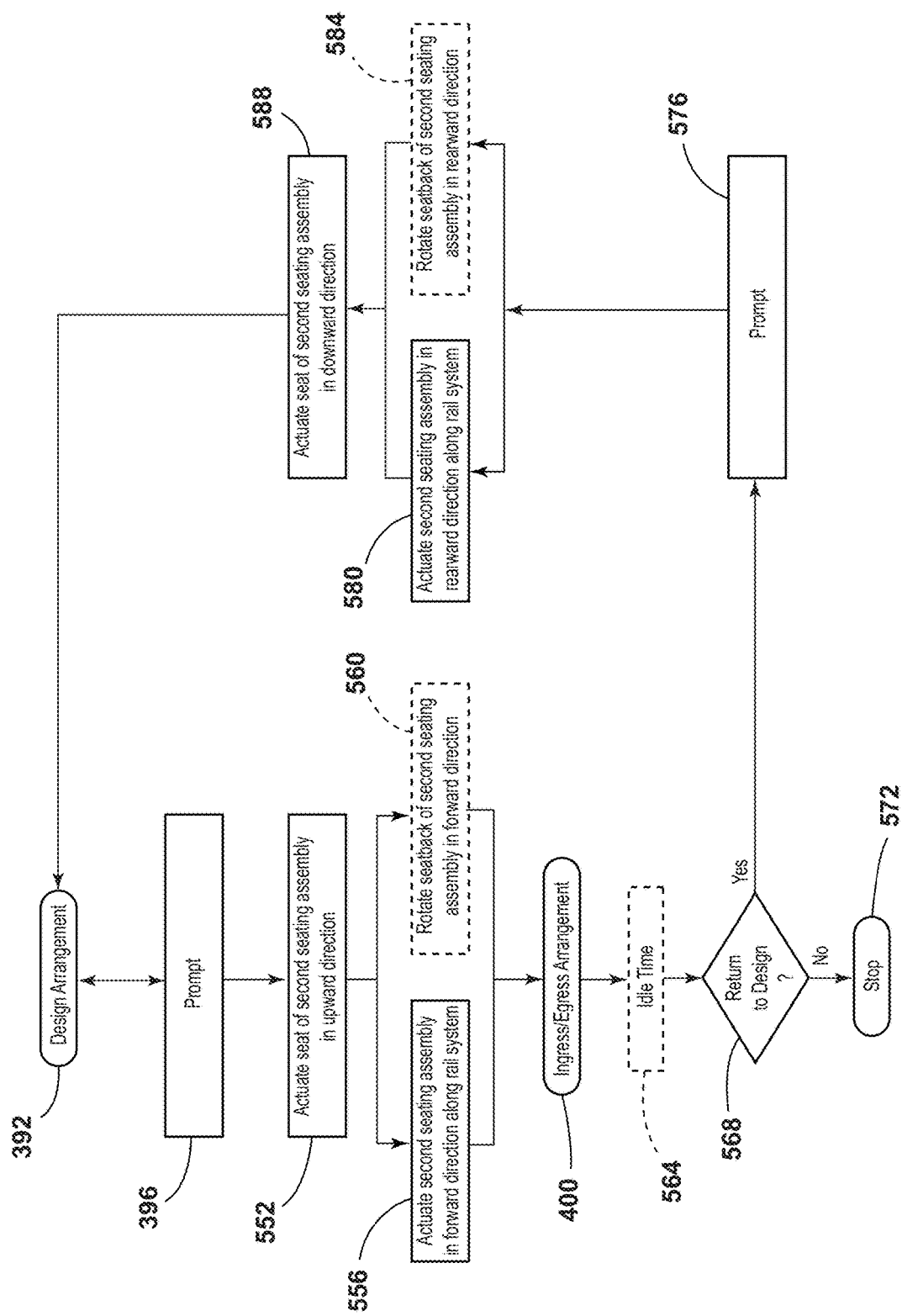
FIG. 23 is a flow diagram illustrating steps in transitioning between the design arrangement to the ingress/egress arrangement, according to one example.

Referring to FIGS. 22A-23, a transition from the design arrangement (FIG. 22A) to the ingress/egress arrangement (FIG. 22B) is depicted according to one example. An arrangement of the passenger compartment 140 is initially in the first arrangement 392, such as the design arrangement. In deciding to exit the first arrangement 392, the user communicates a request signal to the controller 104 (e.g., by way of the user interface 120), which can constitute the prompt 396 to transition the passenger compartment 140 from the first arrangement 392 to the second arrangement 400. In the depicted example, the second arrangement 400 is the ingress/egress arrangement. In response to the request signal or prompt 396, the controller 104 may initiate the transition from the first arrangement 392 to the second arrangement 400 by transmitting instruction signals to the second seating assembly 336. As with previous examples, the relevant actuators may be communicatively coupled with the controller 104. Similarly, the relevant position sensors can be communicatively coupled to the controller 104. In the depicted example, at least the seat actuator 172 and the translation actuator 184 of the second seating assembly 336 are employed to transition the passenger compartment 140 from the design arrangement to the ingress/egress arrangement. In some examples, the seat actuator 168 of the second seating assembly 336 may also be employed. In the illustrated example, the rail sensors 136, the seatback position sensor 276, the seat position sensor 280, and/or the translation position sensor 288 are communicatively coupled with the controller 104 such that the controller 104 is informed of a current position of each component of the associated sensors. Accordingly, upon receipt of the request signal to adjust the arrangement of the passenger compartment 140 from the design arrangement to the ingress/egress arrangement, the controller 104 may have already stored a current position of the second seating assembly 336 along the rail system 316, a position of the seatback 200 relative to the seatbase 228, a position of the seat 204 relative to the seatbase 228, and may have a number of rotations necessary of the translation actuator 184 for transitioning the arrangement of the passenger compartment 140 from the first arrangement 392 to the second arrangement 400 available (e.g., within the routines 116 of the memory 112) as the first arrangement 392 and the second arrangement 400 are pre-set or predetermined arrangements.

Referring again to FIGS. 22A-23, in transitioning the passenger compartment 140 from the design arrangement to the ingress/egress arrangement, the controller 104 may reference the current position of the seat 204 of the second seating assembly 336 that is provided by the seat position sensor 280 of the second seating assembly 336, as well as the routines 116 stored within the memory 112 of the controller 104 to determine a degree of actuation necessary to execute at least a portion of the requested adjustment of the passenger compartment 140. For example, the controller 104 may determine that the seat 204 of the second seating assembly 336 is in the downwardly-deployed position and that actuation of the seat 204 to the upwardly-stowed position is necessary to transition from the design arrangement to the ingress/egress arrangement. Prior to execution of the transition from the design arrangement to the ingress/egress arrangement, the controller 104 may reference the occupancy sensor of the second seating assembly 336 to determine that the second seating assembly 336 is unoccupied. In the event of detection of an occupant in the second seating assembly 336 when the transition to the ingress/egress arrangement has been requested, a prompt, error message, or other type of notification may be provided to the user requesting adjustment to the ingress/egress arrangement regarding the unavailability of such a transition due to the occupancy status of the second seating assembly 336. However, upon determination that the second seating assembly 336 is unoccupied and available to transition to the ingress/egress arrangement, the controller 104 transmits instruction signals to activate the transition of the seat 204 of the second seating assembly 336 from the downwardly-deployed position to the upwardly-stowed position, as previously outlined. Optionally, the seatback 200 of the second seating assembly 336 may be actuated in a forward direction (i.e., in a clockwise direction as depicted) to provide additional space or clearance when in the ingress/egress arrangement. In such an example, the controller 104 transmits instruction signals to the seatback actuator 168 and references the seatback position sensor 276 in determining the current position of the seatback 200, a degree of actuation necessary to adjust the position of the seatback 200, and/or determine when to cease actuation of the seatback actuator 168.

Referring further to FIGS. 22A-23, in transitioning the passenger compartment 140 from the design arrangement to the ingress/egress arrangement, the translation actuator 184 of the second seating assembly 336 is activated by the controller 104 such that the second seating assembly 336 is translated in a vehicle-forward direction along the rail system 316. The rail sensors 136 may be employed to determine the current position of the second seating assembly 336 along the rail system 316. An additional sensor may be provided in each of the seating assemblies 124 that is coupled to the rail system 316 (e.g., the second seat seating assembly 336) that interacts with the rail sensors 136 such that the controller 104 may determine a relative position of the second seating assembly 336 in relation to the rail sensors 136. This additional sensor may be integrated with the translation actuator 184 and/or the translation position sensor 288. The controller 104 activates the translation actuator 184 such that the translation actuator 184 actuates the second seating assembly 336 along the rail system 316 in the vehicle-forward direction, thereby decreasing a distance between the first seating assembly 332 and the second seating assembly 336 while also increasing a distance between the second seating assembly 336 and the third row 152. Upon receiving the prompt 396 to transition the passenger compartment 140 from the first arrangement 392 to the second arrangement 400, the controller 104 can transmit the instruction signals to adjust the position of the seat 204 of the second seating assembly 336 to the upwardly-stowed position at step 552. In a simultaneous or sequential manner, the process may begin execution of the adjustment of the second seating assembly 336 in the vehicle-forward direction by activating the translation actuator 184 at step 556 and initiate adjustment of the seatback 200 of the second seating assembly 336 to rotate in the forward direction by activating the seatback actuator 168 at optional step 560. Upon completion of at least rotating the seat 204 to the upwardly-stowed position at step 552 and actuating the second seating assembly 336 in the vehicle-forward direction at step 556, the second arrangement 400 may have been realized. The process may provide the user with a predetermined idle time 564 that corresponds to allowing occupants of the third row 152 time to get situated within the seating assemblies 124 positioned therein.

Referring still further to FIGS. 22A-23, following successful completion of the adjustment to the second arrangement 400 and/or the predetermined idle time 564 having elapsed, the user may be presented with a decision point 568 asking the user whether they would like to return to the design arrangement. In the event that the user elects that they would not like to return to the design arrangement at decision point 568, the process may exit at step 572 such that the occupant or user will no longer be prompted to exit the ingress/egress arrangement. In such an example, the user may interact with the user interface 120 at a later time to adjust the arrangement of the passenger compartment 140, if so desired. However, if the user elects to exit the ingress/egress arrangement and return to the design arrangement at decision point 568, then the process of adjusting the arrangement of the passenger compartment 140 will generally be reversed to return to the design arrangement from the ingress/egress arrangement. In such an example, the election of the user to return to the design arrangement at decision point 568 may be treated as a prompt 576 or request signal communicated to the controller. In returning to the design arrangement from the ingress/egress arrangement, the second seating assembly 336 is actuated in a vehicle-rearward direction by activation of the translation actuator 184 at step 580. If the seatback 200 of the second seating assembly 336 was rotated in the forward direction at step 560, then in returning to the design arrangement, the seatback 200 of the second seating assembly 336 may be rotated in the rearward direction (i.e., in a counter-clockwise direction as depicted) at optional step 584. As the seat 204 of the second seating assembly 336 was placed in the upwardly-stowed position during the ingress/egress arrangement, the seat 204 of the second seating assembly 336 is actuated to the downwardly-deployed position at step 588 by activation of the seat actuator 172 of the second seating assembly 336. Upon completion of steps 580, 584, and/or 588, the passenger compartment 140 has successfully transitioned from the ingress/egress arrangement back to the design arrangement.

Figure 24B:
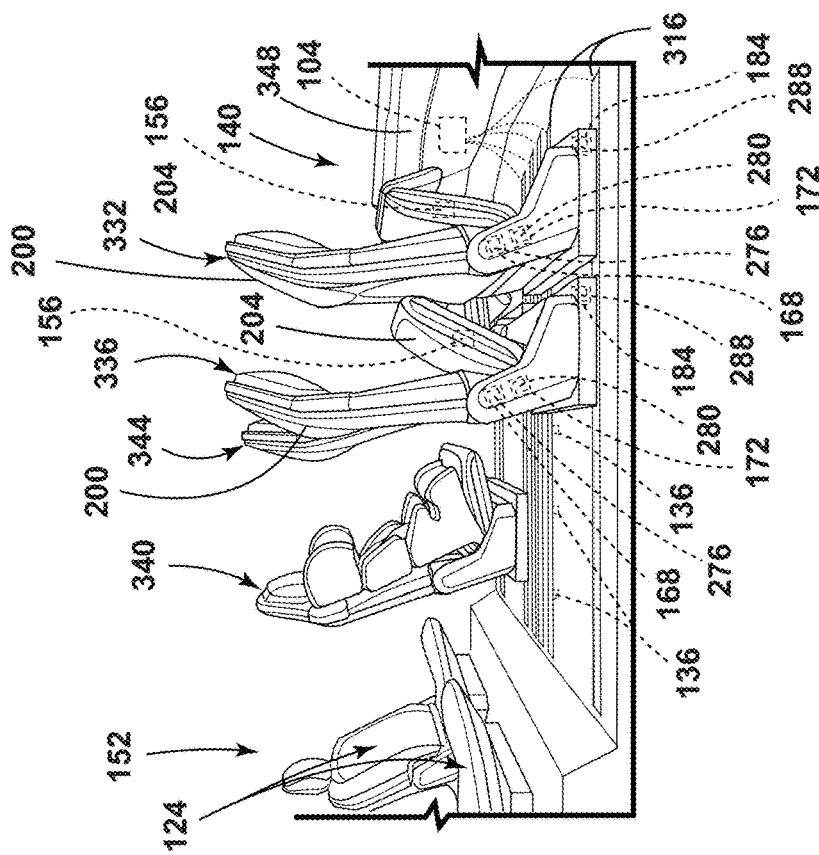
FIG. 24B is a side view of the passenger compartment, illustrating the first seating assembly and the second seating assembly in the cargo arrangement, according to one example.
Figure 24A:
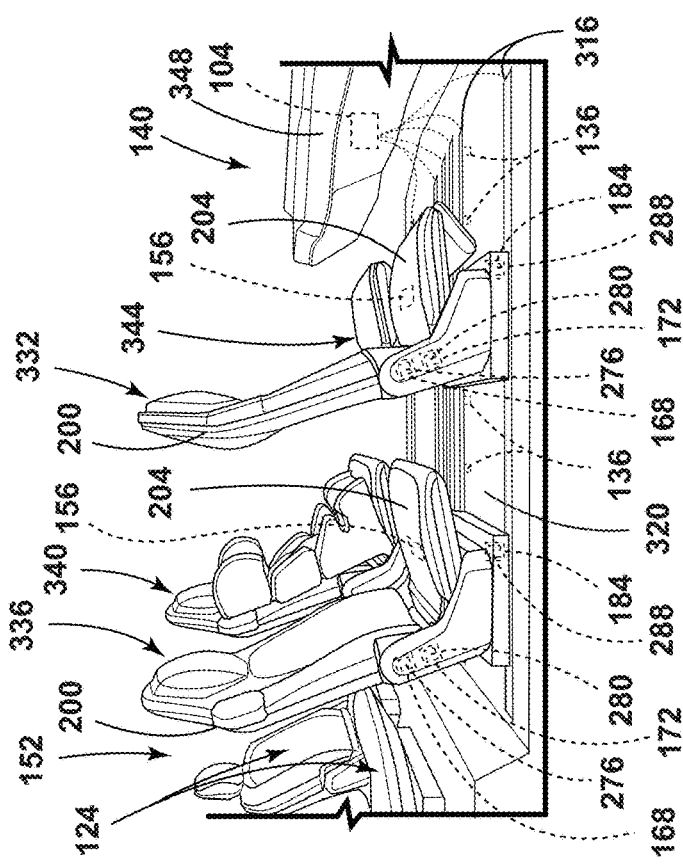
FIG. 24A is a side view of the passenger compartment, illustrating the first seating assembly and the second seating assembly in the design arrangement, according to one example.
Figure 25:
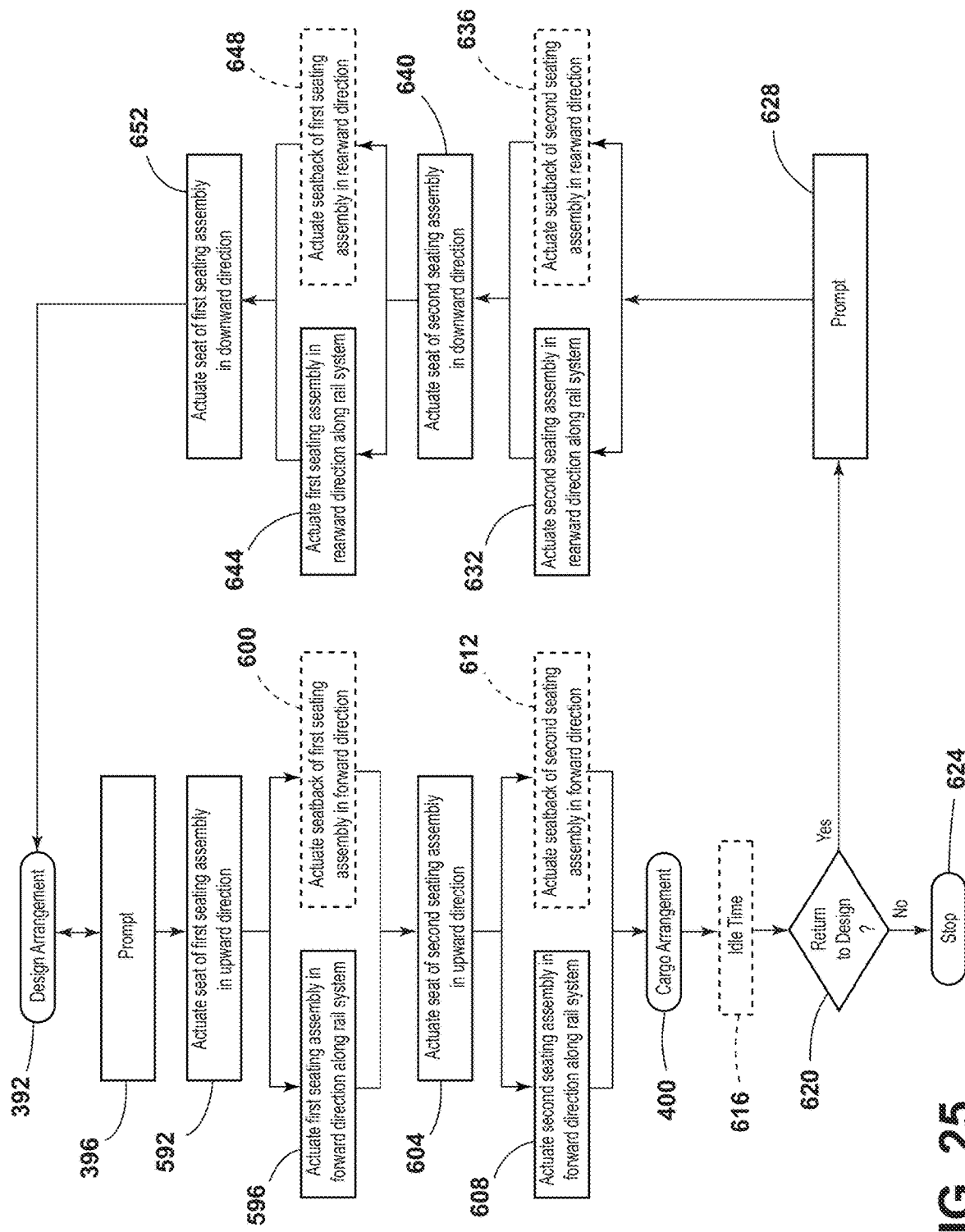
FIG. 25 is a flow diagram illustrating steps in transitioning between the design arrangement to the cargo arrangement, according to one example.

Referring to FIGS. 24A-25, a transition from the design arrangement (FIG. 24A) to the cargo arrangement (FIG. 24B) is depicted according to one example. An arrangement of the passenger compartment 140 is initially in the first arrangement 392, such as the design arrangement. In deciding to exit the first arrangement 392, the user communicates a request signal to the controller 104 (e.g., by way of the user interface 120), which can constitute the prompt 396 to transition the passenger compartment 140 from the first arrangement 392 to the second arrangement 400. In the depicted example, the second arrangement 400 is the cargo arrangement. In response to the request signal or prompt 396, the controller 104 may initiate the transition from the first arrangement 392 to the second arrangement 400 by transmitting instruction signals to the first and second seating assemblies 332, 336. As with previous examples, the relevant actuators may be communicatively coupled with the controller 104. Similarly, the relevant position sensors can be communicatively coupled to the controller 104. In the depicted example, at least the seat actuators 172 and the translation actuators 184 of the first and second seating assemblies 332, 336 are employed to transition the passenger compartment 140 from the design arrangement to the cargo arrangement. In some examples, the seatback actuators 168 of the first and second seating assemblies 332, 336 may also be employed. In the illustrated example, the rail sensors 136, the seatback position sensors 276 of the first and second seating assemblies 332, 336, the seat position sensors 280 of the first and second seating assemblies 332, 336, and/or the translation position sensors 288 of the first and second seating assemblies 332, 336 are communicatively coupled with the controller 104 such that the controller 104 is informed of a current position of the given component by the corresponding sensor. Accordingly, upon receipt of the request signal to adjust the arrangement of the passenger compartment 140 from the design arrangement to the cargo arrangement, the controller 104 may have already stored a current position of the first seating assembly 332 along the rail system 316, a current position of the second seating assembly 336 along the rail system 316, a current position of the seatback 200 relative to the seatbase 228 for the first seating assembly 332, a current position of the seatback 200 relative to the seatbase 228 for the second seating assembly 336, a position of the seat 204 relative to the seatbase 228 for the first seating assembly 332, a position of the seat 204 relative to the seatbase 228 for the second seating assembly 336, and may have stored a number of rotations of the translation actuators 184 of the first and second seating assemblies 332, 336 necessary for transitioning the arrangement of the passenger compartment 140 from the first arrangement 392 to the second arrangement 400 (e.g., within the routines 116 of the memory 112).

Referring again to FIGS. 24A-25, in transitioning the passenger compartment 140 from the design arrangement to the cargo arrangement, the controller 104 may reference the current position of the seat 204 of the first seating assembly 332 that is provided by the seat position sensor 280 of the first seating assembly 332, as well as the routines 116 stored within the memory 112 of the controller 104 to determine a degree of actuation necessary to execute at least a portion of the requested adjustment of the passenger compartment 140. For example, the controller 104 may determine that the seat 204 of the first seating assembly 332 is in the downwardly-deployed position and that actuation of the seat 204 to the upwardly-stowed position is necessary to transition from the design arrangement to the cargo arrangement. Prior to execution of the transition from the design arrangement to the cargo arrangement, the controller 104 may reference the occupancy sensor 156 of the first seating assembly 332 to determine that the first seating assembly 332 is unoccupied. In the event of detection of an occupant in the first seating assembly 332 when the transition to the cargo arrangement has been requested, a prompt, error message, or other type of notification may be provided to the user regarding the unavailability of such a transition due to the occupancy status of the first seating assembly 332. However, upon determination that the first seating assembly 332 is unoccupied and available to transition to the cargo arrangement, the controller 104 transmits instruction signals to activate the transition of the seat 204 of the first seating assembly 332 from the downwardly-deployed position to the upwardly-stowed position at step 592, as previously outlined. In transitioning the passenger compartment 140 from the design arrangement to the cargo arrangement, the translation actuator 184 of the first seating assembly 332 is activated by the controller 104 such that the first seating assembly 332 is translated in a vehicle-forward direction along the rail system 316. The rail sensors 136 may be employed to determine the current position of the first seating assembly 332 along the rail system 316. An additional sensor may be provided in each of the seating assemblies 124 that is coupled to the rail system 316 (e.g., the first and second seating assemblies 332, 336) that interacts with the rail sensors 136 such that the controller 104 may determine a relative position of the first and second seating assemblies 332, 336 in relation to the rail sensors 136. This additional sensor may be integrated with the translation actuator 184 and/or the translation position sensor 288. The controller 104 activates the translation actuator 184 such that the translation actuator 184 actuates the first seating assembly 332 along the rail system 316 in the vehicle-forward direction at step 596, thereby decreasing a distance between the first seating assembly 332 and the dashboard 348. Optionally, the seatback 200 of the first seating assembly 332 may be actuated in a forward direction (i.e., in a clockwise direction as depicted) at step 600 to provide additional space or clearance when in the cargo arrangement. In such an example, the controller 104 transmits instruction signals to the seatback actuator 168 and references the seatback position sensor 276 in determining the current position of the seatback 200, a degree of actuation necessary to adjust the position of the seatback 200, and/or determine when to cease actuation of the seatback actuator 168.

Referring further to FIGS. 24A-25, the process for adjusting the position of the first seating assembly 332 in effecting the transition from the design arrangement to the cargo arrangement is similarly executed for the second seating assembly 336. For example, the second seating assembly 336 may be adjusted in much the same manner as the second seating assembly 336 was for the transition from the design arrangement to the ingress/egress arrangement above, with a primary difference being in the degree of actuation of the second seating assembly 336 along the rail system 316 by the translation actuator 184 of the second seating assembly 336. In short, the seat 204 of the second seating assembly 336 is actuated to the upwardly-stowed position at step 604 by the transmitted instruction signals from the controller 104; the translation actuator 184 of the second seating assembly 336 is activated such that the second seating assembly 336 is actuated in a vehicle-forward direction along the rail system 316 at step 608, thereby decreasing a distance between the second seating assembly 336 and the dashboard 348 while also increasing a distance between the second seating assembly 336 and the third row 152; and, optionally, the seatback 200 of the second seating assembly 336 is actuated in the forward direction (i.e., in a clockwise direction as depicted) by activation of the seatback actuator 168 of the second seating assembly 336 at step 612. Upon completion of the adjustments outlined for the first and second seating assemblies 332, 336, the arrangement of the passenger compartment 140 has been successfully placed in the cargo arrangement. The process may provide the user with a predetermined idle time 616 that corresponds to allowing time for occupants to get situated in the third row 152, the third seating assembly 340, the fourth seating assembly 344, and/or allowing a user to place cargo on the floor 320 of the passenger compartment 140.

Referring still further to FIGS. 24A-25, following successful completion of the adjustment to the second arrangement 400 and/or the predetermined idle time 616 having elapsed, the user may be presented with a decision point 620 asking the user whether they would like to return to the design arrangement. In the event that the user elects that they would not like to return to the design arrangement at decision point 620, the process may exit at step 624 such that the user will no longer be prompted to exit the cargo arrangement. In such an example, the user may interact with the user interface 120 at a later time to adjust the arrangement of the passenger compartment 140, if so desired. However, if the user elects to exit the cargo arrangement and return to the design arrangement at decision point 620, then the process of adjusting the arrangement of the passenger compartment 140 will generally be reversed to return to the design arrangement from the cargo arrangement. In such an example, the election of the user to return to the design arrangement at decision point 620 may be treated as a prompt 628 or request signal communicated to the controller 104. In returning to the design arrangement from the cargo arrangement, the second seating assembly 336 is actuated in a vehicle-rearward direction by activation of the translation actuator 184 at step 632. If the seatback 200 of the second seating assembly 336 was rotated in the forward direction at step 612, then in returning to the design arrangement, the seatback 200 of the second seating assembly 336 may be rotated in the rearward direction (i.e., in a counter-clockwise direction as depicted) at step 636. As the seat 204 of the second seating assembly 336 was placed in the upwardly-stowed position during the cargo arrangement, the seat 204 of the second seating assembly 336 is actuated to the downwardly-deployed position at step 640 by activation of the seat actuator 172 of the second seating assembly 336. Similarly, in returning to the design arrangement from the cargo arrangement, the first seating assembly 332 is actuated in a vehicle-rearward direction by activation of the translation actuator 184 at step 640. If the seatback 200 of the first seating assembly 332 was rotated in the forward direction at step 600, then in returning to the design arrangement, the seatback 200 of the first seating assembly 332 may be rotated in the rearward direction (i.e., in a counter-clockwise direction as depicted) at step 648. As the seat 204 of the first seating assembly 332 was placed in the upwardly-stowed position during the cargo arrangement, the seat 204 of the first seating assembly 332 is actuated to the downwardly-deployed position at step 652 by activation of the seat actuator 172 of the first seating assembly 332. Upon completion of steps 632, 636, 640, 644, 648, and/or 652, the passenger compartment 140 has successfully transitioned from the cargo arrangement back to the design arrangement.

Figure 26:
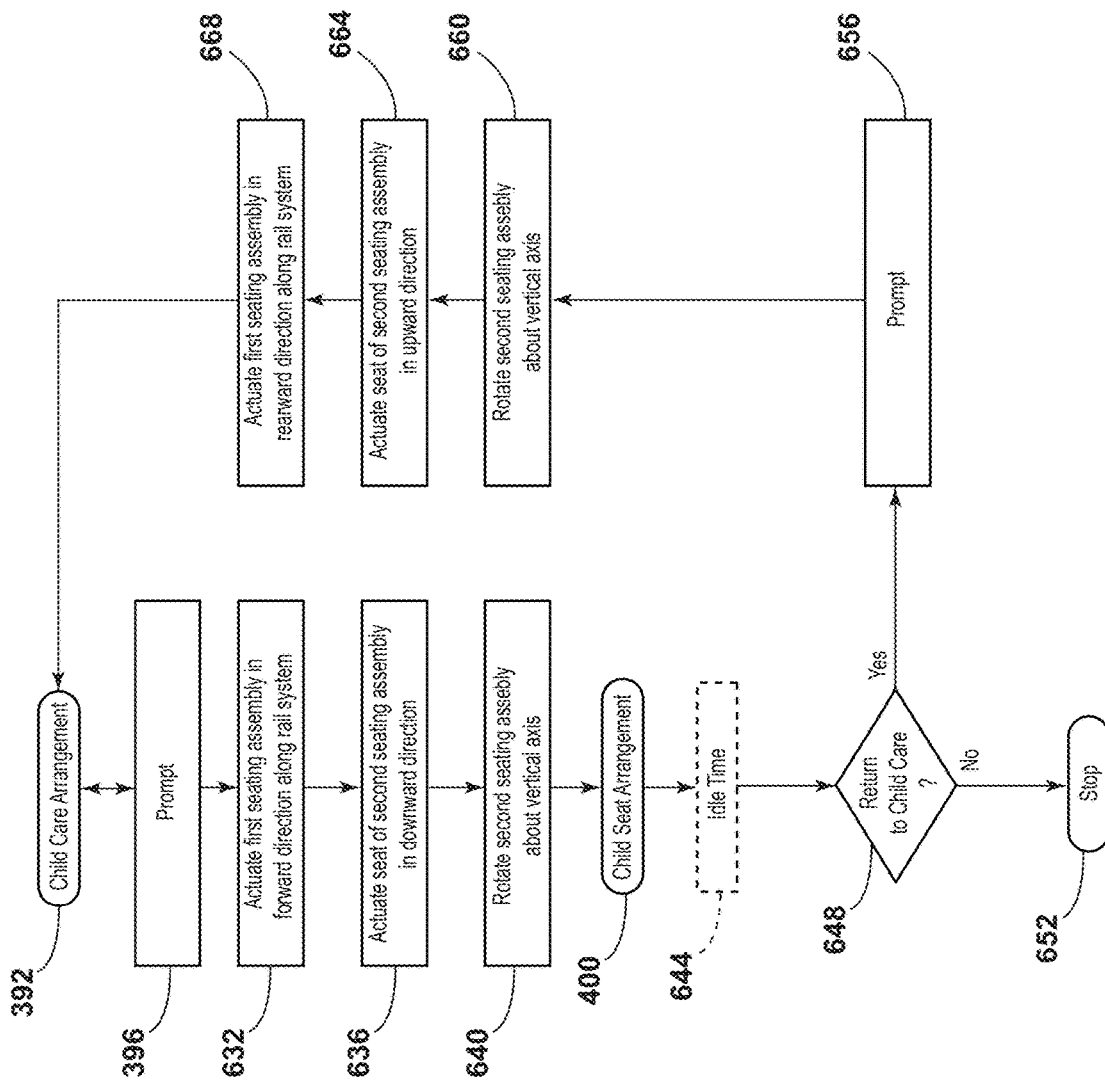
FIG. 26 is a flow diagram illustrating steps in transitioning between the child care arrangement and the child seat arrangement, according to one example.

Referring to FIG. 26, a process for adjusting the arrangement of the passenger compartment 140 from the first arrangement 392 to the second arrangement 400 is depicted where the first arrangement 392 is the child care arrangement and the second arrangement 400 is a child seat arrangement. The transition from the first arrangement 392 to the second arrangement 400 may be initiated by the prompt 396 to transition from the first arrangement 392 to the second arrangement 400. Transitioning the arrangement of the passenger compartment 140 from the child care arrangement to the child seat arrangement includes step 632 of actuating the first seating assembly 332 in a vehicle-forward direction along the rail system 316. Additionally, the transition from the child care arrangement to the child seat arrangement includes step 636 of actuating the seat 204 of the second seating assembly 336 to the downwardly-deployed position. Further, the transition of the arrangement of the passenger compartment 140 from the child care arrangement to the child seat arrangement includes step 640 of rotating the second seating assembly 336 about the vertical axis 268 thereof through an angle of about ninety degrees (90°) in a clockwise direction or counterclockwise direction when actuating the third seating assembly 340. Upon completion of step 640, the arrangement of the passenger compartment 140 will have successfully been placed in the second arrangement 400 of the child seat arrangement. As with previously described examples of adjusting the arrangement of the passenger compartment 140 to the child seat arrangement, a predetermined idle time 644 may be provided for allowing a user to place a child or smaller statured occupant within the second seating assembly 336 or the third seating assembly 340, as the case may be. Alternatively, the arrangement of the passenger compartment 140 may be maintained in the child seat arrangement until such time as the user interacts with the user interface 120 or otherwise communicates a request signal to the controller 104 to exit the child seat arrangement. Upon completion of the transition of the arrangement of the passenger compartment 140 from the child care arrangement to the child seat arrangement and/or the predetermined idle time 644 having elapsed, the user may be presented with decision point 648 where the user is prompted as to whether they would like to return to the child care arrangement. In the event that the user elects to not return to the child care arrangement, the process may exit at step 652 such that the user will not be prompted again to exit the child seat arrangement. However, if the user elects to exit the child seat arrangement and return to the child care arrangement at decision point 648, the process of adjusting the arrangement of the passenger compartment 140 will generally be reversed to return to the child care arrangement. In such an example, the election of the user to return to the child care arrangement at decision point 648 may be treated as a prompt 656 or request signal communicated to the controller 104. In returning to the child care arrangement from the child seat arrangement, the second seating assembly 336 can be rotated counterclockwise by about ninety degrees (90°) such that the second seating assembly 336 is oriented in the forward-facing orientation at step 660. Additionally, in transitioning the arrangement of the passenger compartment 140 back to the child care arrangement, step 664 actuates the seat 204 of the second seating assembly 336 to the upwardly-stowed position. Finally, step 668 of actuating the first seating assembly 332 in a vehicle-rearward direction along the rail system 316 may complete the transition from the child seat arrangement back to the child care arrangement.

Figure 27:
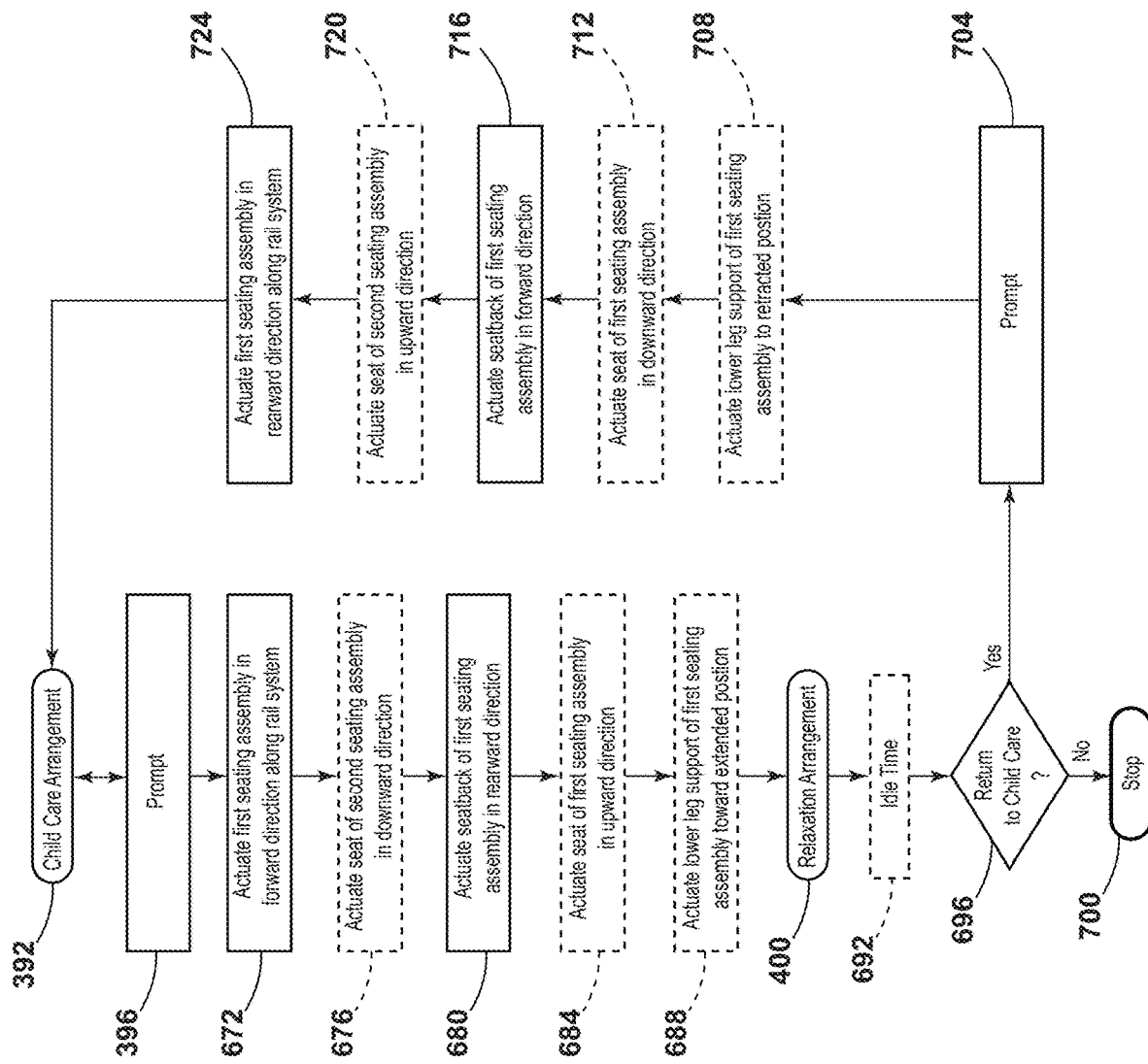
FIG. 27 is a flow diagram illustrating steps in transitioning between the child care arrangement and the relaxation arrangement, according to one example.

Referring to FIG. 27, a transition from the first arrangement 392 to the second arrangement 400 is depicted, where the first arrangement 392 is the child care arrangement and the second arrangement 400 is the relaxation arrangement. In deciding to exit the first arrangement 392, the user communicates a request signal to the controller 104 (e.g., by way of the user interface 120), which can constitute the prompt 396 to transition the passenger compartment 140 from the first arrangement 392 to the second arrangement 400. In transitioning from the child care arrangement to the relaxation arrangement, step 672 of actuating the first seating assembly 332 in the vehicle-forward direction is executed. Additionally, step 676 of actuating the seat 204 of the second seating assembly 336 to the downwardly-deployed position may optionally be employed. Regardless of whether the seat 204 of the second seating assembly 336 was actuated to the downwardly-deployed position at step 676, step 680 of actuating the seatback 200 of the first seating assembly 332 in a rearward direction (e.g., in a counterclockwise direction as depicted) is executed at step 680. In some examples, transitioning to the relaxation arrangement may include actuating the seat 204 of the first seating assembly 332 in an upward direction relative to the seatbase 228 of the first seating assembly 332 at step 684. In various examples, transitioning to the relaxation arrangement may include step 688 of actuating the lower leg support 208 to an at least partially extended position. Upon completion of steps 680, 684, and/or 688, the arrangement of the passenger compartment 140 may have arrived at the relaxation arrangement. As outlined above with regard to the relaxation arrangement, a predetermined idle time 692 may be provided for the occupant of the first seating assembly 332. The predetermined idle time 692 may be selected by the occupant of the first seating assembly 332. For example, the occupant of the first seating assembly 332 may decide that they want to rest for a given period of time during their occupancy of the vehicle 100. Accordingly upon the idle time 692 having elapsed, the occupant of the first seating assembly 332 may be prompted regarding whether they would like to return to the child care arrangement, thereby providing a decision point 696. Alternatively, the occupant of the first seating assembly 332 may select an alternative arrangement of the passenger compartment 140 to be returned to upon the idle time 692 having lapsed.

Referring again to FIG. 27, with regard to the decision point 696, in the event the occupant of the first seating assembly 332 elects to not return to the child care arrangement or another arrangement, the process may exit at step 700 such that the occupant will not be prompted again to exit the relaxation arrangement. In such an example, the occupant of the first seating assembly 332 may interact with the user interface 120 at a later time to adjust the arrangement of the passenger compartment 140, if so desired. However, if the occupant of the first seating assembly 332 elects to exit the relaxation arrangement and return to the child care arrangement at decision point 696, the process of adjusting the arrangement of the passenger compartment 140 will generally be reversed to return to the child care arrangement from the relaxation arrangement. In such an example, the election of the occupant of the first seating assembly 332 to return to the child care arrangement may be treated as a prompt 704 or request signal communicated to the controller 104. In returning to the child care arrangement from the relaxation arrangement, the lower leg support 208 of the first seating assembly 332 may be actuated to the retracted position at step 708 if the lower leg support 208 had been actuated away from the retracted position at step 688. Similarly, if the seat 204 of the first seating assembly 332 was actuated in an upward direction relative to the seatbase 228 of the first seating assembly 332 at step 684, then the seat 204 of the first seating assembly 332 may be actuated in a downward direction to decrease an angle of inclination of the seat 204 relative to the seatbase 228 of the first seating assembly 332 at step 712. At step 716, the seatback 200 of the first seating assembly 332 is actuated in a forward direction (i.e., in a clockwise direction, as depicted in the preceding figures). If the seat 204 of the second seating assembly 336 was actuated in a downward direction toward the downwardly-deployed position at step 676, then returning the arrangement of the passenger compartment 140 to the child care arrangement can include step 720 of actuating the seat 204 of the second seating assembly 336 in an upward direction toward the upwardly-stowed position. Step 724 of actuating the first seating assembly 332 in a vehicle-rearward direction along the rail system 316 can complete the transition of the arrangement of the passenger compartment 140 from the relaxation arrangement back to the child care arrangement.

Figure 28:
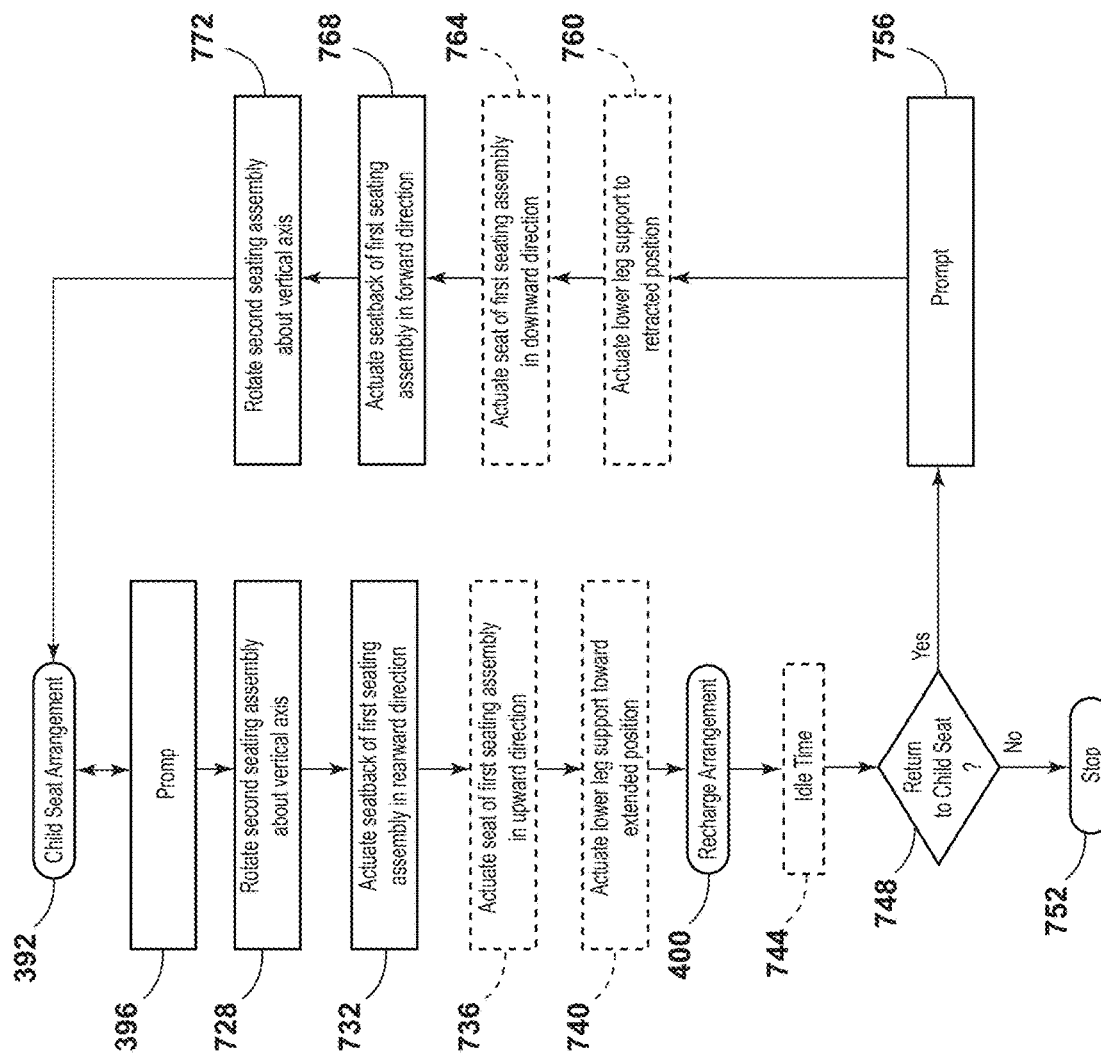
FIG. 28 is a flow diagram illustrating steps in transitioning between the child seat arrangement and the relaxation arrangement, according to one example.

Referring to FIG. 28, a transition from the child seat arrangement to the relaxation arrangement is outlined according to one example. An arrangement of the passenger compartment 140 is initially in the first arrangement 392, which is the child seat arrangement in the present example. In deciding to exit the first arrangement 392, the user communicates a request signal to the controller 104 (e.g., by way of the user interface 120), which can constitute the prompt 396 to transition the passenger compartment 140 from the first arrangement 392 to the second arrangement 400. In the depicted example, the second arrangement 400 is the relaxation arrangement. In response to the request signal or prompt 396, the controller 104 may initiate the transition from the first arrangement 392 to the second arrangement 400 by transmitting instruction signals to various actuators of the first seating assembly 332 and the second seating assembly 336. In response to the instruction signals communicated by the controller 104, the second seating assembly 336 is rotated about the vertical axis 268 thereof by activation of the swivel actuator 180 of the second seating assembly 336 at step 728. Upon completion of step 728, the first and second seating assemblies 332, 336 may each be positioned in the forward-facing orientation. When entering the relaxation arrangement for the first seating assembly 332, the seat 204 of the second seating assembly 336 may be optionally placed in the upwardly-stowed position. However, the relaxation arrangement of the first seating assembly 332 may be accomplished independent of whether the seat 204 of the second seating assembly 336 is in the upwardly-stowed position, the downwardly-deployed position, or an intermediate position therebetween. In transitioning the first seating assembly 332 to the relaxation arrangement, the seatback 200 of the first seating assembly 332 is actuated in a rearward direction by activation of the seatback actuator 168 by the controller 104 at step 732. In various examples, the seat 204 of the first seating assembly 332 may be actuated in an upward direction via activation of the seat actuator 172 by the controller 104 at step 736. Similarly, the lower leg support 208 of the first seating assembly 332 may be actuated from the retracted position toward the extended position by activation of the lower leg support actuator 176 by the controller 104 at step 740. Upon completion of steps 732, 736, and/or 740, the arrangement of the passenger compartment 140 has been successfully transitioned to the relaxation arrangement. In various examples, following completion of the transition to the relaxation arrangement, the process may be provided with a predetermined idle time 744, as outlined above.

Referring again to FIG. 28, following completion of the transition to the relaxation arrangement and/or expiration of the predetermined idle time 744, the controller 104 may prompt the user regarding whether or not to return the passenger compartment 140 to the child seat arrangement or another alternative arrangement at decision point 748. If the user selects not to return the arrangement of the passenger compartment 140 to the child seat arrangement or an alternative arrangement, then the process may be exited at step 752. Alternatively, if the user elects to exit the relaxation arrangement and return to the child seat arrangement at decision point 748, the process of adjusting the arrangement of the passenger compartment 140 will generally be reversed to return to the child seat arrangement from the relaxation arrangement. In such an example, the election of the user to return the passenger compartment 140 to the child seat arrangement at decision point 748 may be treated as a prompt 756 or request signal communicated to the controller 104. In returning to the child seat arrangement from the relaxation arrangement, the lower leg support 208 of the first seating assembly 332 may be returned to the retracted position at optional step 760 if the lower leg support 208 of the first seating assembly 332 was deployed at optional step 740. Similarly, the first seat 204 of the first seating assembly 332 may be actuated in a downward direction at step 764 if the seat 204 of the first seating assembly 332 was actuated in the upward direction at optional step 736. The seatback 200 of the first seating assembly 332 is rotated in the forward direction at step 768 such that the seatback 200 resumes a more upright position than when in the relaxation arrangement. At step 772, the second seating assembly 336 is rotated about the vertical axis 268 thereof by about ninety degrees (90°) such that the seating surface 350 of the second seating assembly 336 is presented to, and immediately adjacent, one of the access doors 312 of the vehicle 100. Upon completion of steps 760, 764, 768, and/or 772, the passenger compartment 140 will have been successfully transitioned from the relaxation arrangement to the child seat arrangement.

Figure 29:
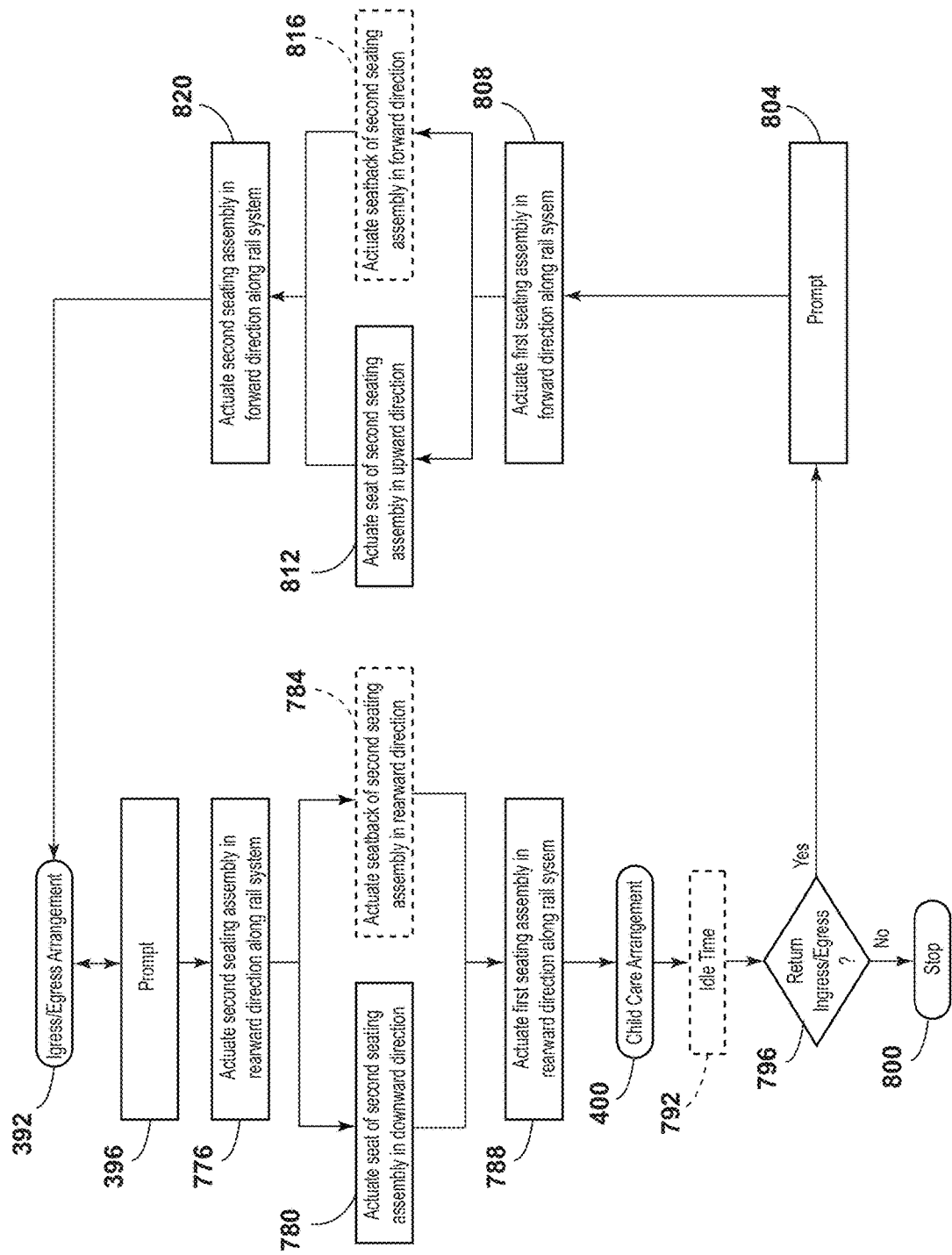
FIG. 29 is a flow diagram illustrating steps in transitioning between the ingress/egress arrangement and the child care arrangement, according to one example.

Referring to FIG. 29, a transition from the ingress/egress arrangement to the child care arrangement is outlined according to one process. An arrangement of the passenger compartment 140 is initially in the first arrangement 392, which is the ingress/egress arrangement in the present example. In deciding to exit the first arrangement 392, the user communicates a request signal to the controller 104 (e.g., by way of the user interface 120), which can constitute the prompt 396 to transition the passenger compartment 140 from the first arrangement 392 to the second arrangement 400. In the depicted example, the second arrangement 400 is the child care arrangement. In response to the request signal or prompt 396, the controller 104 may initiate the transition from the first arrangement 392 to the second arrangement 400 by transmitting instruction signals to various actuators of the first and second seating assemblies 332, 336. As a result of the signals communicated by the controller 104, the translation actuator 184 of the second seating assembly 336 is activated such that the second seating assembly 336 is actuated in a vehicle-rearward direction along the rail system 316 at step 776. Additionally, the seat actuator 172 of the second seating assembly 336 is activated by the controller 104 such that the seat 204 of the second seating assembly 336 is actuated to the downwardly-deployed position at step 780. In examples where the seatback 200 of the second seating assembly 336 was actuated in a forward direction when placing the passenger compartment 140 in the ingress/egress arrangement, the process may optionally include activating the seatback actuator 168 of the second seating assembly 336 such that the seatback 200 of the second seating assembly 336 is moved in a rearward direction at step 784. At step 788, the controller 104 activates the translation actuator 184 of the first seating assembly 332 such that the translation actuator 184 actuates the first seating assembly 332 in the vehicle-rearward direction along the rail system 316. Upon completion of the outlined adjustments to the passenger compartment 140, the arrangement of the passenger compartment 140 has been transitioned to the child care arrangement from the ingress/egress arrangement. As outlined above with regard to the child care arrangement, a predetermined idle time 792 may be provided. Following completion of the transition to the child care arrangement and/or expiration of the predetermined idle time 792, the controller 104 may prompt the user regarding whether or not to return the passenger compartment 140 to the ingress/egress arrangement or another alternative arrangement at decision point 796. If the user elects not to return the arrangement of the passenger compartment 140 to the ingress/egress arrangement, then the process may be exited at step 800. Alternatively, if the user elects to exit the child care arrangement and return to the ingress/egress arrangement at decision point 796, the process of adjusting the arrangement of the passenger compartment 140 will generally be reversed to return to the ingress/egress arrangement. In such an example, the election of the user to return the passenger compartment 140 to the ingress/egress arrangement at decision point 796 may be treated as a prompt 804 or request signal communicated to the controller 104.

Referring again to FIG. 29, in returning to the ingress/egress arrangement from the child care arrangement, the first seating assembly 332 is actuated along the rail system 316 in the vehicle-forward direction via activation of the translation actuator 184 by the instruction signals received from the controller 104 at step 808. Additionally, the seat 204 of the second seating assembly 336 is actuated toward the upwardly-stowed position at step 812 by activation of the seat actuator 172 of the second seating assembly 336. In various examples, the seatback 200 of the second seating assembly 336 may be actuated in a forward direction at optional step 816 by activating the seatback actuator 168 of the second seating assembly 336 in response to corresponding instruction signals from the controller 104. At step 820, the second seating assembly 336 is actuated in the vehicle-forward direction along the rail system 316 by activation of the translation actuator 184 of the second seating assembly 336 in response to corresponding instruction signals from the controller 104. Following completion of the adjustments to the first seating assembly 332 and the second seating assembly 336, the passenger compartment 140 has been successfully transitioned from the child care arrangement back to the ingress/egress arrangement.

Figure 30:
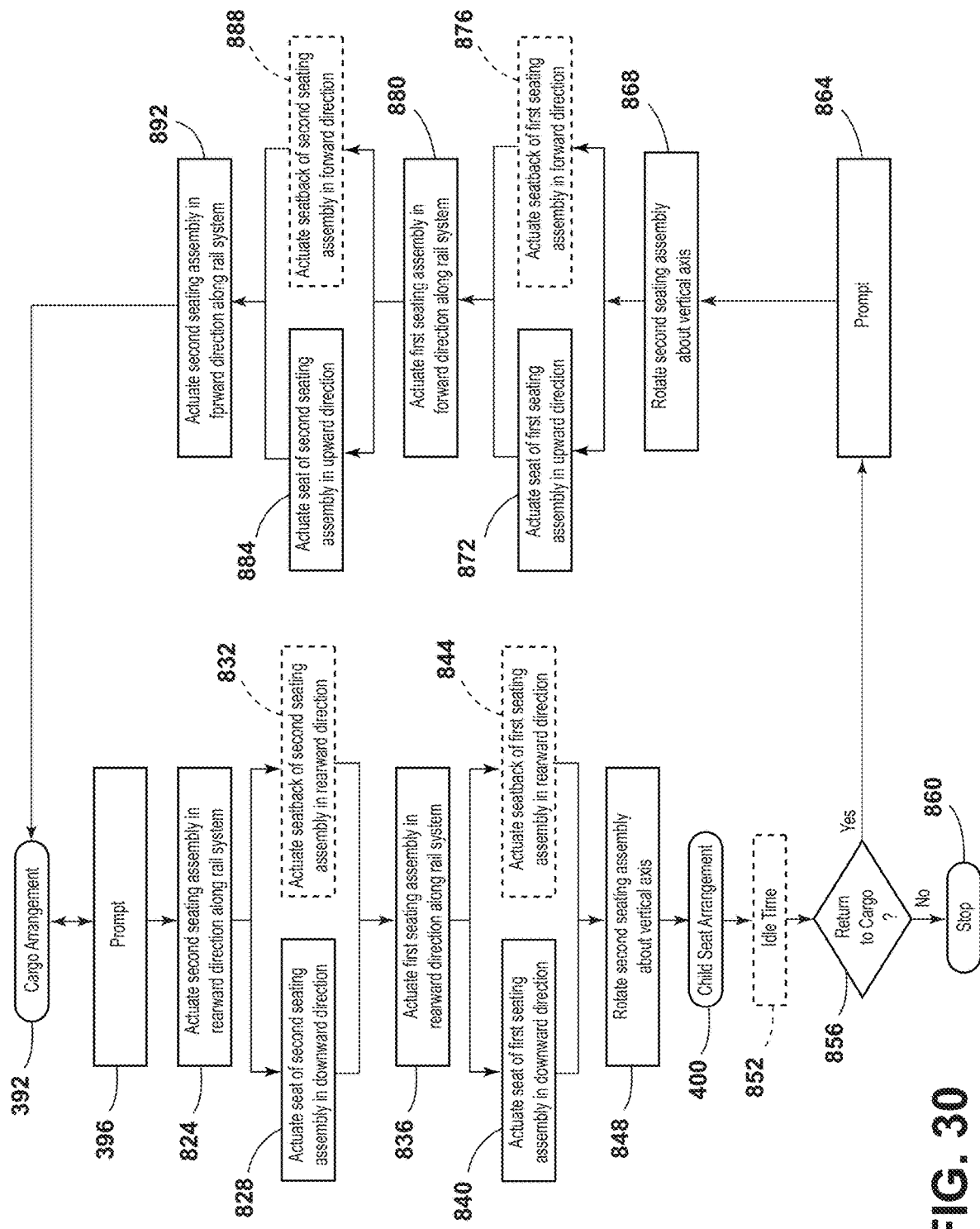
FIG. 30 is a flow diagram illustrating steps in transitioning between the cargo arrangement and the child seat arrangement, according to one example.

Referring to FIG. 30, a transition from the cargo arrangement to the child seat arrangement is outlined according to one example. An arrangement of the passenger compartment 140 is initially in the first arrangement 392, which is the cargo arrangement in the present example. In deciding to exit the first arrangement 392, the user communicates a request signal to the controller 104, which can constitute the prompt 396 to transition the passenger compartment 140 from the first arrangement 392 to the second arrangement 400. In the depicted example, the second arrangement 400 is the child seat arrangement. In response to the request signal or prompt 396, the controller 104 may initiate the transition from the first arrangement 392 to the second arrangement 400 by transmitting instruction signals to various actuators of the first and second seating assemblies 332, 336. In response to the instruction signals communicated by the controller 104, the second seating assembly 336 is actuated along the rail system 316 in the vehicle-rearward direction at step 824 by activation of the translation actuator 184 of the second seating assembly 336. At step 828, the seat 204 of the second seating assembly 336 is actuated toward the downwardly-deployed position by activation of the seat actuator 172 of the second seating assembly 336. Optionally, the seatback 200 of the second seating assembly 336 may be actuated in a rearward direction at step 832 by activation of the seatback actuator 168 of the second seating assembly 336. At step 836, the first seating assembly 332 may be actuated in the vehicle-rearward direction along the rail system 316 by activation of the translation actuator 184 of the first seating assembly 332 in response to the instruction signals transmitted by the controller 104. At step 840, the seat 204 of the first seating assembly 332 is actuated in a downward direction to the downwardly-deployed position by activation of the seat actuator 172 of the first seating assembly 332 in response to the instruction signals communicated by the controller 104. At step 844, the seatback 200 of the first seating assembly 332 may optionally be actuated in a rearward direction by activation of the seatback actuator 168 of the first seating assembly 332. At step 848, the second seating assembly 336 is rotated about the vertical axis 268 thereof by about ninety degrees (90°) in a clockwise direction as a result of activation of the swivel actuator 180 of the second seating assembly 336 in response to the instruction signals communicated by the controller 104. Upon completion of step 848, the arrangement of the passenger compartment 140 has been successfully placed in the child seat arrangement. As with previous examples outlined herein, the process may be provided with a predetermined idle time 852 that may correspond to an anticipated amount of time for situating an occupant of the second seating assembly 336.

Referring again to FIG. 30, upon the successful adjustment of the passenger compartment 140 to the child seat arrangement and/or the expiration of the predetermined idle time 852, the controller 104 may prompt the user regarding whether or not to return the passenger compartment 140 to the cargo arrangement or another alternative arrangement at decision point 856. If the user selects not to return the arrangement of the passenger compartment 140 to the cargo arrangement or an alternative arrangement, then the process may be exited at step 860. Alternatively, if the user elects to exit the child seat arrangement and return to the cargo arrangement at decision point 856, the process of adjusting the arrangement of the passenger compartment 140 will generally be reversed to return to the cargo arrangement from the child seat arrangement. In such an example, the election of the user to return the passenger compartment 140 to the cargo arrangement at decision point 856 may be treated as a prompt 864 or request signal communicated to the controller 104. In returning to the cargo arrangement, the second seating assembly 336 is rotated in a counter-clockwise direction by about ninety degrees (90°) about the vertical axis 268 thereof at step 868 by activation of the swivel actuator 180 of the second seating assembly 336. At step 872, the seat 204 of the first seating assembly 332 is actuated to the upwardly-stowed position by activation of the seat actuator 172 of the first seating assembly 332 in response to the instruction signals transmitted by the controller 104. At step 876, the seatback 200 of the first seating assembly 332 may be optionally moved forward or rotated in a forward direction by activation of the seatback actuator 168 of the first seating assembly 332. At step 880, the first seating assembly 332 is actuated in the vehicle-forward direction along the rail system 316 by activation of the translation actuator 184 of the first seating assembly 332. At step 884, the seat 204 of the second seating assembly 336 is actuated to the upwardly-stowed position by activation of the seat actuator 172 of the second seating assembly 336. At step 888, the seatback 200 of the second seating assembly 336 is optionally rotated in the vehicle-forward direction by activation of the seatback actuator 168 of the second seating assembly 336. At step 892, the second seating assembly 336 is actuated in the vehicle-forward direction along the rail system 316 by activation of the translation actuator 184 of the second seating assembly 336 in response to the instruction signals communicated by the controller 104. Upon completion of the outlined adjustments to the first seating assembly 332 and the second seating assembly 336, the arrangement of the passenger compartment 140 has been returned to the cargo arrangement.

Figure 31:
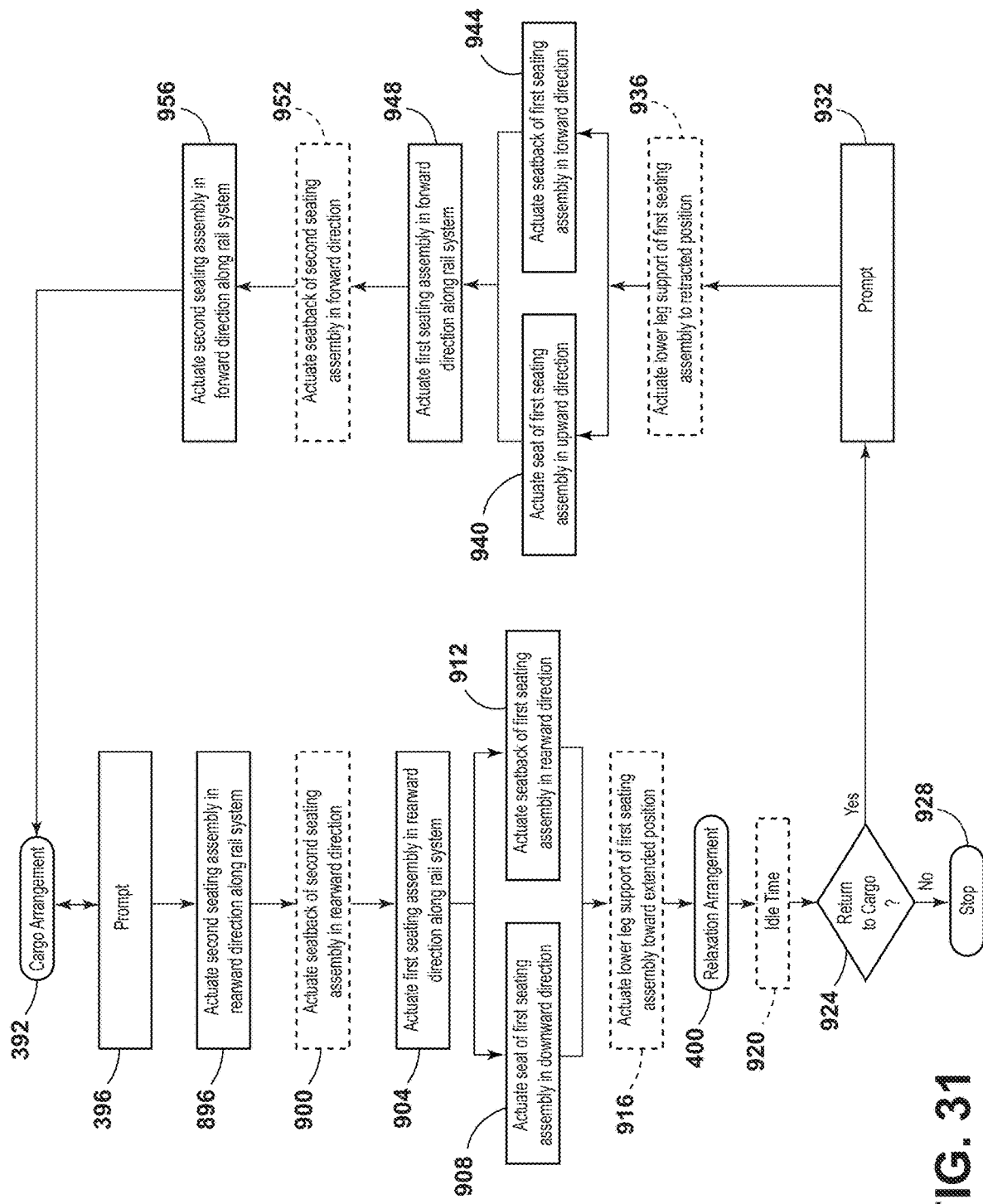
FIG. 31 is a flow diagram illustrating steps in transitioning between the cargo arrangement and the relaxation arrangement, according to one example.

Referring to FIG. 31, a transition from the cargo arrangement to the relaxation arrangement is outlined according to one example. An arrangement of the passenger compartment 140 is initially in the first arrangement 392, which is the cargo arrangement in the present example. In deciding to exit the first arrangement 392, the user communicates a request signal to the controller 104 (e.g., by way of the user interface 120), which can constitute the prompt 396 to transition the passenger compartment 140 from the first arrangement 392 to the second arrangement 400. In the depicted example, the second arrangement 400 is the relaxation arrangement. In response to the request signal or prompt 396, the controller 104 may initiate the transition from the first arrangement 392 to the second arrangement 400 by transmitting instruction signals to various actuators of the first seating assembly 332 and the second seating assembly 336. In response to the instruction signals communicated by the controller 104, the second seating assembly 336 is actuated in the vehicle-rearward direction along the rail system 316 at step 896 by activating the translation actuator 184 of the second seating assembly 336. In examples where the seatback 200 of the second seating assembly 336 was actuated in a forward direction for the cargo arrangement, step 900 may be optionally employed to rotate the seatback 200 of the second seating assembly 336 in a rearward direction by activating the seatback actuator 168 in response to the instruction signals from the controller 104. At step 904, the first seating assembly 332 is actuated in the vehicle-rearward direction along the rail system 316 by activation of the translation actuator 184 of the first seating assembly 332 in response to the instruction signals from the controller 104. At step 908, the seat 204 of the first seating assembly 332 is actuated toward the downwardly-deployed position by activating the seat actuator 172 of the first seating assembly 332. While the seat 204 is actuated toward the downwardly-deployed position at step 908, the seat 204 of the first seating assembly 332 may be stopped at an intermediate position between the upwardly-stowed position and the downwardly-deployed position such that the seat 204 is at a greater degree of inclination relative to the seatbase 228 of the first seating assembly 332 than the downwardly-deployed position. At step 912, the seatback 200 of the first seating assembly 332 is actuated in a rearward direction and away from the seat 204 of the first seating assembly 332 (e.g., to an obtuse angle relative to the seatbase 228 of the first seating assembly 332) by activation of the seatback actuator 168. At step 916, the lower leg support 208 of the first seating assembly 332 may be optionally extended from the retracted position by activating the lower leg support actuator 176, if so instructed by the user by way of the instruction signals transmitted by the controller 104. Upon completion of steps 908, 912, and/or 916, the arrangement of the passenger compartment 140 has been successfully transitioned to the relaxation arrangement. In various examples, following completion of the transition to the relaxation arrangement, the process may be provided with a predetermined idle time 920, as outlined above.

Referring again to FIG. 31, following completion of the transition to the relaxation arrangement and/or expiration of the predetermined idle time 920, the controller 104 may prompt the user regarding whether or not to return the passenger compartment 140 to the cargo arrangement or another alternative arrangement at decision point 924. If the user selects not to return the arrangement of the passenger compartment 140 to the cargo arrangement or an alternative arrangement, then the process may be exited at step 928. Alternatively, if the user elects to exit the relaxation arrangement and return to the cargo arrangement at decision point 924, the process of adjusting the arrangement of the passenger compartment 140 will generally be reversed to return to the cargo arrangement from the relaxation arrangement. In such an example, the election of the user to return the passenger compartment 140 to the cargo arrangement at decision point 924 may be treated as a prompt 932 or request signal communicated to the controller 104. In returning to the cargo arrangement from the relaxation arrangement, the lower leg support 208 of the first seating assembly 332 may be returned to the retracted position at optional step 936 if the lower leg support 208 of the first seating assembly 332 was deployed at optional step 916. The seat 204 of the first seating assembly 332 is actuated to the upwardly-stowed position at step 940. The seatback 200 of the first seating assembly 332 is rotated in the forward direction at step 944 such that the seatback 200 resumes a more upright position than when in the relaxation arrangement. At step 948, the first seating assembly 332 is actuated in the vehicle-forward direction along the rail system 316. At step 952, the seatback 200 of the second seating assembly 336 may be optionally rotated in the forward direction. At step 956, the second seating assembly 336 is actuated in the vehicle-forward direction along the rail system 316. Upon completion of steps 932, 936, 940, 944, 948, 952, and/or 956, the return to the cargo arrangement from the relaxation arrangement has been completed.

Figure 32:
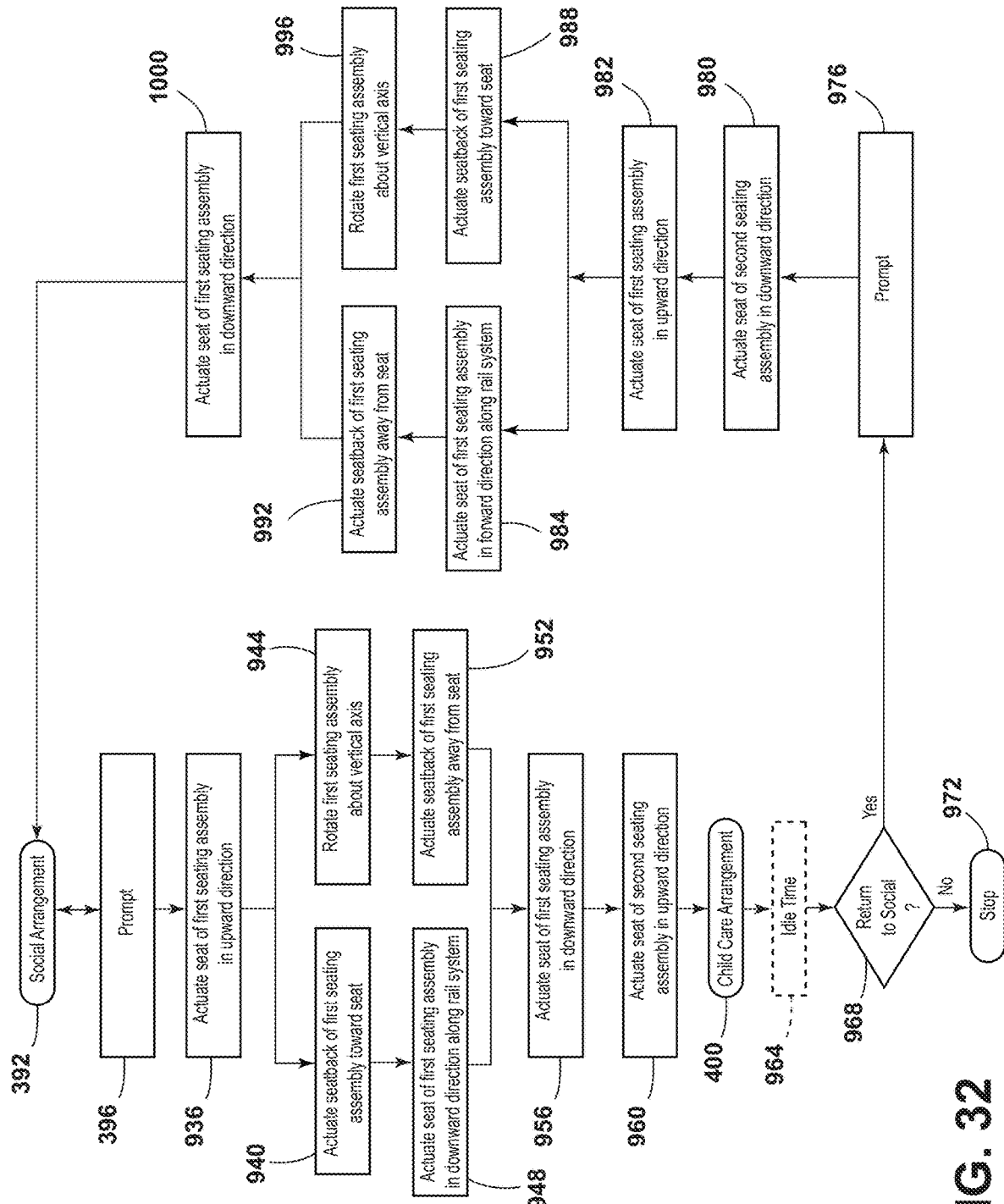
FIG. 32 is a flow diagram illustrating steps in transitioning between the social arrangement and the child care arrangement, according to one example.

Referring to FIG. 32, a transition from the social arrangement to the child care arrangement is depicted, according to one example. An arrangement of the passenger compartment 140 is initially in the first arrangement 392, which is the social arrangement in the present example. In deciding to exit the first arrangement 392, the user communicates a request signal to the controller 104 (e.g., by way of the user interface 120), which can constitute the prompt 396 to transition the passenger compartment 140 from the first arrangement 392 to the second arrangement 400. In the depicted example, the second arrangement 400 is the child care arrangement. In response to the request signal or prompt 396, the controller 104 may initiate the transition from the first arrangement 392 to the second arrangement 400 by transmitting instruction signals to various actuators of the first seating assembly 332 and the second seating assembly 336. In response to the instruction signals transmitted by the controller 104, if the first seating assembly 332 is unoccupied based upon input received from the occupancy sensor 156 of the first seating assembly 332, then the seat 204 of the first seating assembly 332 is actuated to the upwardly-stowed position at step 936 by activating the seat actuator 172 of the first seating assembly 332. If the first seating assembly 332 is determined to be occupied, step 936 may be omitted. At step 940, the seatback 200 of the first seating assembly 332 is rotated toward the seat 204 of the first seating assembly 332 by activation of the seatback actuator 168 of the first seating assembly 332. At step 944, the first seating assembly 332 is rotated about the vertical axis 268 thereof by about one-hundred-eighty degrees (180°) by activation of the swivel actuator 180 of the first seating assembly 332 such that the first seating assembly 332 is placed in the forward-facing orientation. At step 948, the first seating assembly 332 is actuated in the vehicle-rearward direction along the rail system 316 by activation of the translation actuator 184 of the first seating assembly 332. At step 952, the seatback 200 of the first seating assembly 332 may be actuated away from the seat 204 of the first seating assembly 332 by activation of the seatback actuator 168. At step 956, if the first seating assembly 332 was determined to be unoccupied and step 936 was executed, then the seat 204 of the first seating assembly 332 is actuated to the downwardly-deployed position by activation of the seat actuator 172 of the first seating assembly 332. At step 960, the seat 204 of the second seating assembly 336 may be actuated to the upwardly-stowed position by activation of the seat actuator 172 of the second seating assembly 336. Upon completion of the above-outlined steps, the passenger compartment 140 has been transitioned to the child care arrangement from the social arrangement in various examples. As outlined previously, upon entering the child care arrangement, the user may be provided with a predetermined idle time 964.

Referring again to FIG. 32, following the completion of the transition to the child care arrangement and/or expiration of the predetermined idle time 964, the controller 104 may prompt the user regarding whether or not to return the passenger compartment to the social arrangement at decision point 968. If the user selects not to return the arrangement of the passenger compartment 140 to the social arrangement, then the process may be exited at step 972 such that the user will not be prompted again to exit the social arrangement. In such an example, the user of the passenger compartment 140 may interact with the user interface 120 at a later time to adjust the arrangement of the passenger compartment 140, if so desired. However, if the user of the passenger compartment 140 elects to exit the child care arrangement and return to the social arrangement at decision point 968, the process of adjusting the arrangement of the passenger compartment 140 will generally be reversed to return to the social arrangement from the child care arrangement. In such an example, the election of the user of the passenger compartment 140 to return to the social arrangement at decision point 968 may be treated as a prompt 976 or request signal communicated to the controller 104. In returning to the social arrangement from the child care arrangement, the seat 204 of the second seating assembly 336 is actuated to the downwardly-deployed position at step 980 by activation of the seat actuator 172 of the second seating assembly 336. At step 982, the seat 204 of the first seating assembly 332 may be actuated to the upwardly-stowed position if it is determined that the first seating assembly 332 is unoccupied by referencing the occupancy sensor 156 of the first seating assembly 332. If it is determined that the first seating assembly 332 is occupied, then step 982 may be omitted. At step 984, the first seating assembly 332 is actuated in the vehicle-forward direction along the rail system 316 by activation of the translation actuator 184 of the first seating assembly 332. At step 988, the seatback 200 of the first seating assembly 332 may be actuated toward the seat 204 of the first seating assembly 332 by activation of the seatback actuator 168 of the first seating assembly 332. At step 992, the seatback 200 of the first seating assembly 332 may be actuated away from the seat 204 of the first seating assembly 332 by activation of the seatback actuator 168 of the first seating assembly 332. At step 996, the first seating assembly 332 is rotated about the vertical axis 268 thereof by about one-hundred-eighty degrees (180°) by activation of the swivel actuator 180 of the first seating assembly 332. At step 1000, the seat 204 of the first seating assembly 332 may be actuated to the downwardly-deployed position by activation of the seat actuator 172 if step 982 was executed. Upon completion of the steps outlined above for returning to the social arrangement from the child care arrangement, the arrangement of the passenger compartment 140 has been successfully returned to the social arrangement.

Figure 33:
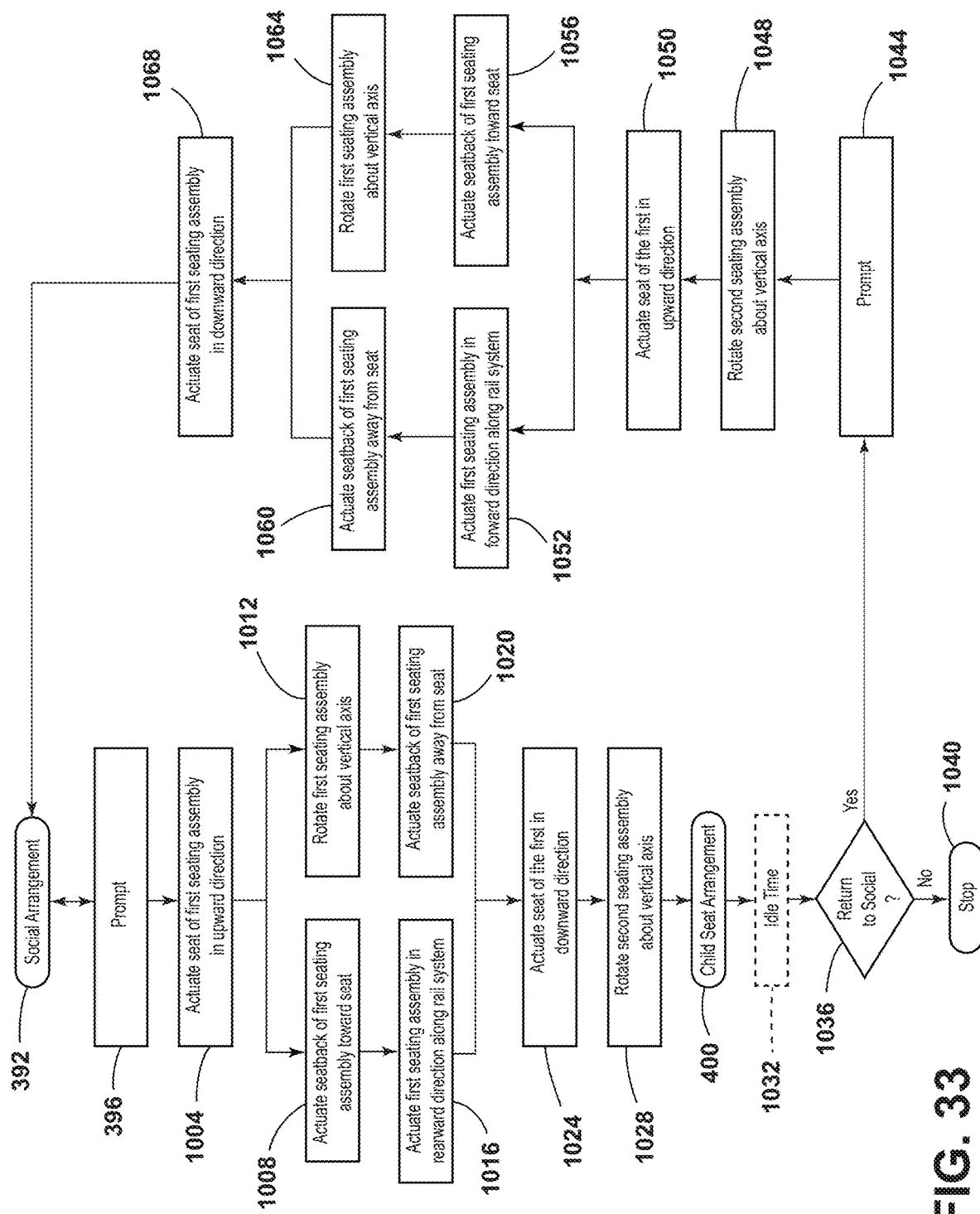
FIG. 33 is a flow diagram illustrating steps in transitioning between the social arrangement and the child seat arrangement, according to one example.

Referring to FIG. 33, a transition from the social arrangement to the child seat arrangement is depicted, according to one example. An arrangement of the passenger compartment 140 is initially in the first arrangement 392, which is the social arrangement in the present example. In deciding to exit the first arrangement 392, the user communicates a request signal to the controller 104 (e.g., by way of the user interface 120), which can constitute the prompt 396 to transition the passenger compartment 140 from the first arrangement 392 to the second arrangement 400. In the depicted example, the second arrangement 400 is the child seat arrangement. In response to the request signal or prompt 396, the controller 104 may initiate the transition from the first arrangement 392 to the second arrangement 400 by transmitting instruction signals to various actuators of the first seating assembly 332 and the second seating assembly 336. In response to the instruction signals transmitted by the controller 104, if the first seating assembly 332 is unoccupied based upon input received from the occupancy sensor 156 of the first seating assembly 332, then the seat 204 of the first seating assembly 332 is actuated to the upwardly-stowed position at step 1004 by activating the seat actuator 172 of the first seating assembly 332. If the first seating assembly 332 is determined to be occupied, step 936 may be omitted. At step 1008, the seatback 200 of the first seating assembly 332 is rotated toward the seat 204 of the first seating assembly 332 by activation of the seatback actuator 168 of the first seating assembly 332. At step 1012, the first seating assembly 332 is rotated about the vertical axis 268 thereof by about one-hundred-eighty degrees (180°) as a result of activation of the swivel actuator 180 of the first seating assembly 332 such that the first seating assembly 332 is placed in the forward-facing orientation. At step 1016, the first seating assembly 332 is actuated in the vehicle-rearward direction along the rail system 316 by activation of the translation actuator 184 of the first seating assembly 332. At step 1020, the seatback 200 of the first seating assembly 332 may be actuated away from the seat 204 of the first seating assembly 332 by activation of the seatback actuator 168. At step 1024, if the first seating assembly 332 was determined to be unoccupied and step 1004 was executed, then the seat 204 of the first seating assembly 332 is actuated to the downwardly-deployed position by activation of the seat actuator 172 of the first seating assembly 332. At step 1028, the second seating assembly 336 is actuated to cause rotation of the second seating assembly 336 by about ninety degrees (90°) about the vertical axis 268 thereof by activation of the swivel actuator 180 of the second seating assembly 336. Upon completion of the above-outlined steps, the passenger compartment 140 has been transitioned to the child seat arrangement from the social arrangement in various examples. As outlined previously, upon entering the child seat arrangement, the user may be provided with a predetermined idle time 1032.

Referring again to FIG. 33, following the completion of the transition to the child seat arrangement and/or expiration of the predetermined idle time 1032, the controller 104 may prompt the user regarding whether or not to return the passenger compartment 140 to the social arrangement at decision point 1036. If the user selects not to return the arrangement of the passenger compartment 140 to the social arrangement, then the process may be exited at step 1040 such that the user will not be prompted again to exit the child seat arrangement. In such an example, the user of the passenger compartment 140 may interact with the user interface 120 at a later time to adjust the arrangement of the passenger compartment 140, if so desired. However, if the user of the passenger compartment 140 elects to exit the child seat arrangement and return to the social arrangement at decision point 1036, the process of adjusting the arrangement of the passenger compartment 140 will generally be reversed to return to the social arrangement from the child seat arrangement. In such an example, the election of the user of the passenger compartment 140 to return to the social arrangement at decision point 1036 may be treated as a prompt 1044 or request signal communicated to the controller 104. In returning to the social arrangement from the child seat arrangement, the second seating assembly 336 is actuated to rotate about the vertical axis 268 thereof by about ninety degrees (90°) in a counter-clockwise direction at step 1048 by activating the swivel actuator 180 of the second seating assembly 336. At step 1050, the seat 204 of the first seating assembly 332 may be actuated to the upwardly-stowed position if it is determined that the first seating assembly 332 is unoccupied by referencing the occupancy sensor 156 of the first seating assembly 332. If it is determined that the first seating assembly 332 is occupied, then step 1050 may be omitted. At step 1052, the first seating assembly 332 is actuated in the vehicle-forward direction along the rail system 316 by activation of the translation actuator 184 of the first seating assembly 332. At step 1056, the seatback 200 of the first seating assembly 332 may be actuated toward the seat 204 of the first seating assembly 332 by activation of the seatback actuator 168 of the first seating assembly 332. At step 1060, the seatback 200 of the first seating assembly 332 may be actuated away from the seat 204 of the first seating assembly 332 by activation of the seatback actuator 168 of the first seating assembly 332. At step 1064, the first seating assembly 332 is rotated about the vertical axis 268 thereof by about one-hundred-eighty degrees (180°) by activation of the swivel actuator 180 of the first seating assembly 332. At step 1068, the seat 204 of the first seating assembly 332 may be actuated to the downwardly-deployed position by activation of the seat actuator 172 if step 1050 was executed. Upon completion of the steps outlined above for returning to the social arrangement from the child seat arrangement, the arrangement of the passenger compartment 140 has been successfully returned to the social arrangement.

Figure 34:
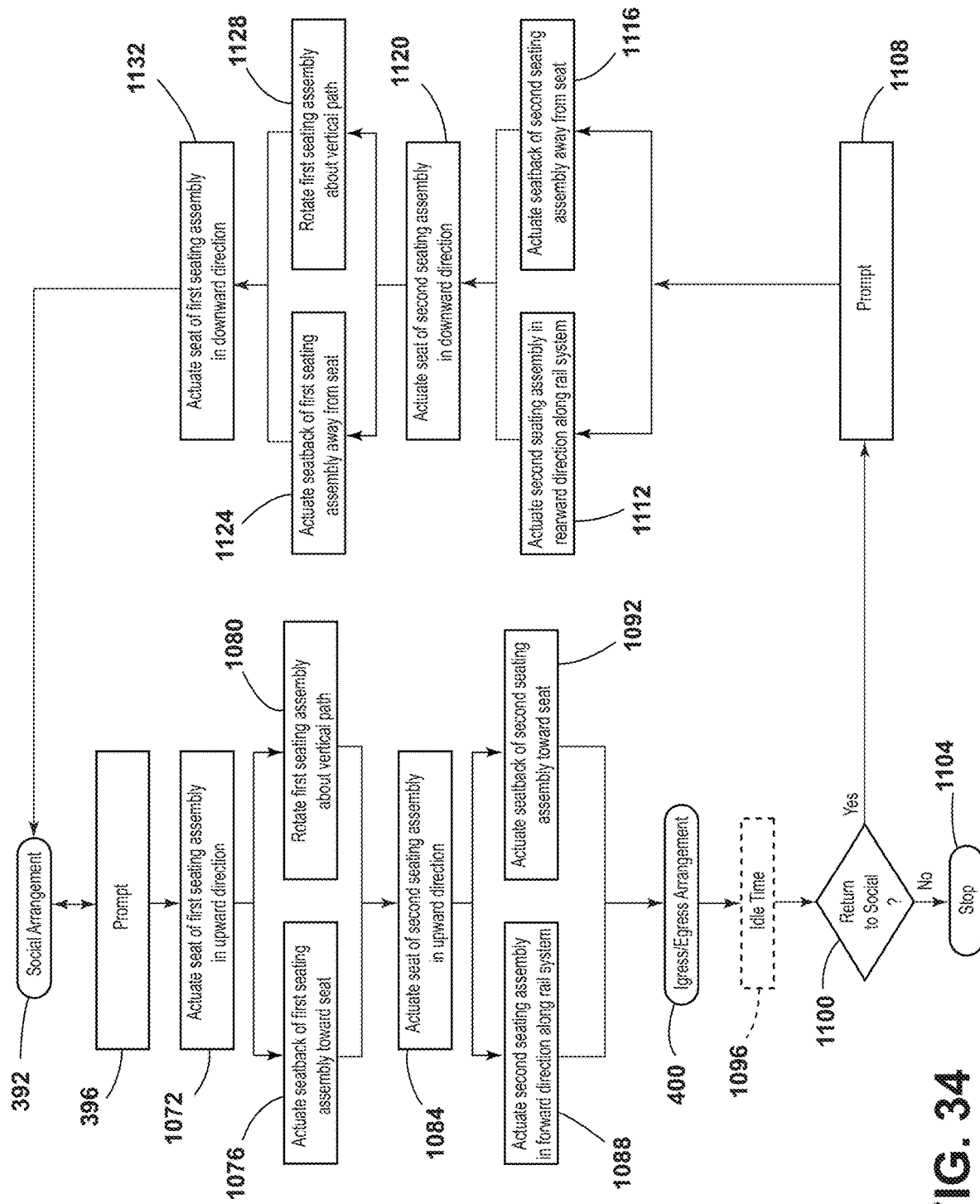
FIG. 34 is a flow diagram illustrating steps in transitioning between the social arrangement and the ingress/egress arrangement, according to one example.

Referring to FIG. 34, a transition from the social arrangement to the ingress/egress arrangement is depicted, according to one example. An arrangement of the passenger compartment 140 is initially in the first arrangement 392, which is the social arrangement in the present example. In deciding to exit the first arrangement 392, the user communicates a request signal to the controller 104 (e.g., by way of the user interface 120), which can constitute the prompt 396 to transition the passenger compartment 140 from the first arrangement 392 to the second arrangement 400. In the depicted example, the second arrangement 400 is the ingress/egress arrangement. In response to the request signal or prompt 396, the controller 104 may initiate the transition from the first arrangement 392 to the second arrangement 400 by transmitting instruction signals to various actuators of the first seating assembly 332 and the second seating assembly 336. In response to the instruction signals transmitted by the controller 104, if the first seating assembly 332 is unoccupied based upon input received from the occupancy sensor 156 of the first seating assembly 332, then the seat 204 of the first seating assembly 332 is actuated to the upwardly-stowed position at step 1072 by activating the seat actuator 172 of the first seating assembly 332. If the first seating assembly 332 is determined to be occupied, step 1072 may be omitted. At step 1076, the seatback 200 of the first seating assembly 332 may be rotated toward the seat 204 of the first seating assembly 332 by activation of the seatback actuator 168 of the first seating assembly 332. At step 1080, the first seating assembly 332 is rotated about the vertical axis 268 thereof by about one-hundred-eighty degrees (180°) as a result of activation of the swivel actuator 180 of the first seating assembly 332 such that the first seating assembly 332 is placed in the forward-facing orientation. Optionally, the first seating assembly 332 may be actuated in the vehicle-rearward direction along the rail system 316 by activation of the translation actuator 184 of the first seating assembly 332 if the first seating assembly 332 will be occupied or was determined to be occupied in connection with step 1072. At step 1084, the seat 204 of the second seating assembly 336 is actuated to the upwardly-stowed position by activation of the seat actuator 172 of the second seating assembly 336. If the first seating assembly 332 is occupied or will be occupied in the ingress/egress arrangement, then the process can include the seatback 200 of the first seating assembly 332 being actuated away from the seat 204 of the first seating assembly 332 by activation of the seatback actuator 168. In various examples, if the first seating assembly 332 was determined to be unoccupied and step 1072 was executed, then the seat 204 of the first seating assembly 332 can be actuated to the downwardly-deployed position by activation of the seat actuator 172 of the first seating assembly 332. At step 1088, the second seating assembly 336 is actuated in the vehicle-forward direction along the rail system 316 by activation of the translation actuator 184 of the second seating assembly 336. At step 1092, the seatback 200 of the second seating assembly 336 is actuated toward the seat 204 of the second seating assembly 336. Upon completion of the above-outlined steps, the passenger compartment 140 has been transitioned to the ingress/egress arrangement from the social arrangement in various examples. As outlined previously, upon entering the ingress/egress arrangement, the user may be provided with a predetermined idle time 1096.

Referring again to FIG. 34, following the completion of the transition to the ingress/egress arrangement and/or expiration of the predetermined idle time 1096, the controller 104 may prompt the user regarding whether or not to return the passenger compartment 140 to the social arrangement at decision point 1100. If the user elects not to return the arrangement of the passenger compartment 140 to the social arrangement, then the process may be exited at step 1104 such that the user will not be prompted again to exit the ingress/egress arrangement. In such an example, the user of the passenger compartment 140 may interact with the user interface 120 at a later time to adjust the arrangement of the passenger compartment 140, if so desired. However, if the user of the passenger compartment 140 elects to exit the ingress/egress arrangement and return to the social arrangement at decision point 1100, the process of adjusting the arrangement of the passenger compartment 140 will generally be reversed to return to the social arrangement from the ingress/egress arrangement. In such an example, the election of the user of the passenger compartment 140 to return to the social arrangement at decision point 1100 may be treated as a prompt 1108 or request signal communicated to the controller 104. In returning to the social arrangement from the ingress/egress arrangement, the second seating assembly 336 is actuated in the vehicle-rearward direction along the rail system 316 at step 1112 by activation of the translation actuator 184 of the second seating assembly 336. At step 1116, the seatback 200 of the second seating assembly 336 is actuated away from the seat 204 of the second seating assembly 336 by activation of the seatback actuator 168. At step 1120, the seat 204 of the second seating assembly 336 is actuated to the downwardly-deployed position by activation of the seat actuator 172. At step 1124, the seatback 200 of the first seating assembly 332 is actuated away from the seat 204 of the first seating assembly 332 by activation of the seatback actuator 168. At step 1128, the first seating assembly 332 is rotated about the vertical axis 268 thereof by about one-hundred-eighty degrees (180°) to be placed in the rearward-facing orientation by activation of the swivel actuator 180 of the first seating assembly 332. At step 1132, the seat 204 of the first seating assembly 332 may be actuated to the downwardly-deployed position if it was determined that the first seating assembly 332 was unoccupied by referencing the occupancy sensor 156 of the first seating assembly 332 in connection with step 1072. If it was determined that the first seating assembly 332 was occupied, then step 1132 may be omitted. Upon completion of the steps outlined above for returning to the social arrangement from the ingress/egress arrangement, the arrangement of the passenger compartment 140 has been successfully returned to the social arrangement.

Figure 35:
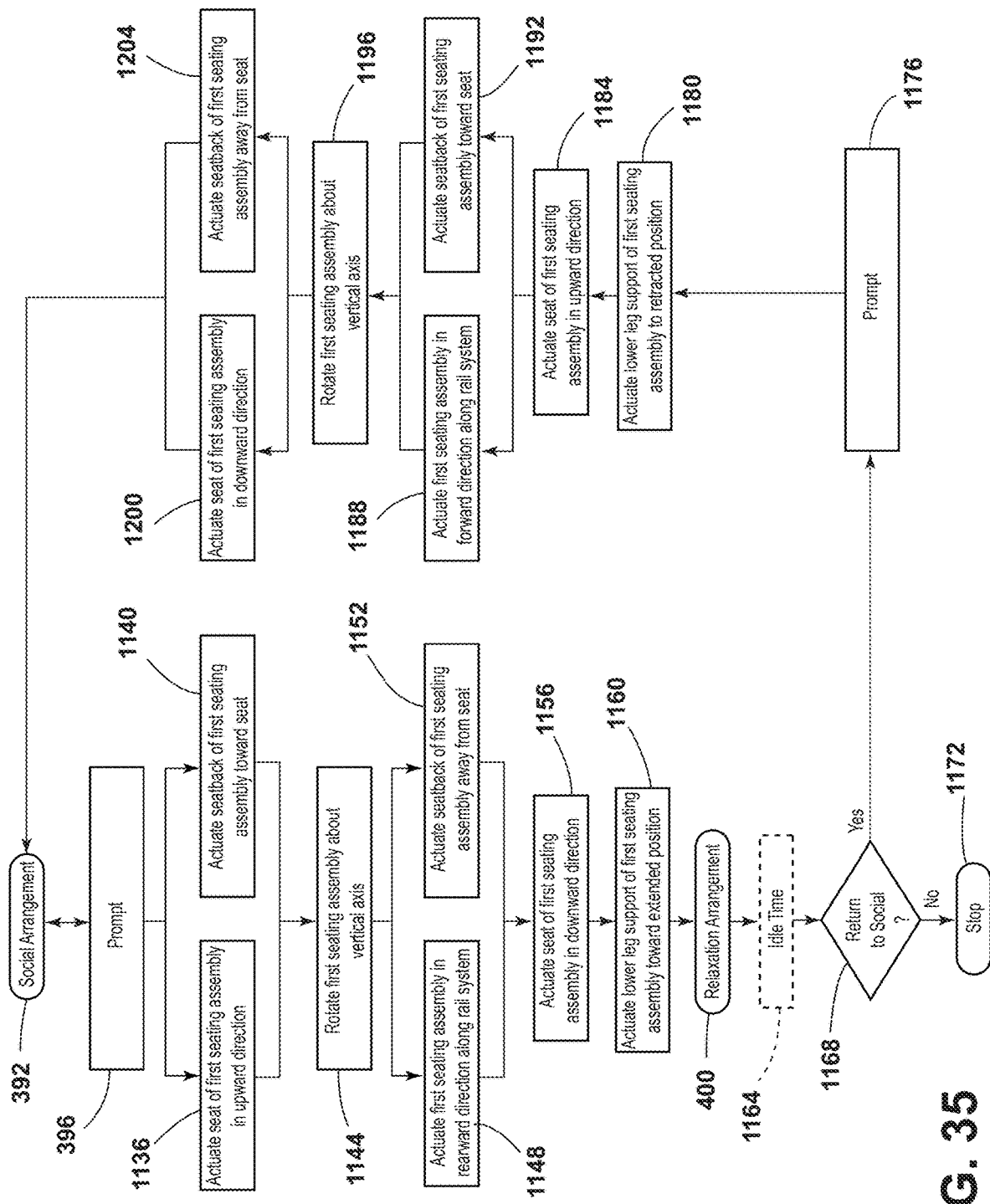
FIG. 35 is a flow diagram illustrating steps in transitioning between the social arrangement and the relaxation arrangement, according to one example.

Referring to FIG. 35, a transition from the social arrangement to the relaxation arrangement is outlined, according to one example. An arrangement of the passenger compartment 140 is initially in the first arrangement 392, which is the social arrangement in the present example. In deciding to exit the first arrangement 392, the user communicates a request signal to the controller 104 (e.g., by way of the user interface 120), which can constitute the prompt 396 to transition the passenger compartment 140 from the first arrangement 392 to the second arrangement 400. In the depicted example, the second arrangement 400 is the relaxation arrangement. In response to the request signal or prompt 396, the controller 104 may initiate the transition from the first arrangement 392 to the second arrangement 400 by transmitting instruction signals to various actuators of the first seating assembly 332. In response to the instruction signals transmitted by the controller 104, if the first seating assembly 332 is unoccupied based upon input received from the occupancy sensor 156 of the first seating assembly 332, then the seat 204 of the first seating assembly 332 is actuated to the upwardly-stowed position at step 1136 by activating the seat actuator 172 of the first seating assembly 332. If the first seating assembly 332 is determined to be occupied, step 1136 may be omitted. At step 1140, the seatback 200 of the first seating assembly 332 may be rotated toward the seat 204 of the first seating assembly 332 by activation of the seatback actuator 168 of the first seating assembly 332. At step 1144, the first seating assembly 332 is rotated about the vertical axis 268 thereof by about one-hundred-eighty degrees (180°) as a result of activation of the swivel actuator 180 of the first seating assembly 332 such that the first seating assembly 332 is placed in the forward-facing orientation. At step 1148, the first seating assembly 332 is actuated in the vehicle-rearward direction along the rail system 316 by activation of the translation actuator 184 of the first seating assembly 332. At step 1152, the seatback 200 of the first seating assembly 332 is actuated away from the seat 204 of the first seating assembly 332 by activation of the seatback actuator 168. In various examples, if the first seating assembly 332 was determined to be unoccupied and step 1136 was executed, then the seat 204 of the first seating assembly 332 can be actuated toward the downwardly-deployed position at step 1156 by activation of the seat actuator 172 of the first seating assembly 332. At step 1160, the lower leg support 208 of the first seating assembly 332 is actuated from the retracted position toward the extended position by activation of the lower leg support actuator 176. Upon completion of the foregoing steps, the arrangement of the passenger compartment 140 has been transitioned from the social arrangement to the relaxation arrangement. As outlined previously, upon entering the relaxation arrangement, the user may be provided with a predetermined idle time 1164.

Referring again to FIG. 35, following the completion of the transition to the relaxation arrangement and/or expiration of the predetermined idle time 1164, the controller 104 may prompt the user regarding whether or not to return the passenger compartment 140 to the social arrangement at decision point 1168. If the user selects not to return the arrangement of the passenger compartment 140 to the social arrangement, then the process may be exited at step 1172 such that the user will not be prompted again to exit the relaxation arrangement. In such an example, the user of the passenger compartment 140 may interact with the user interface 120 at a later time to adjust the arrangement of the passenger compartment 140, if so desired. However, if the user of the passenger compartment 140 elects to exit the relaxation arrangement and return to the social arrangement at decision point 1168, the process of adjusting the arrangement of the passenger compartment 140 will generally be reversed to return to the social arrangement from the relaxation arrangement. In such an example, the election of the user of the passenger compartment 140 to return to the social arrangement at decision point 1168 may be treated as a prompt 1176 or request signal communicated to the controller 104. In returning to the social arrangement from the relaxation arrangement, lower leg support 208 of the first seating assembly 332 is actuated to the retracted position at step 1180 by activation of the lower leg support actuator 176. At step 1184, the seat 204 of the first seating assembly 332 may be actuated to the upwardly-stowed position by activation of the seat actuator 172 if the first seating assembly 332 has been determined to be unoccupied by way of the occupancy sensor 156 of the first seating assembly 332. At step 1188, the first seating assembly 332 is actuated in the vehicle-forward direction along the rail system 316 by activation of the translation actuator 184. At step 1192, the seatback 200 of the first seating assembly 332 is actuated toward the seat 204 of the first seating assembly 332 by activation of the seatback actuator 168. At step 1196, the first seating assembly 332 is actuated about the vertical axis 268 thereof by about one-hundred-eighty degrees (180°) as a result of activation of the swivel actuator 180, thereby placing the first seating assembly 332 in the rearward-facing orientation. At step 1200, the seat 204 of the first seating assembly 332 may be actuated to the downwardly-deployed position by activation of the seat actuator 172 if step 1184 was executed. At step 1204, the seatback 200 of the first seating assembly 332 is actuated away from the seat 204 by activation of the seatback actuator 168. Upon completion of the steps outlined above for returning to the social arrangement from the relaxation arrangement, the arrangement of the passenger compartment 140 has been successfully returned to the social arrangement.

Figure 36:
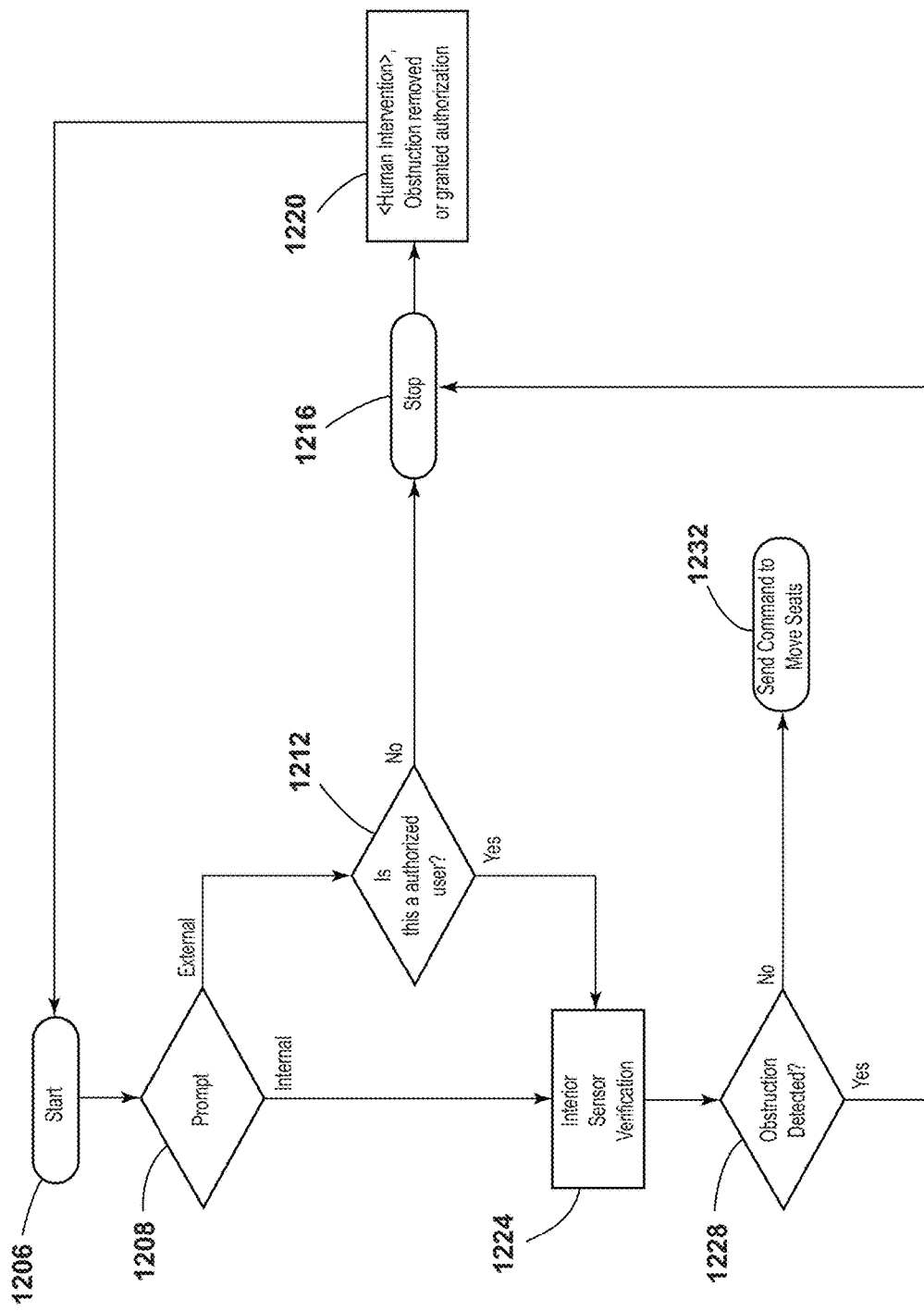
FIG. 36 is a flow diagram illustrating steps in a security process, according to one example.

Referring to FIG. 36, a security process is depicted according to one example. The security process has a starting point 1206. The security process includes a prompt 1208 that is communicated to the controller 104 from either an internal source or an external source. If the source of the prompt 1208 was an external source, then the controller 104 can be used to determine whether the external source is an authorized user at decision point 1212. For example, the controller 104 may reference the memory 112 to determine whether the external source has been registered and/or verified previously (e.g., previously communicatively coupled to the vehicle 100, a verified user within a database that is accessible to the controller 104, or an otherwise recognized external source). If the external source is determined to not be an authorized user at decision point 1212, then the security process may prevent access by the external source and direct the external source to an end point 1216. In directing the external source to end point 1216, the controller 104 may communicate a human intervention prompt 1220 to the external source indicating that the external source is not recognized as an authorized user. The human intervention associated with the human intervention prompt 1220 in such an example may include providing the external source with information regarding how to become a recognized external source and/or authorized user. In examples where the source of the prompt 1208 was an internal source (e.g., a human-machine interface on-board the vehicle 100) or the prompt 1208 was from an authorized user, as determined at decision point 1212, then an interior sensor verification protocol can be executed at step 1224. The interior sensor verification protocol can include referencing an occupancy sensor 156 of one of the seating assemblies 124 that is to be adjusted, referencing movement authorization sensors that detect or sense obstructions to movements of the seating assemblies 124, and so on. At decision point 1228, the security process can determine the presence or absence of an obstruction to a requested adjustment or movement associated with the prompt 1208 as a result of the interior sensor verification protocol executed at step 1224. If no obstruction was detected by the interior sensor verification protocol, the controller 104 can transmit instruction signals at step 1232, with the instruction signals corresponding to the execution of the requested adjustment or movement communicated at the prompt 1208. If an obstruction was detected during the interior sensor verification protocol executed at step 1224, then the controller 104 may direct the security process to end point 1216 and/or human intervention prompt 1220. In such an example where an obstruction was detected, the human intervention associated with the human intervention prompt 1220 can include informing the user about the obstruction detected and requesting the user to remove such obstruction in order to accomplish the requested adjustment or movement.

Referring again to FIG. 36, decision point 1212 can be referred to as an authentication step. In the depicted example, the authentication performed at decision point 1212 occurs when the prompt 1208 was received from an external source. However, the present disclosure is not so limited. Rather, the authentication performed at decision point 1212 can be executed for internal sources or on-board sources of the vehicle 100 without departing from the concepts disclosed herein. For example, hardware that is on-board the vehicle 100 and that can be utilized in authenticating a user prior to transmission of a request signal to the controller 104 and/or prior to transmission of an instruction signal from the controller 104 can include, but is not limited to, the imager 132, a camera, a microphone, and/or various sensors. It is contemplated that facial recognition, voice recognition, gesture-as-a-passcode, and/or phone-as-a-key approaches may be employed in determining a user is an authorized user. Gesture-as-a-passcode can include a user-established gesture that can be recognized via the imager 132, a camera, a touch-sensitive sensor, and/or another suitable sensor. The recognized gesture can be referenced against a stored gesture of one or more authorized users in determining whether a given user is authorized to access the vehicle 100 at a given time. Phone-as-a-key can include the controller 104 recognizing a given personal mobile device of a user as being a personal mobile device of an authorized user. For example, the authorized user may have established the personal mobile device as belonging to the authorized user by registering the personal mobile device (e.g., by use of a software application stored thereon, by use of unique identifying information of the personal mobile device, etc.) in a manner that can be recognized by the controller 104.

Figure 37:
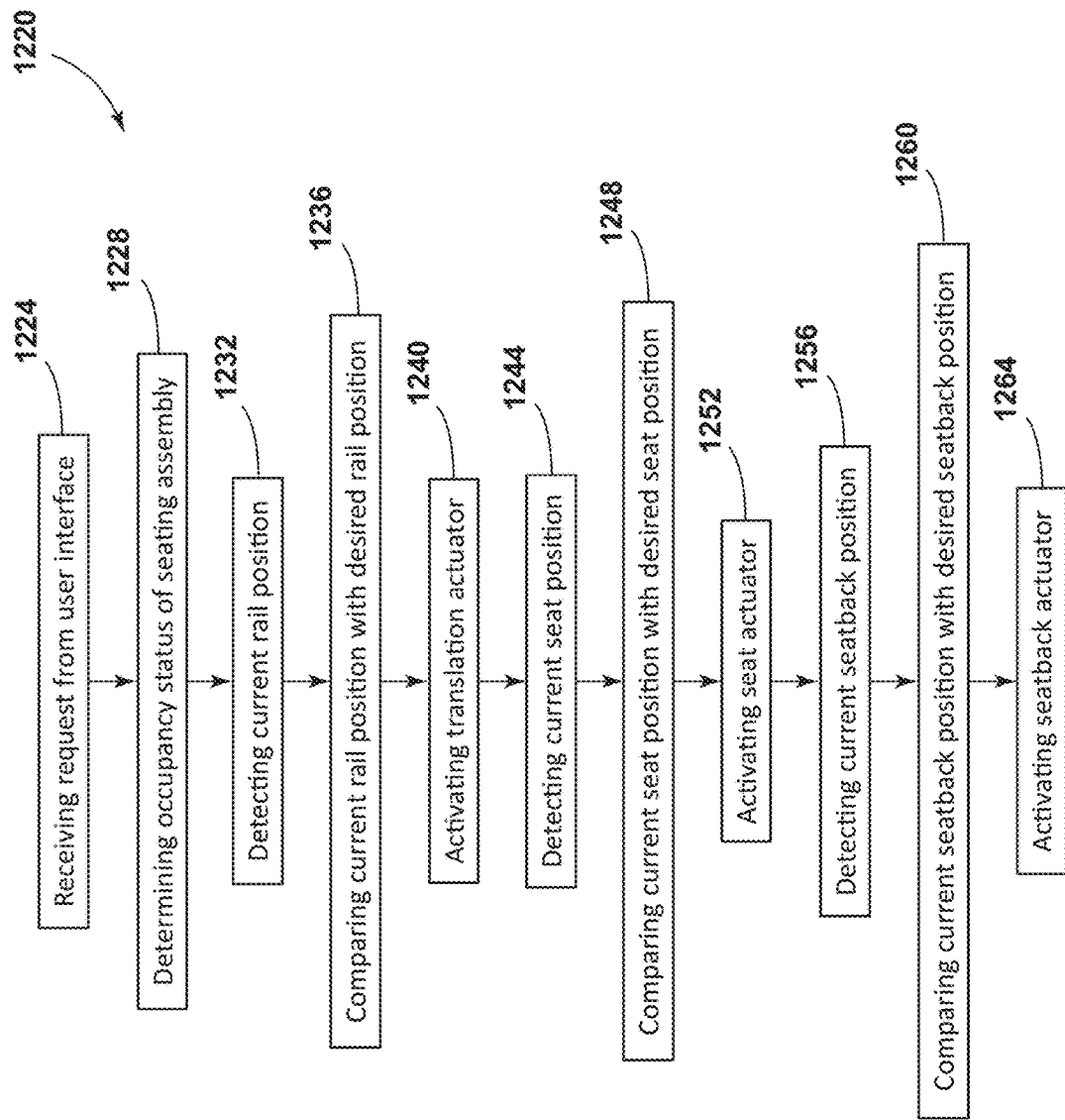
FIG. 37 is a flow diagram illustrating a method of adjusting an arrangement of the passenger compartment, according to the present disclosure.

Referring to FIG. 37, a method 1220 of adjusting the passenger compartment 140 arrangement of the vehicle 100 includes step 1224 of receiving a request from the user interface 120 to transition an arrangement of the passenger compartment 140 of the vehicle 100 from the first arrangement 392 to the second arrangement 400. The method 1220 also includes step 1228 of determining an occupancy status of a seating assembly 124 with an occupancy sensor 156 prior to initiation of the transition from the first arrangement 392 to the second arrangement 400. The seating assembly 124 includes the seat 204 and the seatback 200. The method 1220 further includes step 1232 of detecting a current rail position of the seating assembly 124 along the rail system 316 within the passenger compartment 140 of the vehicle 100 with the rail sensor 136. Additionally, the method 1220 includes step 1236 of comparing the current rail position of the seating assembly 124 along the rail system 316 with a desired rail position of the seating assembly 124 along the rail system 316 and determining a rail positional difference. Further, the method 1220 includes step 1240 where, in response to the rail positional difference, the translation actuator 184 of the seating assembly 124 is activated by the controller 104 to align the seating assembly 124 with the desired rail position. The method 1220 also includes step 1244 of detecting a current seat position of the seat 204 of the seating assembly 124 with the seat position sensor 280. The method 1220 further includes step 1248 of comparing the current seat position to a desired seat position and determining a seat positional difference. Additionally, the method 1220 includes step 1252 where, in response to the seat positional difference, the seat actuator 172 of the seating assembly 124 is activated by the controller 104 to align the seat 204 with the desired seat position. Further, the method 1220 includes step 1256 of detecting a current seatback position of the seatback 200 of the seating assembly 124 with the seatback position sensor 276. The method 1220 also includes step 1260 of comparing the current seatback position to a desired seatback position and determining a seatback positional difference. The method 1220 further includes step 1264 where, in response to the seatback positional difference, the seatback actuator 168 of the seating assembly 124 is activated by the controller 104 to align the seatback 200 with the desired seatback position.

Referring again to FIG. 37, in various examples, the seating assembly 124 may be provided with the lower leg support 208. Accordingly, the method 1220 may include detecting a current lower leg support position of the lower leg support 208 of the seating assembly 124 with the lower leg support position sensor 404. Additionally, in such an example, the method 1220 can include comparing the current lower leg support position to a desired lower leg support position and determining a lower leg support positional difference. Further, in such an example, the method 1220 can include, in response to the lower leg support positional difference, activating the lower leg support actuator 176 to align the lower leg support 208 with the desired lower leg support position. In some examples, the method 1220 can include detecting a current swivel position of the swivel assembly 260 of the seating assembly 124 with the swivel position sensor 284. Additionally, in such an example, the method 1220 can include comparing the current swivel position to a desired swivel position and determining a swivel positional difference. Further, in such an example, the method 1220 can include, in response to the swivel positional difference, activating the swivel actuator 180 to align the swivel assembly 260 with the desired swivel position. Examples of the user interface 120 can include, but are not limited to, a mobile electronic device, the imager 132 with a field of view oriented toward the passenger compartment 140 of the vehicle 100, the imager 132 with a field of view oriented toward the vehicle-exterior environment, a microphone positioned within the passenger compartment 140 of the vehicle 100, a microphone positioned on an exterior of the vehicle 100, a microphone provided on the users' personal electronic device, and so on. In various examples, the method 1220 can include detecting an occupancy status of the passenger compartment 140 of the vehicle 100 with the occupancy sensor 156 of the seating assembly 124. Additionally, in such an example, the method 1220 can include determining that the passenger compartment 140 is devoid of occupants prior to transitioning the arrangement of the passenger compartment from the first arrangement 392 to the second arrangement 400. In some examples, the transition of the passenger compartment 140 from the first arrangement 392 to the second arrangement 400 is accomplished while the vehicle 100 is in motion (e.g., en route to a destination while occupied, en route to a pick-up location while unoccupied, etc.). In various examples, the first arrangement 392 may be a preferred arrangement of the passenger compartment 140 as communicated to the controller 104 by a first user, whereas the second arrangement 400 is a preferred arrangement of the passenger compartment 140 as communicated to the controller 104 by a second user. In such an example, the first user may have ceased their use of the vehicle 100 and the vehicle 100 is in motion to a location of the second user. In some examples, when the controller 104 receives the request from the user interface 120 to transition the arrangement of the passenger compartment 140 of the vehicle 100 from the first arrangement 392 to the second arrangement 400, the controller 104 may receive data regarding a number of occupants expected to enter the passenger compartment and an intended geographical destination of the number of occupants, with the data dictating the selection of the second arrangement 400. For example, the controller 104 may have data stored in the memory 112 relating to business addresses, previous arrangements utilized when selecting a given destination, previous arrangement utilized when transporting a given number of occupants, and so on. Accordingly, the controller 104 may be capable of selecting a desirable arrangement based upon the data stored within the memory 112.

Figure 38:
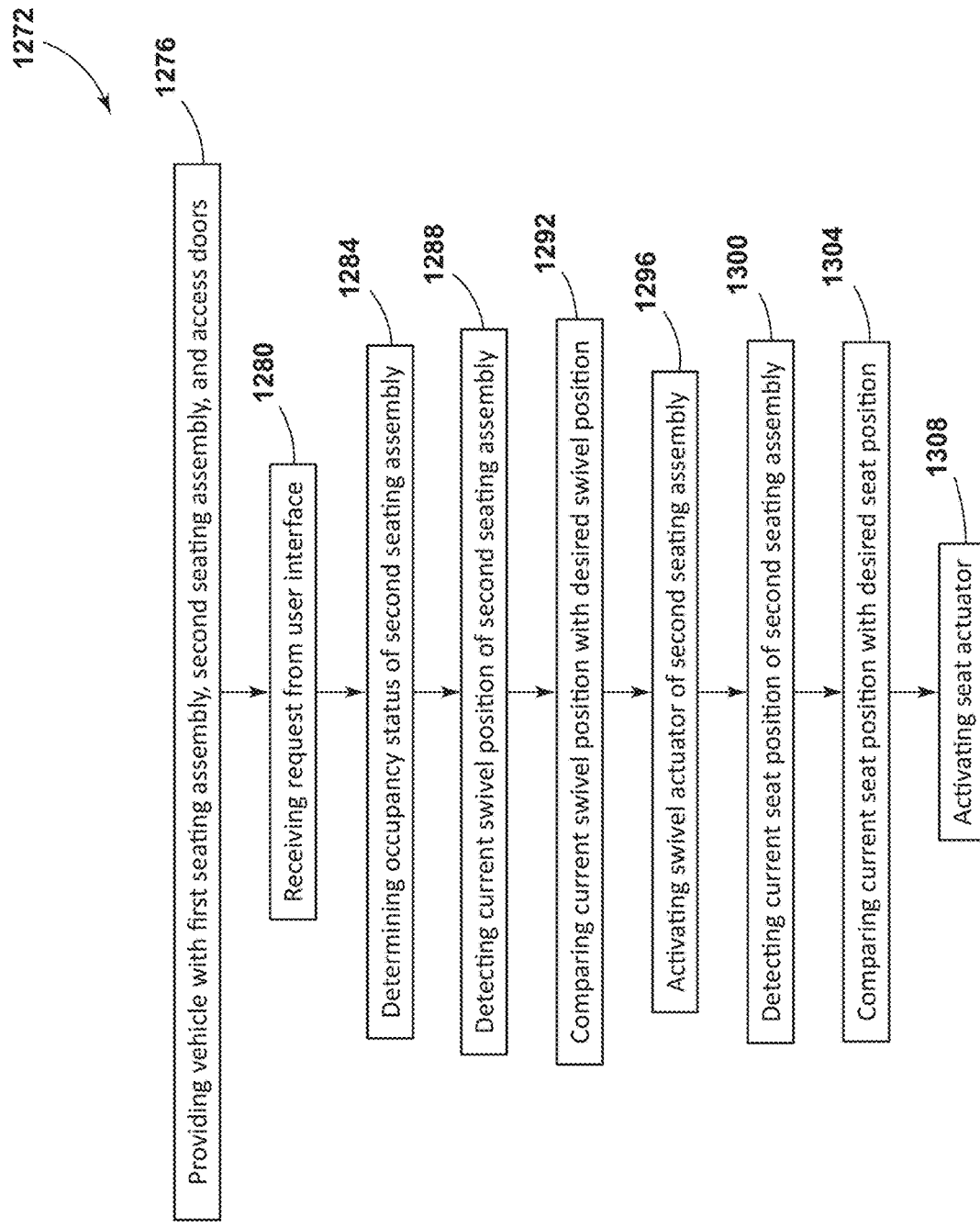
FIG. 38 is a flow diagram illustrating a method of adjusting an arrangement of the passenger compartment, according to the present disclosure.

Referring to FIG. 38, a method 1272 of adjusting the passenger compartment 140 arrangement of the vehicle 100 includes step 1276 of providing the vehicle 100 with the first seating assembly 332, the second seating assembly 336, and a plurality of the access doors 312 that separate the passenger compartment 140 from the vehicle-exterior environment. The second seating assembly 336 is positioned rearward of the first seating assembly 332. The first and second seating assemblies 332, 336 each include the seat 204 and the seatback 200 that define the seating surfaces 350 thereof. The method 1272 also includes step 1280 of receiving a request from the user interface 120 to transition the arrangement of the passenger compartment 140 of the vehicle 100 from the first arrangement 392 to the second arrangement 400. In various examples, the second arrangement 400 may be the child seat arrangement. The method 1272 further includes step 1284 of determining with the occupancy sensor 156 of the second seating assembly 336 whether the second seating assembly 336 is unoccupied prior to initiation of the transition from the first arrangement 392 to the second arrangement 400. Additionally, the method 1272 includes step 1288 of detecting a current swivel position of the second seating assembly 336 with the swivel position sensor 284. Further, the method 1272 includes step 1292 of comparing the current swivel position of the second seating assembly 336 to a desired swivel position and determining a swivel positional difference. The method 1272 also includes step 1296 where, in response to the swivel position difference, the swivel actuator 180 of the second seating assembly 336 is activated by the controller 104 to align the second seating assembly 336 with the desired swivel position. In various examples, the desired swivel position orients the seating surface 350 of the second seating assembly 336 toward an immediately adjacent one of the plurality of access doors 312. The method 1272 further includes step 1300 of detecting a current seat position of the seat 204 of the second seating assembly 336 with the seat position sensor 280. Additionally, the method 1272 includes step 1304 of comparing the current seat position of the second seating assembly 336 with the desired seat position and determining a seat positional difference. Further, the method 1272 includes step 1308 where, in response to the seat positional difference, the seat actuator 172 of the second seating assembly 336 is activated by the controller 104 to align the seat 204 of the second seating assembly 336 with the desired seat position.

Referring again to FIG. 38, the orienting of the seating surface 350 of the second seating assembly 336 toward the immediately adjacent one of the plurality of access doors 312 can position the seating surface 350 of the second seating assembly 336 parallel to a lateral axis 1310 (see FIG. 6) of the vehicle 100 and angularly offset from the longitudinal axis or longitudinal direction 328 of the vehicle 100. In various examples, the method 1272 can include actuating the swivel actuator 180 of the second seating assembly 336 through a rotation of about ninety degrees (90°) to arrive at the desired swivel position. In such an example, the first arrangement 392 may be the design arrangement with the first and second seating assemblies 332, 336 each arranged in the forward-facing orientation. The method 1272 can further include providing the second seating assembly 336 with the secondary seating assembly 500 coupled to the seating surface 350 of the second seating assembly 336. The secondary seating assembly 500 can be smaller than the second seating assembly 336, with the secondary seating assembly 500 being configured to receive a smaller-statured occupant than the second seating assembly 336. The method 1272 can also include providing the rail system 316 within the floor 320 of the passenger compartment 140 and extending along the longitudinal direction 328 of the vehicle 100. In some example, the method 1272 can include providing each of the first and second seating assemblies 332, 336 with the translation actuator 184 coupled to the seatbase 228 and engaged with the rail system 316. In various examples, the method 1272 can include activating the translation actuator 184 of the second seating assembly 336 to actuate the second seating assembly 336 along the rail system 316 in the vehicle-rearward direction to position the second seating assembly 336 at the desired rail position. In some examples, the desired seat position of the second seating assembly 336 may be the downwardly-deployed position of the seat 204. In various examples, the first arrangement 392 is the cargo arrangement, where the cargo arrangement can be defined as the seats 204 of the first and second seating assemblies 332, 336 being placed in the upwardly-stowed position, as well as the first and second seating assemblies 332, 336 being actuated along the rail system 316 toward the forward region 300 of the passenger compartment 140. In some examples, the first arrangement 392 is the ingress/egress arrangement, where the seat 204 of the second seating assembly is placed in the upwardly-stowed position and the second seating assembly 336 is actuated along the rail system 316 toward the forward region 300 of the passenger compartment 140. In various examples, the first arrangement 336 may be a preferred arrangement of the passenger compartment 140 as communicated to the controller 104 by a first user and the second arrangement 400 may be a preferred arrangement of the passenger compartment 140 as communicated to the controller 104 by a second user. In such an example, the first user has ceased use of the vehicle 100 and the vehicle 100 may be in motion to a location of the second user.

Figure 39:
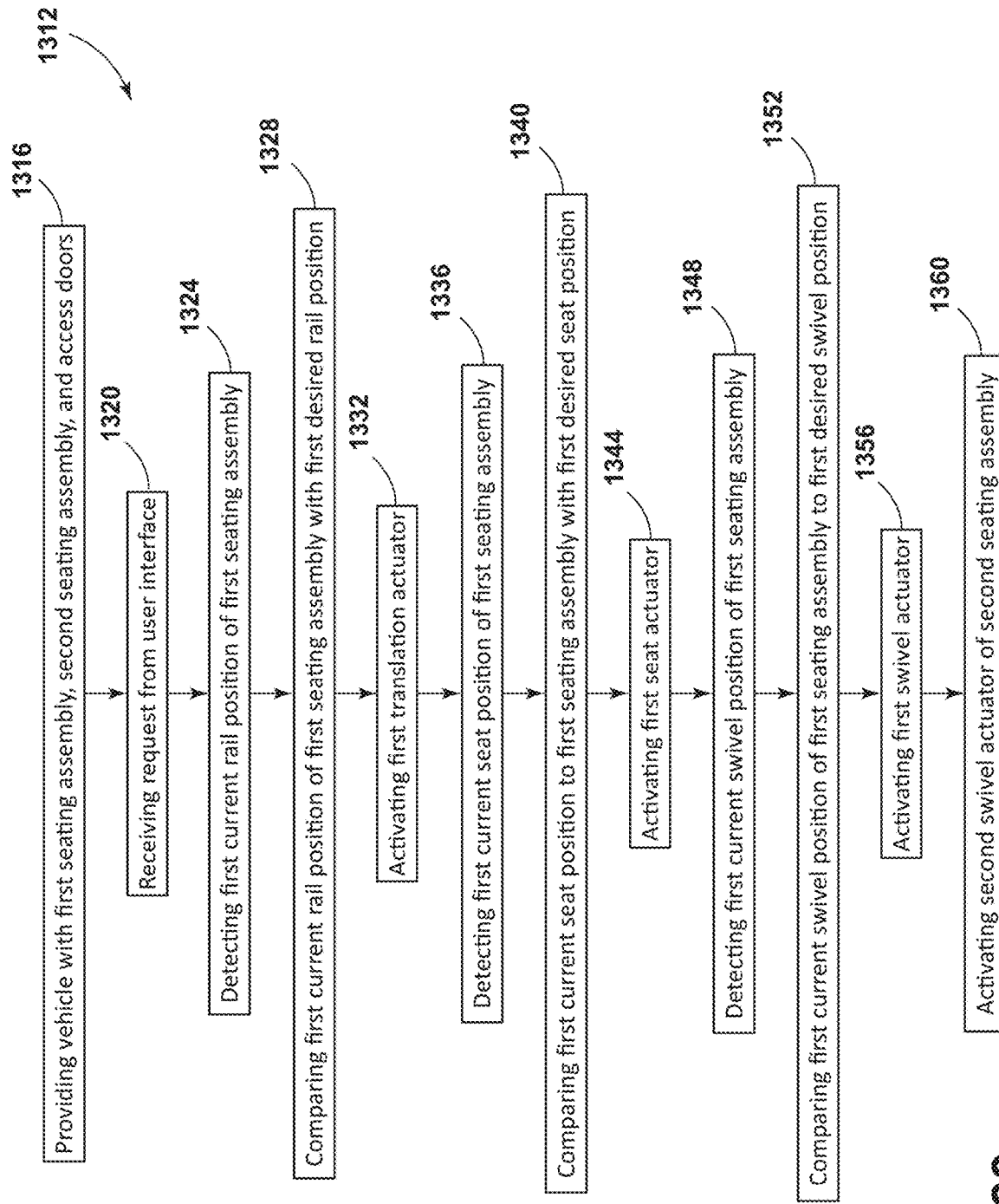
FIG. 39 is a flow diagram illustrating a method of adjusting an arrangement of the passenger compartment, according to the present disclosure.

Referring to FIG. 39, a method 1312 of adjusting the passenger compartment 140 arrangement of the vehicle 100 includes step 1316 of providing the vehicle 100 with the first seating assembly 332, the second seating assembly 336, and a plurality of the access doors 312. The second seating assembly 336 is positioned rearward of the first seating assembly 332. The first and second seating assemblies 332, 336 each include the seat 204 and the seatback 200 that define the seating surface 350 configured to receive an occupant. The access doors 312 separate the passenger compartment 140 from the vehicle-exterior environment. The method 1312 also includes step 1320 of receiving a request from the user interface 120 to transition the arrangement of the passenger compartment 140 of the vehicle 100 from the first arrangement 392 to the second arrangement 400. In the depicted example, the first arrangement 392 may be the child seat arrangement. The child seat arrangement can be defined as the second seating assembly 336 being rotated such that the seating surface 350 thereof is oriented toward an immediately adjacent one of the plurality of access doors 312. The method 1312 further includes step 1324 of detecting a first current rail position of the first seating assembly 332 along the rail system 316 within the passenger compartment 140 of the vehicle 100 with a first rail sensor 136. Additionally, the method 1312 includes step 1328 of comparing the first current rail position of the first seating assembly 332 with a first desired rail position and determining a first rail positional difference. Further, the method 1312 includes step 1332 where, in response to the first rail positional difference, the controller 104 activates a first translation actuator 184 of the first seating assembly 332 to align the first seating assembly 332 with the first desired rail position. The method 1312 also includes step 1336 of detecting a first current seat position of the first seating assembly 332 with a first seat position sensor 280. The method 1312 further includes step 1340 of comparing the first current seat position of the first seating assembly 332 to the first desired seat position and determining a first seat positional difference. Additionally, the method 1312 includes step 1344 where, in response to the first seat positional difference, the controller 104 activates the first seat actuator 172 of the first seating assembly 332 to align the seat 204 of the first seating assembly 332 with the first desired seat position. Further, the method 1312 includes step 1348 of detecting a first current swivel position of the first seating assembly 332 with a first swivel position sensor 284. The method 1312 also includes step 1352 of comparing the first current swivel position to a first desired swivel position and determining a first swivel positional difference. The method 1312 further includes step 1356 where, in response to the first swivel positional difference, the controller 104 activates the first swivel actuator 180 to align the first seating assembly 332 with the first desired swivel position. Additionally, the method 1312 includes step 1360 of activating a second swivel actuator 180 of the second seating assembly 336 such that the second seating assembly 336 is rotated about the vertical axis 268 thereof.

Referring again to FIG. 39, the step 1360 of activating a second swivel actuator 180 of the second seating assembly 336 such that the second seating assembly 336 is rotated about the vertical axis 268 thereof can position the second seating assembly 336 in the forward-facing orientation. In some examples, the step 1356 of activating the first swivel actuator 180 to align the first seating assembly 332 with the first desired swivel position can position the first seating assembly 332 in the rearward-facing orientation. In various examples, the step 1356 of activating the first swivel actuator 180 to align the first seating assembly 332 with the first desired swivel position can position the first seating assembly 332 in the forward-facing orientation. The method 1312 can include detecting a second current rail position of the second seating assembly 336 along the rail system 316 within the passenger compartment of the vehicle 100 with a second rail sensor 136. In such an example, the method 1312 can also include comparing the second current rail position of the second seating assembly 336 with a second desired rail position and determining a second rail positional difference. In such examples, the method 1312 can further include, in response to the second rail positional difference, activating a second translation actuator 180 of the second seating assembly 336 to align the second seating assembly 336 with the second desired rail position. The method 1312 can further include detecting a second current seat position of the second seating assembly 336 with a second seat position sensor 280. In such an example, the method 1312 can also include comparing the second current seat position of the second seating assembly 336 to a second desired seat position and determining a second seat positional difference. Additionally, in such an example, the method 1312 can further include, in response to the second seat positional difference, activating a second seat actuator 172 of the second seating assembly 336 to align the seat of the second seating assembly with the desired seat position. The step of activating the second seat actuator 172 of the second seating assembly 336 to align the seat 204 of the second seating assembly 336 with the second desired seat position can position the seat 204 of the second seating assembly 336 in the upwardly-stowed position. The step of activating the first seat actuator 172 of the first seating assembly 332 to align the seat 204 of the first seating assembly with the first desired seat position can position the seat 204 of the first seating assembly 332 in the upwardly-stowed position. The step of activating the first translation actuator 184 of the first seating assembly 332 to align the first seating assembly 332 with the first desired rail position can position the first seating assembly 332 proximate to the forward-extreme of the rail system 316 within the forward region 300 of the passenger compartment 140. The step of activating the second translation actuator 184 of the second seating assembly 336 to align the second seating assembly 336 with the second desired rail position can position the second seating assembly 336 in the forward region 300 of the passenger compartment 140.

Figure 40:
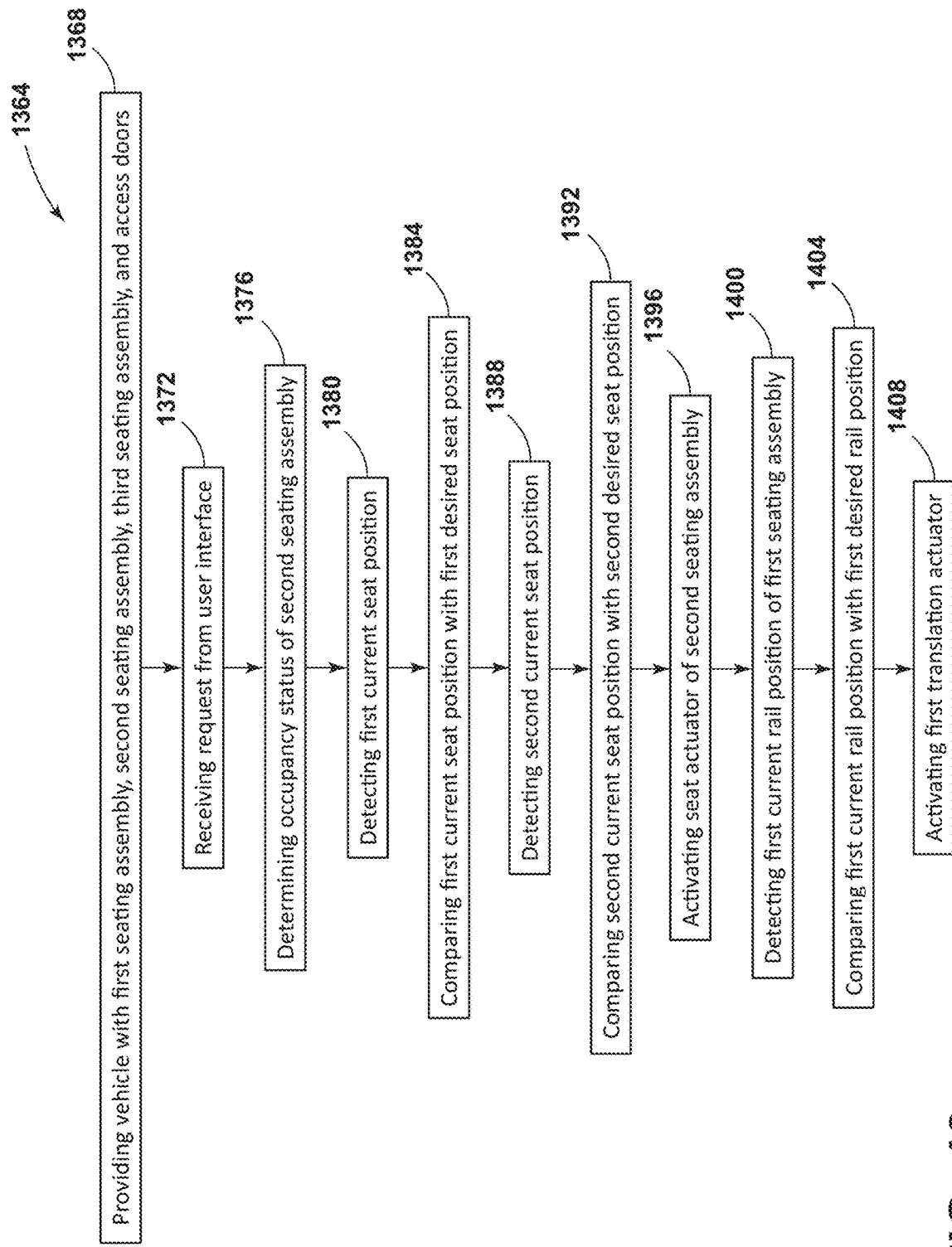
FIG. 40 is a flow diagram illustrating a method of adjusting an arrangement of the passenger compartment, according to the present disclosure.

Referring to FIG. 40, a method 1364 of adjusting the passenger compartment 140 arrangement of the vehicle 100 includes step 1368 of providing the vehicle 100 with the first seating assembly 332, the second seating assembly 336, the third seating assembly 340, and the access doors 312. The second seating assembly 336 is positioned rearward of the first seating assembly 332. The third seating assembly 340 is positioned rearward of the first seating assembly 332 and laterally adjacent to the second seating assembly 336. The first, second, and third seating assemblies 332, 336, 340 include the seat 204 and the seatback 204 that define the seating surfaces 350 thereof. The access doors 312 separate the passenger compartment 140 from the vehicle-exterior environment. The method 1364 can also include step 1372 of receiving a request from the user interface 120 to transition the arrangement of the passenger compartment 140 of the vehicle 100 from the first arrangement 392 to the second arrangement 400. The second arrangement 400 may be the child care arrangement. The method 1364 can further include step 1376 of determining with the occupancy sensor 156 of the second seating assembly 336 whether the second seating assembly 336 is unoccupied prior to initiation of the transition from the first arrangement 392 to the second arrangement 400. Additionally, the method 1364 includes step 1380 of detecting a first current seat position of the seat 204 of the first seating assembly 332 with a first seat position sensor 280. Further, the method 1364 includes step 1384 of comparing the first current seat position of the first seating assembly 332 to a first desired seat position and determining a first seat positional difference. The method 1364 also includes step 1388 of detecting a second current seat position of the seat 204 of the second seating assembly 336 with a second seat position sensor 280. The method 1364 further includes step 1392 of comparing the second current seat position of the second seating assembly 336 to a second desired seat position and determining a second seat positional difference. Additionally, the method 1364 includes step 1396 where, in response to the second seat positional difference, the controller 104 activates the seat actuator 172 of the second seating assembly 336 to align the seat 204 of the second seating assembly 336 with the second desired seat position. The second desired seat position may be the upwardly-stowed position for the seat 204 of the second seating assembly 336. Further, the method 1364 includes step 1400 of detecting a first current rail position of the first seating assembly 332 along the rail system 316 within the passenger compartment 140 of the vehicle 100 with a first rail sensor 136. The method 1364 also includes step 1404 of comparing the first current rail position of the first seating assembly 336 with a first desired rail position and determining a first rail positional difference. The method 1364 further includes step 1408 where, in response to the first rail positional difference, the controller 104 activates a first translation actuator 184 of the first seating assembly 332 to align the first seating assembly 332 with the first desired rail position. Placing the first seating assembly 332 in the first desired rail position can result in the first and second seating assemblies 332, 336 both being positioned in the central region 304 of the passenger compartment 140.

Referring again to FIG. 40, the first desired rail position of the first seating assembly 332 can result in a decrease in a distance between the first seating assembly 332 and the second seating assembly 336. Additionally, the first desired rail position of the first seating assembly 332 can result in a decrease in a distance between the first seating assembly 332 and the third seating assembly 340. In various examples, the method 1364 can include activating a swivel actuator of the first seating assembly 332 such that the first seating assembly 332 rotates about the vertical axis 268 thereof toward the third seating assembly 340. In some examples, the method 1364 can include activating a second translation actuator 184 of the second seating assembly 336 to actuate the second seating assembly 336 along the rail system 316 in the vehicle-rearward direction to position the second seating assembly 336 at a second desired rail position. In various examples, the second desired seat position of the second seating assembly 336 can be the upwardly-stowed position of the seat 204. In some examples, the first arrangement is the ingress/egress arrangement. The method 1364 can also include, in response to the first seat positional difference, activating a first seat actuator 172 of the first seating assembly 332 to align the seat 204 of the first seating assembly 332 with the first desired seat position. In some examples, the first desired seat position is the downwardly-deployed position of the seat 204 of the first seating assembly 332. In various examples, the first arrangement 392 can be the cargo arrangement. In some examples, the first arrangement 392 is the design arrangement. In various examples, the method 1364 includes detecting a current seatback position of the seatback 200 of the first seating assembly 332 with a seatback position sensor 276. In such an example, the method 1364 can also include comparing the current seatback position of the first seating assembly to a first desired seatback position and determining a seatback positional difference. Additionally, in such an example, the method 1364 can include, in response to the seatback positional difference, activating the seatback actuator 168 of the first seating assembly 332 to align the seatback 200 of the first seating assembly 332 with the desired seatback position. The desired seatback position can be an upright position of the seatback 200 of the first seating assembly 332. The first arrangement 392 can be the relaxation arrangement in various examples.

Figure 41:
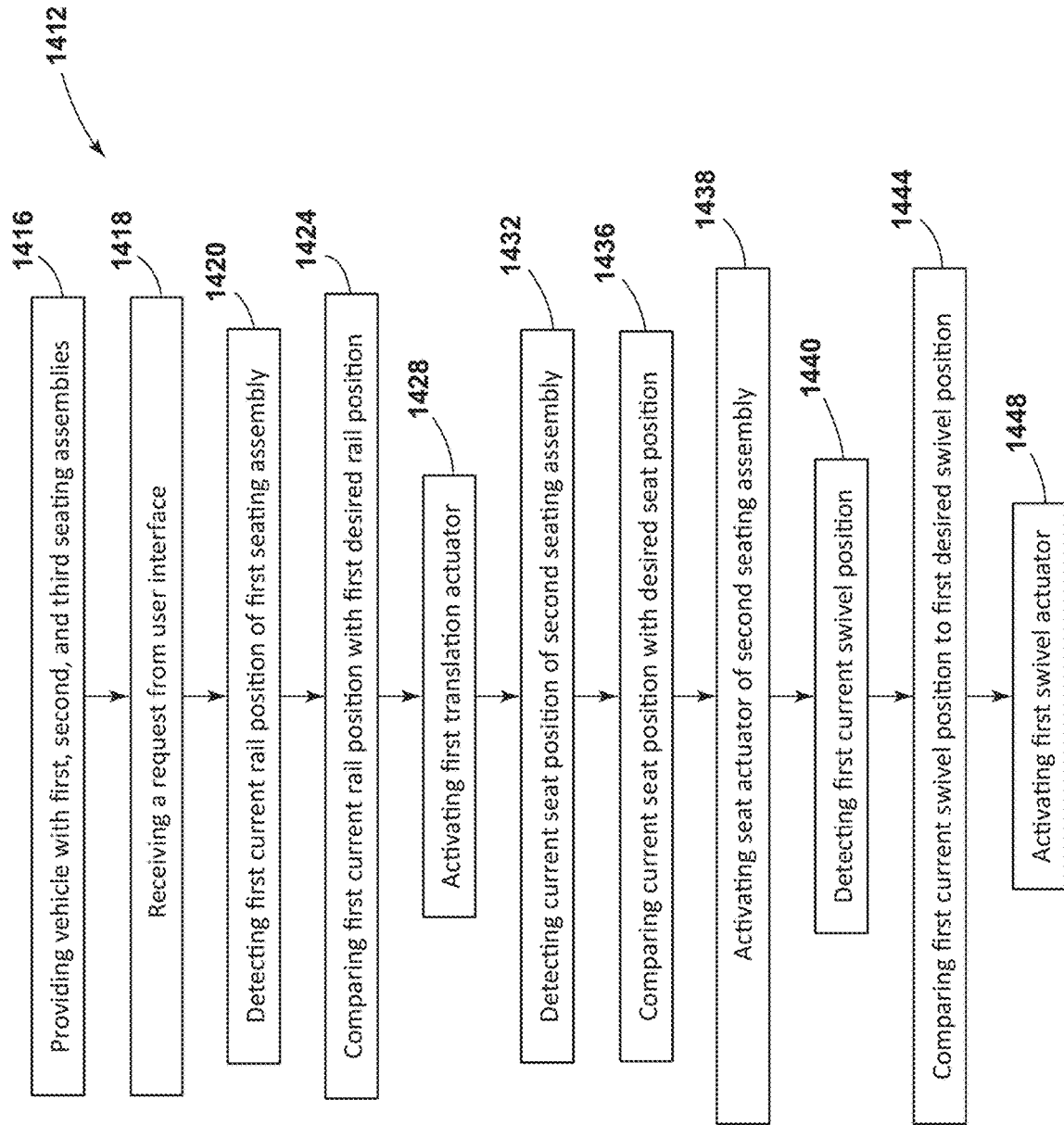
FIG. 41 is a flow diagram illustrating a method of adjusting an arrangement of the passenger compartment, according to the present disclosure.

Referring to FIG. 41, a method 1412 of adjusting the passenger compartment 140 arrangement of the vehicle 100 includes the step 1416 of providing the vehicle 100 with the first, second, and third seating assemblies 332, 336, 340. The second seating assembly 336 is positioned rearward of the first seating assembly 332. The third seating assembly 340 is positioned rearward of the first seating assembly 332 and laterally adjacent to the second seating assembly 336. The first, second, and third seating assemblies 332, 336, 340 each include the seat 204 and the seatback 200 that define seating surfaces 350 that are each configured to receive an occupant. The method 1412 also includes step 1418 of receiving a request from the user interface 120 to transition the arrangement of the passenger compartment 140 of the vehicle 100 from the first arrangement 392 to the second arrangement 400. The first arrangement 392 may be the child care arrangement. The method 1412 further includes step 1420 of detecting a first current rail position of the first seating assembly 332 along the rail system 316 within the passenger compartment 140 of the vehicle 100 with a first rail sensor 136. Additionally, the method 1412 includes step 1424 of comparing the first current rail position of the first seating assembly 332 with a first desired rail position and determining a first rail positional difference. Further, the method 1412 includes step 1428 where, in response to the first rail positional difference, the controller 104 activates a first translation actuator 184 of the first seating assembly 332 to align the first seating assembly 332 with the first desired rail position. The method 1412 also includes step 1432 of detecting a current seat position of the second seating assembly 336 with the seat position sensor 280. The method 1412 further includes step 1436 of comparing the current seat position of the second seating assembly 336 to a desired seat position and determining a seat positional difference. Additionally, the method 1412 includes step 1438 where, in response to the seat positional difference, the controller 104 activates the seat actuator 172 of the second seating assembly 336 to align the seat 204 of the second seating assembly 336 with the desired seat position. Further, the method 1412 includes step 1440 of detecting a first current swivel position of the first seating assembly 332 with a first swivel position sensor 284. The method 1412 also includes step 1444 of comparing the first current swivel position to a first desired swivel position and determining a first swivel positional difference. The method 1412 further includes step 1448 where, in response to the first swivel positional difference, the controller 104 activates a first swivel actuator 180 of the first seating assembly 332 to align the first seating assembly with the first desired swivel position.

Referring again to FIG. 41, in various examples, the child care arrangement can be defined as the seat 204 of the second seating assembly 336 being in the upwardly-stowed position and the first seating assembly 332 being actuated from the forward region 300 of the passenger compartment 140 toward the central region 304 of the passenger compartment 140 such that the first and second seating assemblies 332, 336 are each positioned in the central region 304 of the passenger compartment 140. In some examples, the child care arrangement may be further defined as the first seating assembly 332 being rotated about the vertical axis 268 thereof toward the third seating assembly 340. In various examples, the step 1428 of activating the first translation actuator 184 of the first seating assembly 332 to align the first seating assembly 332 with the first desired rail position can include actuating the first seating assembly 332 to the forward region 300 of the passenger compartment 140. In some examples, the step 1438 of activating the seat actuator 172 of the second seating assembly 336 to align the seat 204 of the second seating assembly 336 with the desired seat position can include actuating the seat 204 of the second seating assembly 336 to the downwardly-deployed position. In various examples, the step 1448 of activating the first swivel actuator 180 of the first seating assembly 332 to align the first seating assembly 332 with the first desired swivel position includes rotating the first seating assembly 332 about the vertical axis 268 thereof such that the first seating assembly 332 is placed in the rearward-facing orientation. The method 1412 can include activating a second swivel actuator 180 of the second seating assembly 336 to position the second seating assembly 336 in a side-facing orientation. In various examples, the method 1412 can include detecting a second current rail position of the second seating assembly 336 along the rail system 316 within the passenger compartment 140 of the vehicle 100 with a second rail sensor 136. The method 1412 can also include comparing the second current rail position of the second seating assembly 336 with a second desired rail position and determining a second rail positional difference. The method 1412 can further include, in response to the second rail positional difference, the controller 104 activating a second translation actuator 184 of the second seating assembly 336 to align the second seating assembly with the second desired rail position. In some examples, the method 1412 can include activating the seat actuator 172 of the first seating assembly 332 to place the seat 204 of the first seating assembly 332 in the upwardly-stowed position. In various examples, the step of activating the second translation actuator 184 of the second seating assembly 336 to align the second seating assembly 336 with the second desired rail position can include actuating the second seating assembly 336 to the forward region 300 of the passenger compartment 140. The method 1412 can include detecting a current seatback position of the first seating assembly 332 with the seatback position sensor 276. The method 1412 can also include comparing the current seatback position of the first seating assembly 332 to a desired seatback position and determining a seatback positional difference. The method 1412 can further include, in response to the seatback positional difference, the controller 104 activating the seatback actuator 168 of the first seating assembly 332 to align the seatback 200 of the first seating assembly 332 with the desired seatback position. The method 1412 can include detecting a first current seat position of the first seating assembly 332 with a first seat position sensor 280. The method 1412 can also include comparing the first current seat position of the first seating assembly 332 to a first desired seat position and determining a first seat positional difference. The method 1412 can further include, in response to the first seat positional difference, the controller 104 activating the seat actuator 172 of the first seating assembly 332 to align the seat 204 of the first seating assembly 332 with the desired seat position. The method 1412 can include detecting a current lower leg support position of the first seating assembly 332 with the lower leg support position sensor 404. The method 1412 can also include comparing the current lower leg support position of the first seating assembly 332 to a desired lower leg support position and determining a lower leg support positional difference. The method 1412 can further include, in response to the lower leg support positional difference, the controller 104 activating the lower leg support actuator 176 of the first seating assembly 332 to align the lower leg support 208 of the first seating assembly 332 with the desired lower leg support position.

Figure 42:
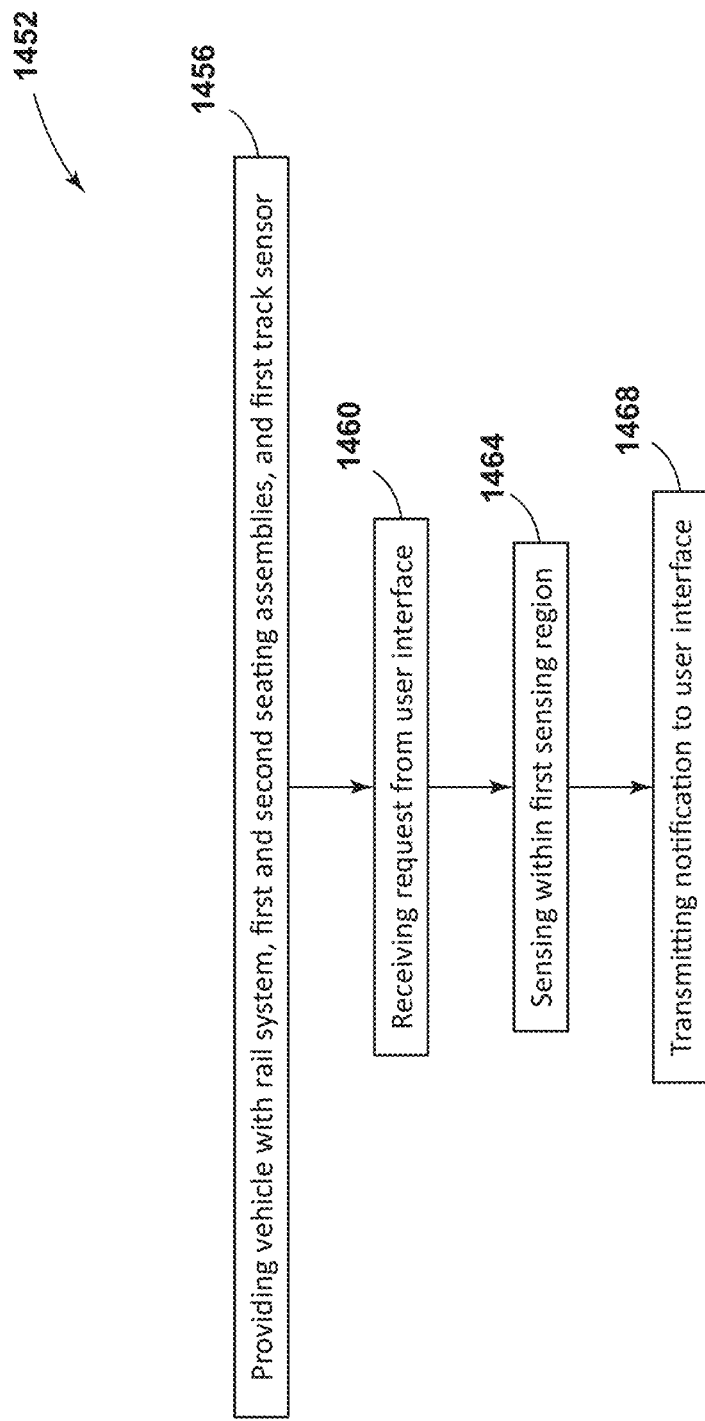
FIG. 42 is a flow diagram illustrating a method of adjusting an arrangement of the passenger compartment, according to the present disclosure.

Referring to FIG. 42, a method 1452 of adjusting the passenger compartment 140 arrangement of the vehicle 100 includes step 1456 of providing the vehicle 100 with the rail system 316 in the floor 320 thereof, the first seating assembly 332 coupled to the rail system 316, the second seating assembly 336 coupled to the rail system 316 and positioned rearward of the first seating assembly 332, and a first track sensor 160 with a first sensing region oriented toward a section of the rail system 316 that is positioned between the first seating assembly 332 and the second seating assembly 336. The method 1452 also includes step 1460 of receiving a request signal from the user interface 120 to adjust a distance between the first seating assembly 332 and the second seating assembly 336. The method 1452 further includes step 1464 of sensing within the first sensing region and determining the presence of a first obstruction within the first sensing region. Additionally, the method 1452 includes step 1468 of transmitting a notification from the controller 104 to the user interface 120 such that a user is notified of the first obstruction.

Referring again to FIG. 42, the method 1452 can include instructing the user to remove the first obstruction to adjust the distance between the first seating assembly 332 and the second seating assembly 336. In some examples, the method 1452 can include withholding instruction signals at the controller 104 until the first obstruction has been removed. In various examples, the method 1452 can include sensing within the first sensing region and determining the absence of the first obstruction. In some examples, the first track sensor 160 is positioned in a first portion of the first seating assembly 332 that is oriented toward the second seating assembly 336. In various examples, the method 1452 can include providing a second track sensor 160 with a second sensing region that is oriented toward a section of the rail system 316 that is positioned vehicle-forward of the first seating assembly 332. In some examples, the second track sensor 160 is positioned in a second portion of the first seating assembly 332 that is oriented toward the section of the rail system 316 that is positioned vehicle-forward of the first seating assembly 332. In various examples, the method 1452 can include sensing within the second sensing region and determining the presence of a second obstruction within the second sensing region. In some examples, the method 1452 can include withholding instruction signals at the controller 104 until the second obstruction has been removed. In various examples, the method 1452 can include sensing within the second sensing region and determining the absence of the second obstruction. While referred to as the first obstruction and the second obstruction, such terminology should not be construed as limiting the present disclosure. Rather, the terms first obstruction and second obstruction are utilized for clarity and understanding in the present description. Moreover, it is contemplated that more than one obstruction may be detected by each track sensor 160. Further, it is contemplated that the track sensor 160 may be configured to monitor or sense in more than one location simultaneously. In some examples, the first track sensor 160 is positioned in a first portion of an upper region of the passenger compartment 140. In various examples, the second track sensor 160 is positioned in a second portion of the upper region of the passenger compartment 140.

Figure 43:
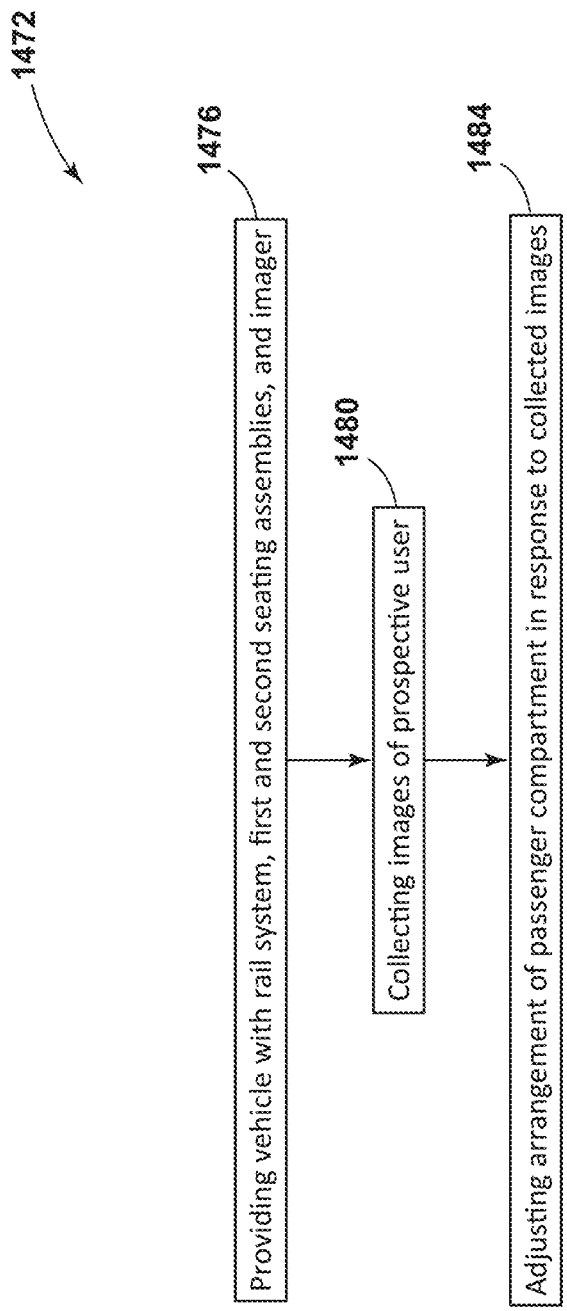
FIG. 43 is a flow diagram illustrating a method of adjusting an arrangement of the passenger compartment, according to the present disclosure.

Referring to FIG. 43, a method 1472 of adjusting the passenger compartment 140 of the vehicle 100 includes step 1476 of providing the vehicle 100 with the rail system 316 in the floor 320 thereof, the first seating assembly 332 coupled to the rail system 316, the second seating assembly 336 coupled to the rail system 316 and positioned rearward of the first seating assembly 332, and the imager 132 mounted on the vehicle 100 with a field of view of the imager 132 being oriented toward the vehicle-exterior environment. The method 1472 also includes step 1480 of collecting images of a prospective user with the imager 132. The method 1472 further includes step 1484 where, in response to the collected images of the prospective user, the controller 104 adjusts the arrangement of the passenger compartment 140. The adjustment of the passenger compartment 140 can be accomplished by actuating at least one seating assembly chosen from the first seating assembly 332 and the second seating assembly 336.

Referring again to FIG. 43, the method 1472 can include identifying a first user and a second user from the collected images of the prospective user, the second user being smaller in stature than the first user. The method 1472 can also include activating the swivel actuator 180 of the second seating assembly 336 such that the second seating assembly 336 is placed in a side-facing orientation. In some examples, the method 1472 includes processing the images collected of the prospective user and identifying the first user carrying the second user. In various examples, the method 1472 includes processing the images collected of the prospective user and identifying the first user holding a hand of the second user. In some examples, the step of processing the images collected of the prospective user can include estimating a height of the second user and inferring an age of the second user based upon the height by referencing a database. In various examples, the database may be stored within the memory 112 of the controller 104. In some examples, the method 1472 can include processing the images collected of the prospective user, identifying a cargo item in the possession of the prospective user, actuating the seat 204 of the first seating assembly 332 to the upwardly-stowed position, actuating the first seating assembly 332 toward the forward extreme of the rail system 316, actuating the seat 204 of the second seating assembly 336 to the upwardly-stowed position, and actuating the second seating assembly 336 toward the forward extreme of the rail system 316. In various examples, the cargo item in the possession of the prospective user is identified as one or more bags carried by the prospective user. In some examples, the method 1472 includes processing the images collected of the prospective user and identifying the prospective user as comprising a plurality of occupants. In various examples, the method 1472 includes actuating the seat 204 of the second seating assembly 336 to the upwardly-stowed position and actuating the second seating assembly 336 in the vehicle-forward direction along the rail system 316. In some examples, the method 1472 includes rotating the first seating assembly 332 about the vertical axis 268 thereof to place the first seating assembly 332 in the rearward-facing orientation.

Figure 44:
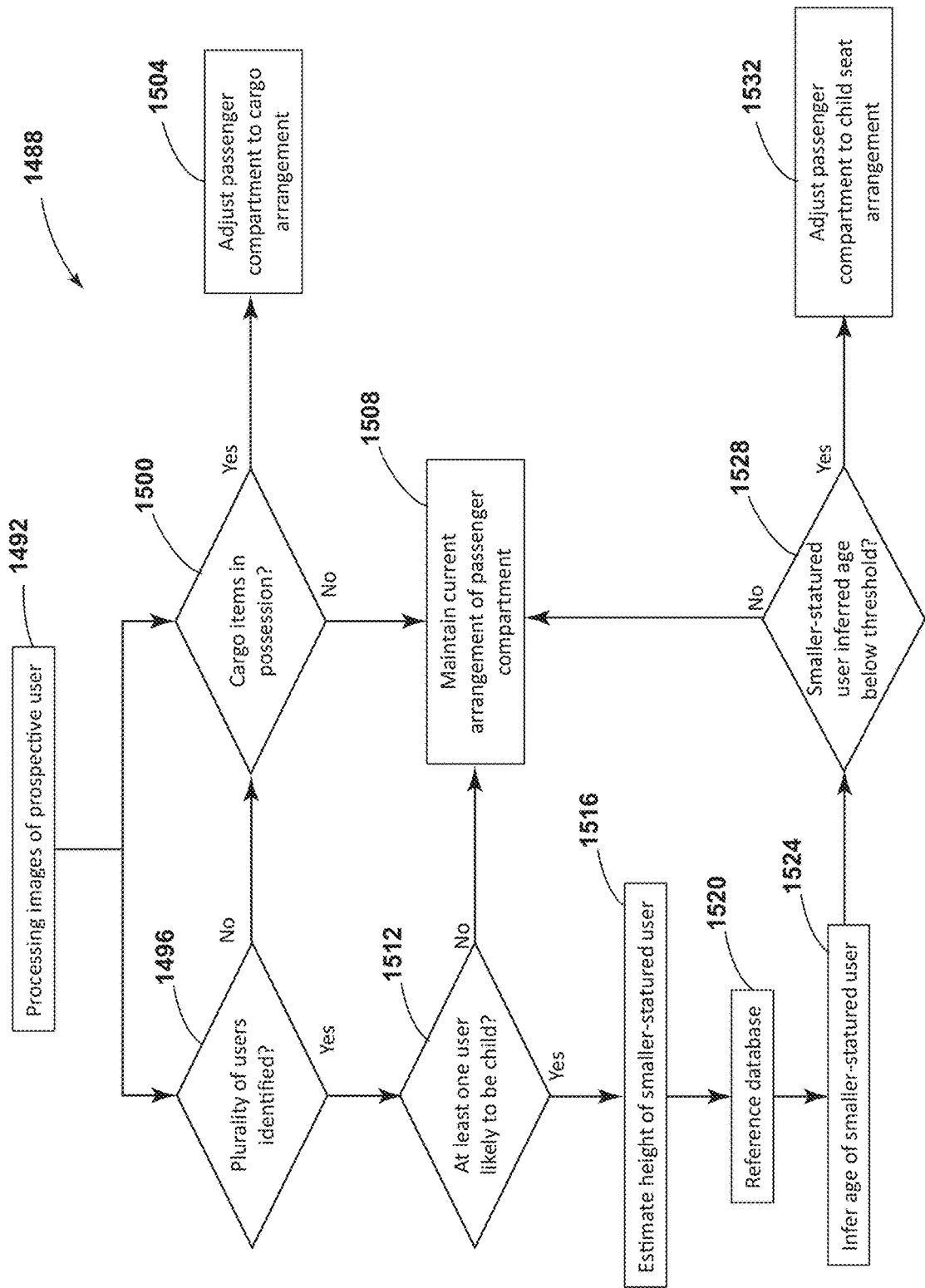
FIG. 44 is a flow diagram illustrating a method of processing images collected of a prospective user, according to the present disclosure.

Referring to FIG. 44, in various examples, a method 1488 of processing the images collected of the prospective user at step 1480 can include step 1492 of processing the images collected of the prospective user. In processing the images collected of the prospective user, decision point 1496 can determine whether a plurality of users have been identified in the collected images. Additionally, in processing the images of the prospective user, decision point 1500 can determine whether cargo items in the possession of the prospective user have been identified in the collected images. In examples where the processing of the images collected of the prospective user does not identify a plurality of users at decision point 1496, but does identify cargo items in the possession of the prospective user at decision point 1500, then the arrangement of the passenger compartment 140 can be adjusted to the cargo arrangement at step 1504. In examples where the processing of the images collected of the prospective user does not identify a plurality of users at decision point 1496 and does not identify cargo items in the possession of the prospective user at decision point 1500, then the arrangement of the passenger compartment 140 can be maintained in the current arrangement at step 1508. In various examples, the arrangement of the passenger compartment 140 may default to the design arrangement following completion of a drop off of a preceding user. Accordingly, the current arrangement may be the design arrangement. In some examples, the arrangement of the passenger compartment 140 may default to the social arrangement following completion of a drop off of a preceding user. Accordingly, the current arrangement may be the social arrangement. In examples where the processing of the images collected of the prospective user identifies a plurality of users, decision point 1512 can be employed to determine if one of the plurality of users is likely to be a child. For example, one of the plurality of users may be holding the hand of another of the plurality of users, with the another of the plurality of users being smaller-statured than the one of the plurality of users. In another example, one of the plurality of users may be carrying another of the plurality of users, with the another of the plurality of users being smaller-statured than the one of the plurality of users. If the controller 104 determines that there is not a likely child within the plurality of users at decision point 1512, then the arrangement of the passenger compartment 140 may be maintained in the current arrangement at step 1508. If the controller 104 determines that there is likely a child within the plurality of users at decision point 1512, then the collected images of the prospective user can be processed to estimate a height of the smaller-statured user that was determined to likely be a child at step 1516. For example, the imager 132 can be calibrated and/or provided with a reference measurement within its field of view for utilization in the estimating of the height of the user.

Referring again to FIG. 44, upon obtaining an estimated height of the smaller-statured user at step 1516, the estimated height may be referenced against a database at step 1520. In various examples, the database may be stored within the memory 112 of the controller 104. In some examples, the database may be stored external to the controller 104, with the controller 104 being communicatively coupled to the database. In various examples, the database may be a growth chart utilized by physicians (e.g., Center for Disease Control and Prevention growth charts, World Health Organization growth charts, user profiles with height information as an input, etc.). In referencing the database at step 1520, the controller 104 can infer an age of the smaller-statured user at step 1524 based upon the estimated height and the information contained within the database. Once an age of the smaller-statured user has been inferred at step 1534, the controller 104 may compare the inferred age and/or height against a predetermined threshold at decision point 1528. The predetermined threshold may be determined by one or more occupant safety recommendations or standards. If the controller 104 determines at decision point 1528 that the smaller-statured user is below the predetermined threshold, then the arrangement of the passenger compartment 140 can be adjusted to the child seat arrangement at step 1532. Alternatively, if the controller 104 determines at decision point 1528 that the smaller-statured user is not below the predetermined threshold, then the arrangement of the passenger compartment 140 may be maintained in the current arrangement at step 1508.

Figure 45:
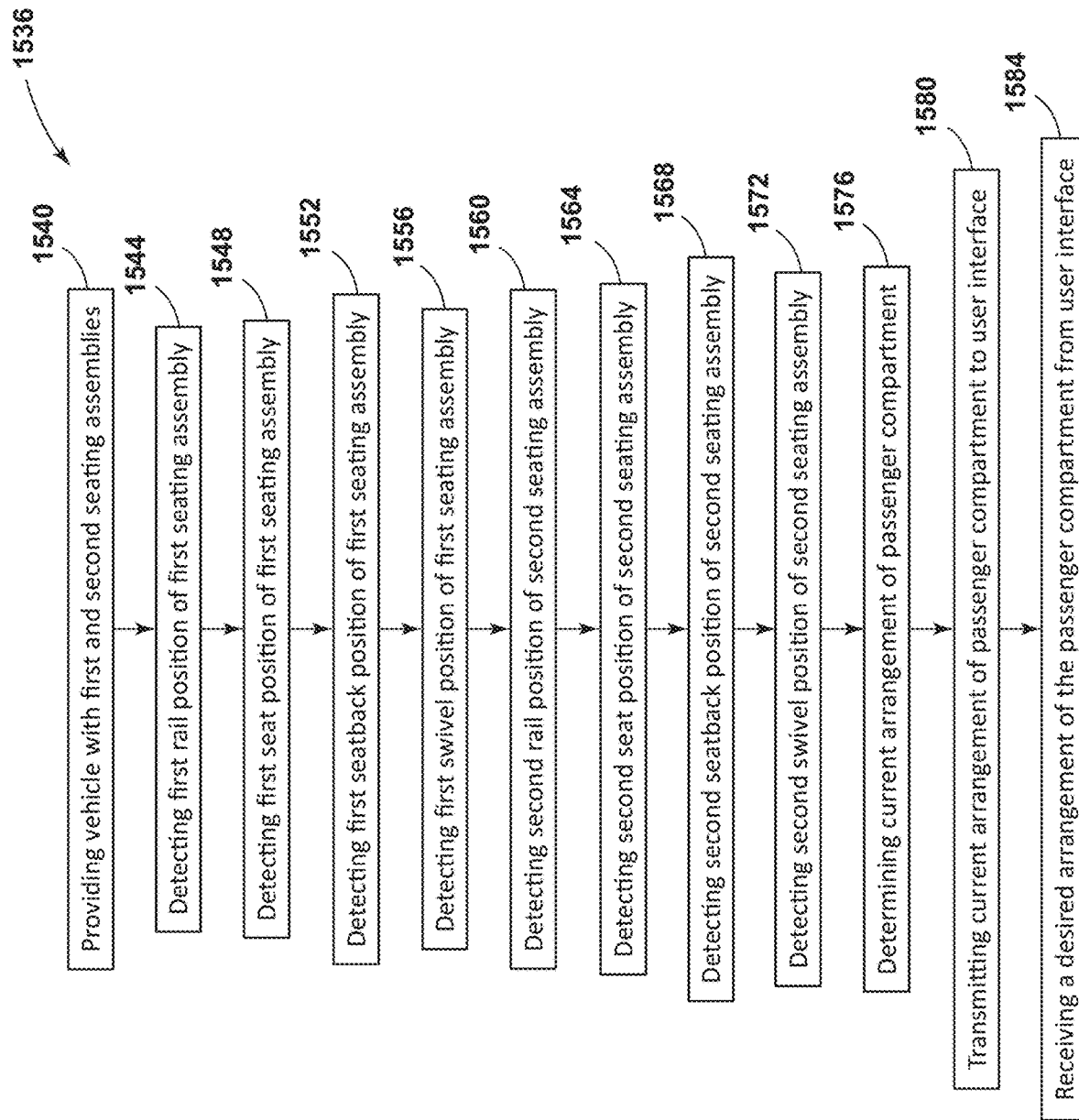
FIG. 45 is a flow diagram illustrating a method of adjusting an arrangement of the passenger compartment, according to the present disclosure.

Referring to FIG. 45, a method 1536 of adjusting the passenger compartment 140 arrangement of the vehicle 100 includes step 1540 of providing the vehicle 100 with the first seating assembly 332 and the second seating assembly 336, the first and second seating assemblies 332, 336 each being movably coupled to the rail system 316 within the passenger compartment 140 of the vehicle 100, and the first and second seating assemblies 332, 336 each including the seat 204 and the seatback 200. The method 1536 also includes step 1544 of detecting a first rail position of the first seating assembly 332 with a first rail sensor 136. The method 1536 further includes step 1548 of detecting a first seat position of the seat 204 of the first seating assembly 332 with a first seat position sensor 280. Additionally, the method 1536 includes step 1552 of detecting a first seatback position of the seatback 200 of the first seating assembly 332 with a first seatback position sensor 276. Further, the method 1536 includes step 1556 of detecting a first swivel position of the first seating assembly 332 with a first swivel position sensor 284. The method 1536 also includes step 1560 of detecting a second rail position of the second seating assembly 336 with a second rail sensor 136. The method 1536 further includes step 1564 of detecting a second seat position of the seat 204 of the second seating assembly 336 with a second seat position sensor 280. Additionally, the method 1536 includes step 1568 of detecting a second seatback position of the seatback 200 of the second seating assembly 336 with a second seatback position sensor 276. Further, the method 1536 includes step 1572 of detecting a second swivel position of the second seating assembly 336 with a second swivel position sensor 284. The method 1536 also includes step 1576 of determining a current arrangement of the passenger compartment 140 of the vehicle 100 based upon the detected positions of the first and second rail sensors 136, the first and second seat position sensors 280, the first and second seatback position sensors 276, and the first and second swivel position sensors 284. The method 1536 further includes step 1580 of transmitting the current arrangement of the passenger compartment 140 of the vehicle 100 to the user interface 120 of a prospective user of the vehicle 100, the user interface 120 being external to the vehicle 100. Additionally, the method 1536 includes step 1584 of receiving a desired arrangement of the passenger compartment 140 from the user interface 120 of the prospective user.

Referring again to FIG. 45, the method 1536 can include detecting a first current lower leg support position of a first lower leg support 208 of the first seating assembly 332 with a first lower leg support position sensor 404. In some examples, the method 1536 can include detecting a second lower leg support position of a second lower leg support 208 of the second seating assembly 336 with a second lower leg support position sensor 404. In various examples, the method 1536 can include adjusting the arrangement of the passenger compartment 140 from the current arrangement to the desired arrangement. In some examples, the method 1536 includes activating at least one actuator chosen from a first translation actuator 184 of the first seating assembly 332, a second translation actuator 184 of the second seating assembly 336, a first seat actuator 172 of the first seating assembly 332, a second seat actuator 172 of the second seating assembly 336, a first seatback actuator 168 of the first seating assembly 332, a second seatback actuator 168 of the second seating assembly 336, a first swivel actuator 180 of the first seating assembly 332, and a second swivel actuator 180 of the second seating assembly 336. In various examples, the adjustment from the current arrangement to the desired arrangement can be accomplished while the vehicle 100 is in motion. In some examples, the desired arrangement is the current arrangement. That is, situations are contemplated where the current arrangement of the passenger compartment 140 is acceptable to the prospective user without adjustment. In various examples, the method 1536 can include detecting an occupancy status of the passenger compartment 140 of the vehicle 100 with an occupancy sensor 156 positioned on-board the vehicle 100. The method 1536 can also include determining that the passenger compartment 140 is devoid of occupants prior to transitioning the arrangement of the passenger compartment 140 from the current arrangement to the desired arrangement. In some examples, the occupancy sensor 156 is the imager 132 positioned in the upper region of the passenger compartment 140 with a field of view of the imager 132 oriented toward the passenger compartment 140. In various examples, the occupancy sensor 156 includes a first occupancy sensor 156 positioned within the first seating assembly 332 and a second occupancy sensor 156 positioned within the second seating assembly 336.

While specific examples of adjusting an arrangement of the passenger compartment 140 from a first arrangement to a second arrangement have been discussed in detail, the present disclosure is not limited to only these adjustments. Rather, aided by the present disclosure, a person of skill in the art will be able to determine the adjustments necessary for transitioning from a first arrangement to a second arrangement that has not been specifically outlined in the exemplary adjustments discussed herein. Similarly, one of skill in the art will be able to determine the adjustments necessary to arrive at a custom arrangement of the passenger compartment 140 that has not been specifically outlined herein. Accordingly, such adjustments and/or arrangements are within the scope of the present disclosure.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle, comprising:
   a passenger compartment;
   an access door that separates the passenger compartment from a vehicle-exterior environment, the access door being movable between an open position and a closed position;
   a first seating assembly;
   a second seating assembly positioned vehicle-rearward of the first seating assembly, the first and second seating assemblies each comprising:
      a seatbase;
      a seat having a first end and a second end, the seat being movably coupled to the seatbase at the second end of the seat such that the seat is movable between an upwardly-stowed position and a downwardly-deployed position;
      a seat actuator that adjusts an angular position of the seat relative to the seatbase;
      a seatback movably coupled to the seatbase proximate to the second end of the seat, a seating surface of the seat and the seatback being configured to receive an occupant;
      a seatback actuator that adjusts an angular position of the seatback relative to the seatbase;
      a swivel assembly coupled to the seatbase; and
      a swivel actuator engaged with the swivel assembly such that the seatbase is rotatable about a central vertical axis with the seat in the downwardly-deployed position;
   a controller that receives request signals from a user interface and transmits instruction signals to at least one component of at least one of the first seating assembly and the second seating assembly, the at least one component chosen from the seat actuator, the seatback actuator, and the swivel actuator, wherein the controller adjusts a seating arrangement from a first arrangement to a second arrangement in response to the transmitted instruction signals, and wherein the first arrangement is a child care arrangement.

2. The vehicle of claim 1, wherein the child care arrangement is defined as the seat of the second seating assembly being in the upwardly-stowed position and the first seating assembly being actuated from a forward region of the passenger compartment toward a central region of the passenger compartment such that the first and second seating assemblies are each positioned in the central region of the passenger compartment.

3. The vehicle of claim 2, further comprising:
   a third seating assembly positioned vehicle-rearward of the first seating assembly and laterally adjacent to the second seating assembly.

4. The vehicle of claim 3, wherein the second arrangement is a design arrangement with each of the first, second, and third seating assemblies oriented in a forward-facing direction.

5. The vehicle of claim 1, further comprising:
   a floor positioned in a lower region of the passenger compartment; and
   a rail system positioned in the floor and extending along a longitudinal direction of the vehicle.

6. The vehicle of claim 5, wherein each of the first and second seating assemblies further comprises:
   a translation actuator coupled to the seatbase and engaged with the rail system, the translation actuator being capable of adjusting a position of an associated one of the first and second seating assemblies along the rail system.

7. The vehicle of claim 6, wherein the second arrangement is a cargo arrangement, wherein the cargo arrangement is defined as the seats of the first and second seating assemblies being placed in the upwardly-stowed position, the cargo arrangement further defined as the first and second seating assemblies being positioned toward a forward region of the passenger compartment.

8. The vehicle of claim 7, wherein the controller actuates the first and second seating assemblies along the rail system in a vehicle-forward direction, and wherein the controller actuates the seat of the first seating assembly to the upwardly-stowed position.

9. The vehicle of claim 6, wherein the second arrangement is an ingress/egress arrangement, wherein the ingress/egress arrangement is defined as the seat of the second seating assembly being placed in the upwardly-stowed position, the ingress/egress arrangement further defined as the second seating assembly being positioned along the rail system toward a forward region of the passenger compartment.

10. The vehicle of claim 9, wherein the controller actuates the first and second seating assemblies along the rail system in a vehicle-forward direction to accomplish the second arrangement.

11. A method of adjusting an arrangement of a passenger compartment of a vehicle, the method comprising:
providing the vehicle with a first seating assembly, a second seating assembly, and a third seating assembly, the second seating assembly being positioned rearward of the first seating assembly, the third seating assembly being positioned rearward of the first seating assembly and laterally adjacent to the second seating assembly, the first, second, and third seating assemblies each comprising a seat and a seatback that define a seating surface configured to receive an occupant;
receiving a request from a user interface to transition the arrangement of the passenger compartment of the vehicle from a first arrangement to a second arrangement, wherein the first arrangement is a child care arrangement;
detecting a first current rail position of the first seating assembly along a rail system within the passenger compartment of the vehicle with a first rail sensor;
comparing the first current rail position of the first seating assembly with a first desired rail position and determining a first rail positional difference;
in response to the first rail positional difference, activating a first translation actuator of the first seating assembly to align the first seating assembly with the first desired rail position;
detecting a current seat position of the second seating assembly with a seat position sensor;
comparing the current seat position of the second seating assembly to a desired seat position and determining a seat positional difference;
in response to the seat positional difference, activating a seat actuator of the second seating assembly to align the seat of the second seating assembly with the desired seat position;
detecting a first current swivel position of the first seating assembly with a first swivel position sensor;
comparing the first current swivel position to a first desired swivel position and determining a first swivel positional difference; and
in response to the first swivel positional difference, activating a first swivel actuator of the first seating assembly to align the first seating assembly with the first desired swivel position about a central vertical axis of a seat of the first seating assembly, wherein the arrangement of the passenger compartment is arranged in the child care arrangement for an idle time.

12. The method of claim 11, wherein the child care arrangement is defined as the seat of the second seating assembly being in an upwardly-stowed position and the first seating assembly being actuated from a forward region of the passenger compartment toward a central region of the passenger compartment such that the first and second seating assemblies are each positioned in the central region of the passenger compartment.

13. The method of claim 12, wherein the child care arrangement is further defined as the first seating assembly being rotated about the central vertical axis toward the third seating assembly.

14. The method of claim 12, wherein the step of activating a first translation actuator of the first seating assembly to align the first seating assembly with the first desired rail position comprises actuating the first seating assembly to the forward region of the passenger compartment.

15. The method of claim 14, wherein the step of activating a seat actuator of the second seating assembly to align the seat of the second seating assembly with the desired seat position comprises actuating the seat of the second seating assembly to a downwardly-deployed position, and wherein the second arrangement is a design arrangement, the design arrangement defined as each of the first, second, and third seating assemblies oriented in a forward-facing direction with their corresponding seats in the downwardly-deployed position.

16. The method of claim 14, wherein the step of activating a seat actuator of the second seating assembly to align the seat of the second seating assembly with the desired seat position comprises actuating the seat of the second seating assembly to a downwardly-deployed position, wherein the step of activating a first swivel actuator of the first seating assembly to align the first seating assembly with the first desired swivel position comprises rotating the first seating assembly about a vertical axis such that the first seating assembly is placed in a rearward-facing orientation, and wherein the second arrangement is a social arrangement, the social arrangement defined as the first and second seating assemblies having their corresponding seats in the downwardly-deployed position, the first seating assembly being in a rearward-facing orientation and the second seating assembly being in a forward-facing orientation.

17. The method of claim 14, further comprising:
activating a second swivel actuator of the second seating assembly to position the second seating assembly in a side-facing orientation; and
wherein the step of activating a seat actuator of the second seating assembly to align the seat of the second seating assembly with the desired seat position comprises actuating the seat of the second seating assembly to a downwardly-deployed position, and wherein the second arrangement is a child seat arrangement, the child seat arrangement defined as the second seating assembly oriented in a side-facing direction toward with the seat of the second seating assembly in the downwardly-deployed position.

18. The method of claim 14, further comprising:

detecting a second current rail position of the second seating assembly along the rail system within the passenger compartment of the vehicle with a second rail sensor;

comparing the second current rail position of the second seating assembly with a second desired rail position and determining a second rail positional difference;

in response to the second rail positional difference, activating a second translation actuator of the second seating assembly to align the second seating assembly with the second desired rail position;

activating a seat actuator of the first seating assembly to place the seat of the first seating assembly in an upwardly-stowed position; and wherein the step of activating a second translation actuator of the second seating assembly to align the second seating assembly with the second desired rail position comprises actuating the second seating assembly to the forward region of the passenger compartment, and wherein the second arrangement is a cargo arrangement, the cargo arrangement defined as the seats of the first and second seating assemblies each being placed in an upwardly-stowed position and the first and second seating assemblies being positioned within the forward region of the passenger compartment.

19. The method of claim 14, further comprising:

detecting a second current rail position of the second seating assembly along the rail system within the passenger compartment of the vehicle with a second rail sensor;

comparing the second current rail position of the second seating assembly with a second desired rail position and determining a second rail positional difference;

in response to the second rail positional difference, activating a second translation actuator of the second seating assembly to align the second seating assembly with the second desired rail position; and wherein the step of activating a second translation actuator of the second seating assembly to align the second seating assembly with the second desired rail position comprises actuating the second seating assembly toward the forward region of the passenger compartment, and wherein the second arrangement is an ingress/egress arrangement, the ingress/egress arrangement defined as the seat of the second seating assembly being placed in an upwardly-stowed position and the second seating assembly being positioned toward the forward region of the passenger compartment.

20. The method of claim 14, further comprising:

detecting a current seatback position of the first seating assembly with a seatback position sensor;

comparing the current seatback position of the first seating assembly to a desired seatback position and determining a seatback positional difference;

in response to the seatback positional difference, activating a seatback actuator of the first seating assembly to align the seatback of the first seating assembly with the desired seatback position;

detecting a first current seat position of the first seating assembly with a first seat position sensor;

comparing the first current seat position of the first seating assembly to a first desired seat position and determining a first seat positional difference;

in response to the seat positional difference, activating a seat actuator of the first seating assembly to align the seat of the first seating assembly with the desired seat position;

detecting a current lower leg support position of a lower leg support of the first seating assembly with a lower leg support position sensor;

comparing the current lower leg support position of the first seating assembly to a desired lower leg support position and determining a lower leg support positional difference;

in response to the lower leg support positional difference, activating a lower leg support actuator of the first seating assembly to align the lower leg support of the first seating assembly with the desired lower leg support position; and wherein the second arrangement is a relaxation arrangement, the relaxation arrangement defined as the seatback of the first seating assembly being in a reclined position, the seat of the first seating assembly being in an inclined position, and the lower leg support being in a deployed position.

\* \* \* \* \*